United States Patent
Kim et al.

(10) Patent No.: US 11,778,536 B2
(45) Date of Patent: Oct. 3, 2023

(54) METHOD AND APPARATUS FOR SUPPORTING OPERATION OF STANDALONE MTC THAT USES MULTI-NARROWBAND IN WIRELESS COMMUNICATION SYSTEM

(71) Applicant: LG ELECTRONICS INC., Seoul (KR)

(72) Inventors: Jaehyung Kim, Seoul (KR); Changhwan Park, Seoul (KR); Seokmin Shin, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 17/277,699

(22) PCT Filed: Sep. 18, 2019

(86) PCT No.: PCT/KR2019/012094
§ 371 (c)(1),
(2) Date: Mar. 18, 2021

(87) PCT Pub. No.: WO2020/060203
PCT Pub. Date: Mar. 26, 2020

(65) Prior Publication Data
US 2021/0352567 A1  Nov. 11, 2021

(30) Foreign Application Priority Data

Sep. 18, 2018  (KR) .......................... 10-2018-0111861

(51) Int. Cl.
*H04W 4/00*  (2018.01)
*H04B 1/00*  (2006.01)
(Continued)

(52) U.S. Cl.
CPC ............ *H04W 48/02* (2013.01); *H04B 1/713* (2013.01); *H04W 4/70* (2018.02); *H04W 16/02* (2013.01); *H04W 16/14* (2013.01); *H04W 72/20* (2023.01)

(58) Field of Classification Search
CPC ....... H04W 48/02; H04W 4/70; H04W 72/20; H04W 16/02; H04W 16/14; H04B 1/713
(Continued)

(56) References Cited

U.S. PATENT DOCUMENTS 10,715,210 B1 *  7/2020  Liu ...................... H04B 1/7136
11,140,634 B2 *  10/2021  Ye ......................... H04W 52/50
(Continued)

FOREIGN PATENT DOCUMENTS

EP       3340721        6/2018
KR   10-2008-0062883    7/2018

OTHER PUBLICATIONS

PCT International Application No. PCT/KR2019/012094, International Search Report dated Jan. 17, 2020, 4 pages.
(Continued)

*Primary Examiner* — Mark G. Pannell
(74) *Attorney, Agent, or Firm* — LEE HONG DEGERMAN KANG WAIMEY

(57) ABSTRACT

The present specification provides a method for supporting an operation of a standalone MTC that uses a multi-narrowband in a wireless communication system. More specifically, a method performed by a terminal comprises the steps of: receiving, from a base station, multi-narrowband configuration information related to a plurality of narrowbands defined within an NR bandwidth including a first system bandwidth related to an in-band MTC operation and a second system bandwidth related to a standalone MTC operation; and performing frequency hopping on the plural-
(Continued)

(a) In-band system (b) Standalone system ity of narrowbands, on the basis of the multi-narrowband configuration information.

9 Claims, 25 Drawing Sheets

(51) Int. Cl.
    *H04W 48/02*     (2009.01)
    *H04W 4/70*     (2018.01)
    *H04B 1/713*     (2011.01)
    *H04W 16/02*     (2009.01)
    *H04W 16/14*     (2009.01)
    *H04W 72/20*     (2023.01)

(58) Field of Classification Search
    USPC .......................................................... 370/329
    See application file for complete search history.

(56) References Cited

U.S. PATENT DOCUMENTS

| | | | |
|---|---|---|---|
| 2009/0268680 A1* | 10/2009 | Nam | H04W 64/00 370/329 |
| 2015/0271746 A1* | 9/2015 | Jang | H04W 48/18 370/328 |
| 2016/0330718 A1* | 11/2016 | Kim | H04L 5/0007 |
| 2017/0094621 A1* | 3/2017 | Xu | H04W 72/23 |
| 2017/0180001 A1* | 6/2017 | Wang | H04W 4/70 |
| 2017/0251455 A1* | 8/2017 | Shin | H04L 5/0098 |
| 2017/0317816 A1* | 11/2017 | Lei | H04L 7/041 |
| 2017/0332357 A1* | 11/2017 | Xu | H04W 72/0453 |
| 2017/0359820 A1* | 12/2017 | Gaal | H04L 5/005 |
| 2017/0373907 A1* | 12/2017 | Tan | H04L 5/14 |
| 2018/0063841 A1* | 3/2018 | Song | H04W 72/23 |
| 2018/0220486 A1* | 8/2018 | Tseng | H04W 36/305 |
| 2018/0241495 A1* | 8/2018 | Xue | H04J 11/00 |
| 2018/0270851 A1* | 9/2018 | Bhattad | H04W 72/23 |
| 2019/0089568 A1* | 3/2019 | Abedini | H04L 5/003 |
| 2019/0090193 A1* | 3/2019 | Liu | H04W 52/028 |
| 2019/0150155 A1* | 5/2019 | Chatterjee | H04L 5/0053 370/335 |
| 2019/0349775 A1* | 11/2019 | Sui | H04W 16/14 |
| 2019/0349848 A1* | 11/2019 | Bali | H04L 27/2637 |
| 2020/0028637 A1* | 1/2020 | Wolff | H04L 5/0005 |
| 2020/0154393 A1* | 5/2020 | Höglund | H04W 68/02 |
| 2020/0163032 A1* | 5/2020 | Su | H04W 48/10 |
| 2020/0305123 A1* | 9/2020 | Takeda | H04W 8/24 |
| 2020/0328776 A1* | 10/2020 | Scholand | H04B 1/715 |
| 2020/0336973 A1* | 10/2020 | Niu | H04B 1/7156 |
| 2020/0383144 A1* | 12/2020 | Sun | H04W 4/80 |
| 2021/0068075 A1* | 3/2021 | Uesaka | H04L 1/08 |
| 2021/0112552 A1* | 4/2021 | Tiirola | H04L 5/0048 |
| 2021/0227543 A1* | 7/2021 | Wang | H04W 72/0453 |
| 2021/0266802 A1* | 8/2021 | Arshad | H04W 36/00 |
| 2021/0306834 A1* | 9/2021 | Chang | H04W 72/0446 |

OTHER PUBLICATIONS

Park et al., "NB-IoT Related Standard Trends in 3GPP", TTA Journal, vol. 166, Jul. 2016, 8 pages.
Alcatel-Lucent, "Considerations of Multi-Band NB-IoT" 3GPP TSG-RAN WG1 NB-IoT ad-hoc, R1-160180, Jan. 18-20, 2016, 3 pages.
Ericsson, "Access control for NB-IoT" 3GPP TSG-RAN WG2 NB-IoT ad-hoc, R1-160478, Jan. 19-21, 2016, 5 pages.

* cited by examiner (a) In-band system (b) Standalone system (a)

* Fc = center frequency                    (b)

METHOD AND APPARATUS FOR SUPPORTING OPERATION OF STANDALONE MTC THAT USES MULTI-NARROWBAND IN WIRELESS COMMUNICATION SYSTEM

CROSS-REFERENCE TO RELATED APPLICATIONS

This application is the National Stage filing under 35 U.S.C. 371 of International Application No. PCT/KR2019/012094, filed on Sep. 18, 2019, which claims the benefit of earlier filing date and right of priority Korean Application No. 10-2018-0111861, filed on Sep. 18, 2018, the contents of which are all hereby incorporated by reference herein in their entirety.

TECHNICAL FIELD

The present disclosure relates to a method and device for standalone MTC using a multi-narrowband in a wireless communication system.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

An object of the present disclosure is to provide a method for supporting narrowband and wideband in a standalone MTC operation.

The technical objects of the present disclosure are not limited to the aforementioned technical objects, and other technical objects, which are not mentioned above, will be apparently appreciated by a person having ordinary skill in the art from the following description.

Technical Solution

In one aspect of the present disclosure, there is provided a method of supporting, by a user equipment (UE), a standalone machine type communication (MTC) operation using a multi-narrowband (NB) in a wireless communication system, the method comprising receiving, from a base station, multi-NB configuration information related to a plurality of narrowbands (NBs) defined in a next generation (NR) bandwidth including a first system bandwidth related to an in-band MTC operation and a second system bandwidth related to the standalone MTC operation; and performing a frequency hopping on the plurality of NBs based on the multi-NB configuration information, wherein when the plurality of NBs include an anchor-NB representing a NB related to an initial cell selection, the frequency hopping is performed on the plurality of NBs except the anchor-NB.

The first system bandwidth is an eMTC system bandwidth supporting only a long term evolution (LTE) in-band operation, and the second system bandwidth is a sMTC system bandwidth supporting a standalone operation.

The plurality of NBs include one anchor-NB and one or more secondary-NBs.

The method further comprises receiving, from the base station, control information for a unused RB of resource blocks (RBs) in the first system bandwidth.

The control information is represented in a bitmap, and wherein each bit of the bitmap indicates each unused RB.

The method further comprises, when the anchor-NB does not support an access for an eMTC UE, receiving, from the base station, a system message containing eMTC barring information indicating whether to support the eMTC UE.

The method further comprises, when the eMTC barring information indicates not to support the eMTC UE, receiving data from the base station in a LTE control region.

The UE is a standalone MTC UE.

In another aspect of the present disclosure, there is provided a user equipment (UE) supporting a standalone machine type communication (MTC) operation using a multi-narrowband (NB) in a wireless communication system, the UE comprising a transceiver configured to transmit and receive a radio signal; a memory; and a processor connected to the transceiver and the memory, wherein the processor is configured to receive, from a base station, multi-NB configuration information related to a plurality of narrowbands (NBs) defined in a next generation (NR) bandwidth including a first system bandwidth related to an in-band MTC operation and a second system bandwidth related to the standalone MTC operation; and perform a frequency hopping on the plurality of NBs based on the multi-NB configuration information, wherein when the plurality of NBs include an anchor-NB representing a NB related to an initial cell selection, the frequency hopping is performed on the plurality of NBs except the anchor-NB.

Advantageous Effects

The present disclosure has an effect of facilitating scheduling of a base station for an eMTC UE and a sMTC UE by performing frequency hopping of sMTC in a NR co-existence situation, where the eMTC UE and the sMTC UE coexist in a NR system bandwidth, on NBs except an anchor-NB.

Effects obtainable in the present disclosure are not limited to the aforementioned effects and other unmentioned effects will be clearly understood by those skilled in the art from the following description.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

MODE FOR INVENTION

Figure 1:
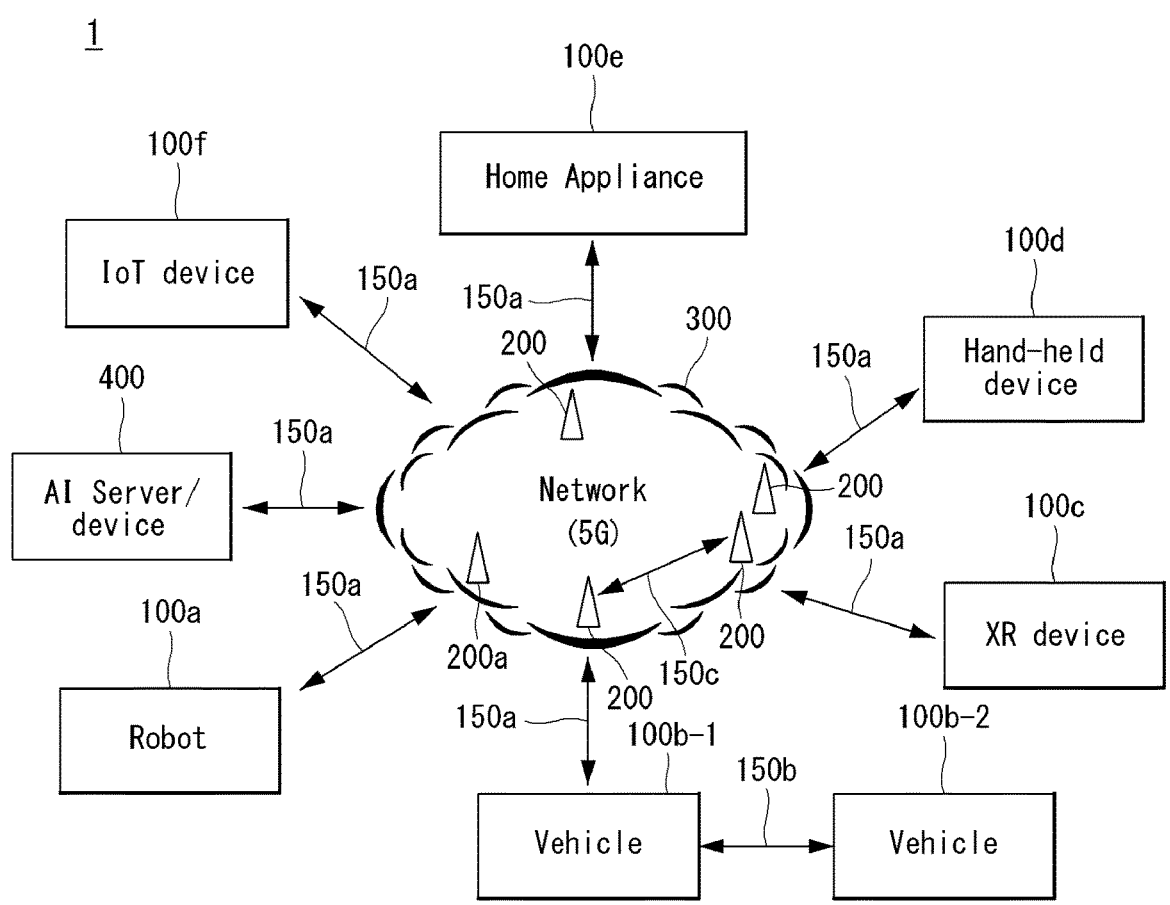
FIG. 1 illustrates a communication system 1 applied to the present disclosure.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In the present disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A is primarily described for clear description, but technical features of the disclosure are not limited thereto.

Examples of communication system applied to the present disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 1 illustrates a communication system 1 applied to the present disclosure.

Referring to FIG. 1, a communication system 1 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 100a, vehicles 100b-1 and 100b-2, an eXtended Reality (XR) device 100c, a hand-held device 100d, a home appliance 100e, an Internet of Thing (IoT) device 100f, and an AI device/server 400. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the BS and the network may be implemented even the wireless device and a specific wireless device 200a may operate a BS/network node for another wireless device.

The wireless devices 100a to 100f may be connected to a network 300 through a BS 200. An artificial intelligence (AI) technology may be applied to the wireless devices 100a to 100f and the wireless devices 100a to 100f may be connected to an AI server 400 through the network 300. The network 300 may be configured by using a 3G network, a 4G (e.g., LTE) network, or a 5G (e.g., NR) network. The wireless devices 100a to 100f may communicate with each other through the BS 200/network 300, but may directly communicate with each other without going through the BS/network (e.g., sidelink communication). For example, the vehicles 100b-1 and 100b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 100a to 100f.

Wireless communications/connections 150a, 150b, and 150c may be made between the wireless devices 100a to 100f and the BS 200 and between the BS 200 and the BS 200. Here, the wireless communication/connection may be made through various wireless access technologies (e.g., 5G NR) such as uplink/downlink communication 150a, sidelink communication 150b (or D2D communication), and inter-BS communication 150c (e.g., relay, Integrated Access Backhaul (IAB). The wireless device and the BS/the wireless device and the BS and the BS may transmit/receive radio signals to/from each other through wireless communications/connections 150a, 150b, and 150c. For example, the wireless communications/connections 150a, 150b, and 150c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Examples of Wireless Devices Applied to the Present Disclosure

Figure 2:
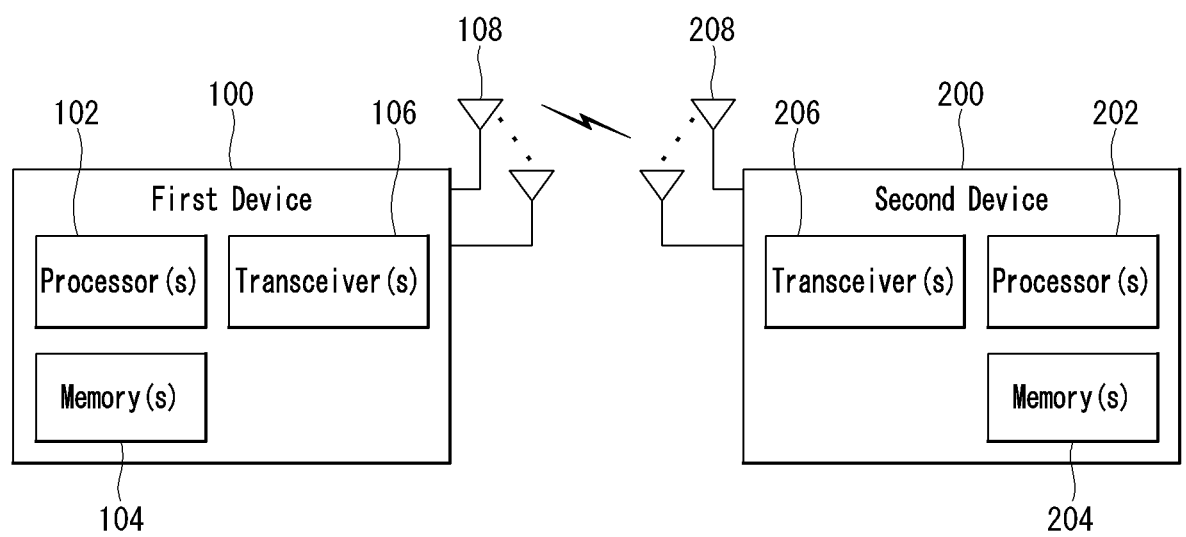
FIG. 2 illustrates a wireless device applicable to the present disclosure.

FIG. 2 illustrates wireless devices applicable to the present disclosure.

Referring to FIG. 2, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of a Wireless Device Applied to the Present Disclosure

Figure 3:
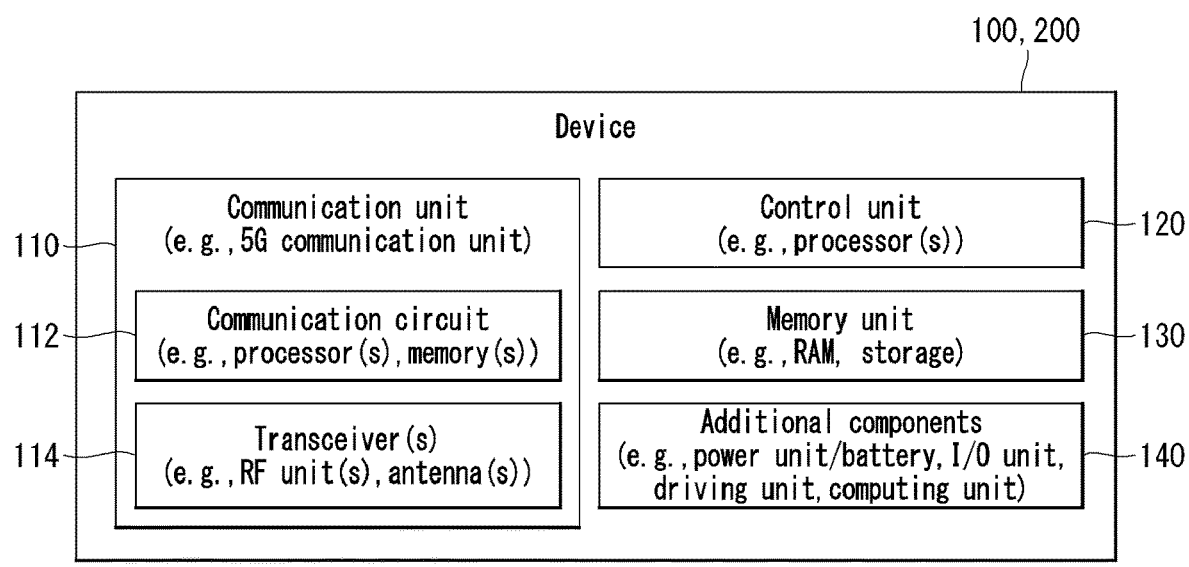
FIG. 3 illustrates another example of a wireless device applied to the present disclosure.

FIG. 3 illustrates another example of a wireless device applied to the present disclosure.

The wireless device may be implemented in various forms according to a use-case/service (refer to FIG. 1). Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 2. For example, the transceiver(s) 114 may include the one or more transceivers 106 and 106 and/or the one or more antennas 108 and 108 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a finTech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 4:
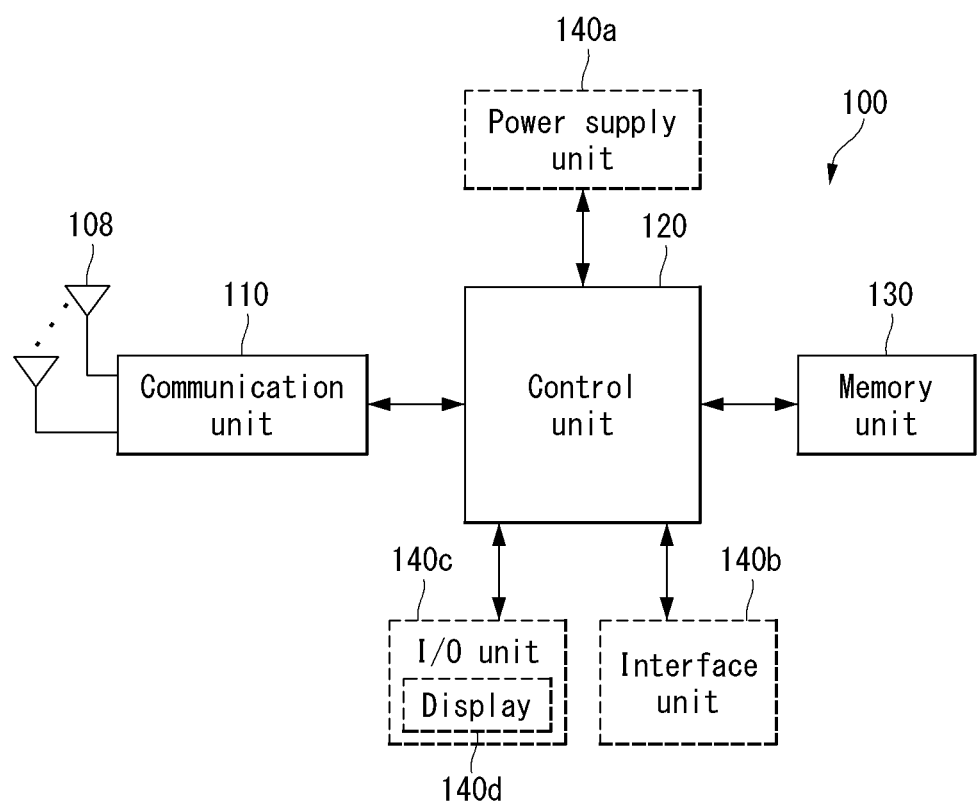
FIG. 4 illustrates a portable device applied to the present disclosure.

FIG. 4 illustrates an example of a portable device applied to the present disclosure.

The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 4, a portable device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. X3, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140*a* may supply power to the portable device 100 and include a wired/wireless charging circuit, a battery, and the like. The interface unit 140*b* may support a connection between the portable device 100 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

Overview of LTE System

Figure 5:
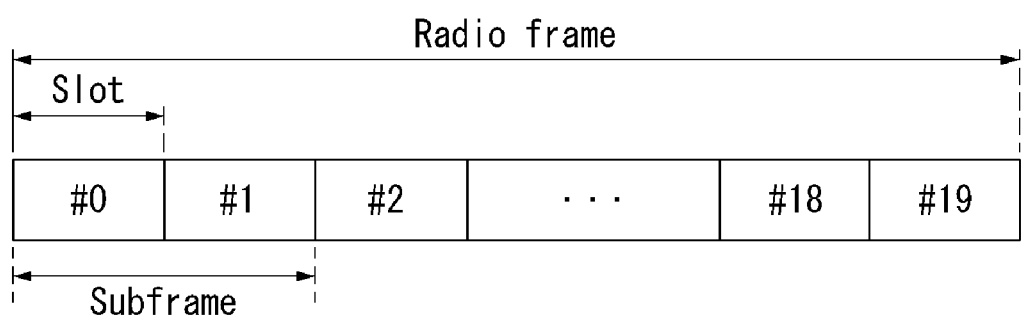
FIG. 5 illustrates an example of LTE radio frame structure.

FIG. 5 illustrates an example of LTE radio frame structure.

In FIG. 5, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in downlink, the OFDM symbol is to represent one symbol period. The OFDM symbol may also be referred to as an SC-FDMA symbol or a symbol period. A resource block (RB) is the unit of resource allocation and includes a plurality of contiguous subcarriers in one slot. The structure of the radio frame is merely an example. Thus, the number of subframes included in the radio frame, or the number of slots included in the subframe, or the number of OFDM symbols included in the slot may be modified in various manners.

Figure 6:
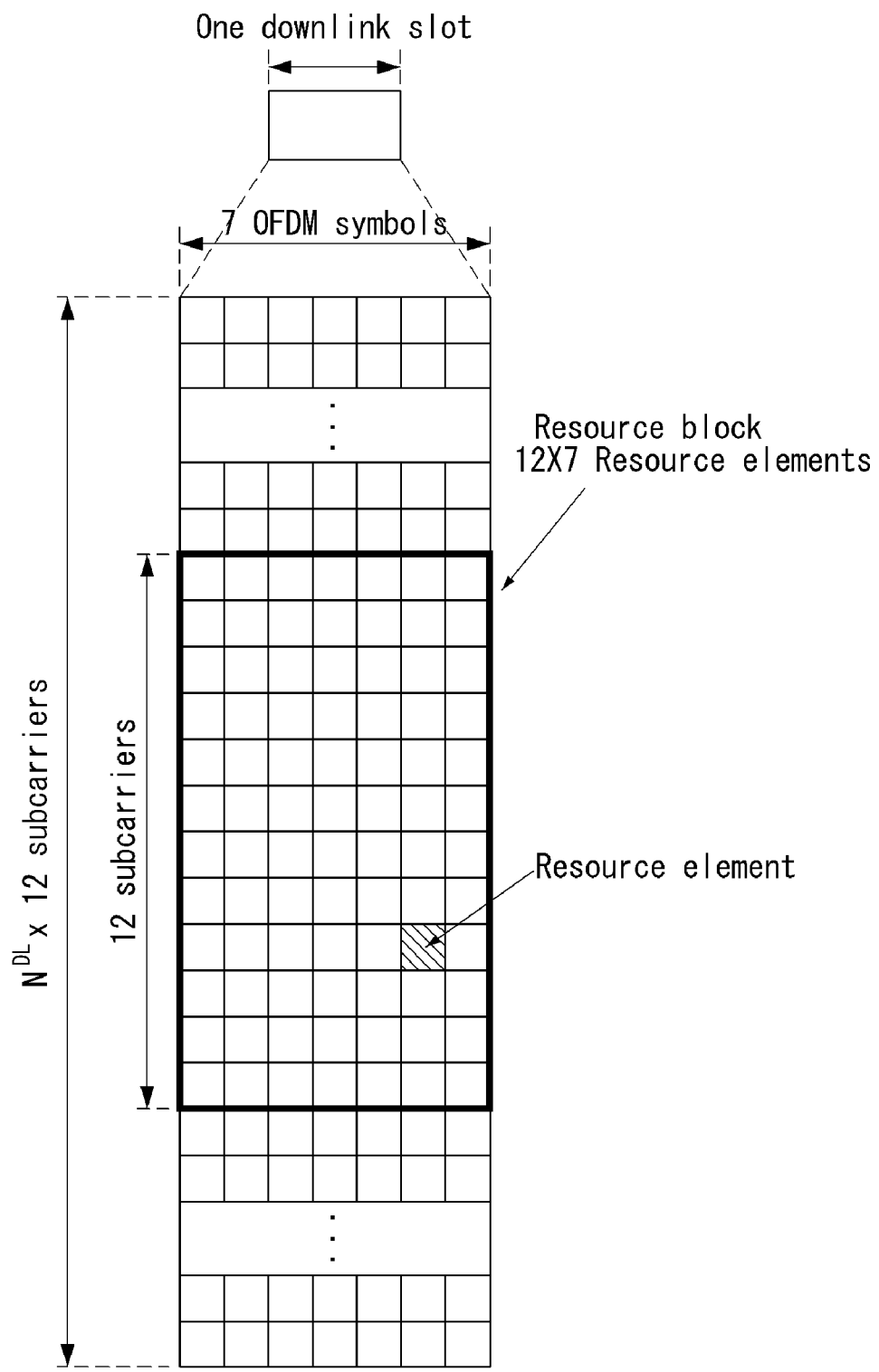
FIG. 6 illustrates an example of a resource grid for a downlink slot.

FIG. 6 is a diagram illustrating an example of a resource grid for a downlink slot.

Referring to FIG. 6, the downlink slot includes the plurality of OFDM symbols in the time domain. Herein, it is exemplarily described that one downlink slot includes 7 OFDM symbols and one resource block (RB) includes 12 subcarriers in the frequency domain, but the present disclosure is not limited thereto. Each element on the resource grid is referred to as a resource element (RE) and one resource block includes 12×7 resource elements. The number of resource blocks included in the downlink slot, NDL is subordinated to a downlink transmission bandwidth. A structure of the uplink slot may be the same as that of the downlink slot.

Figure 7:
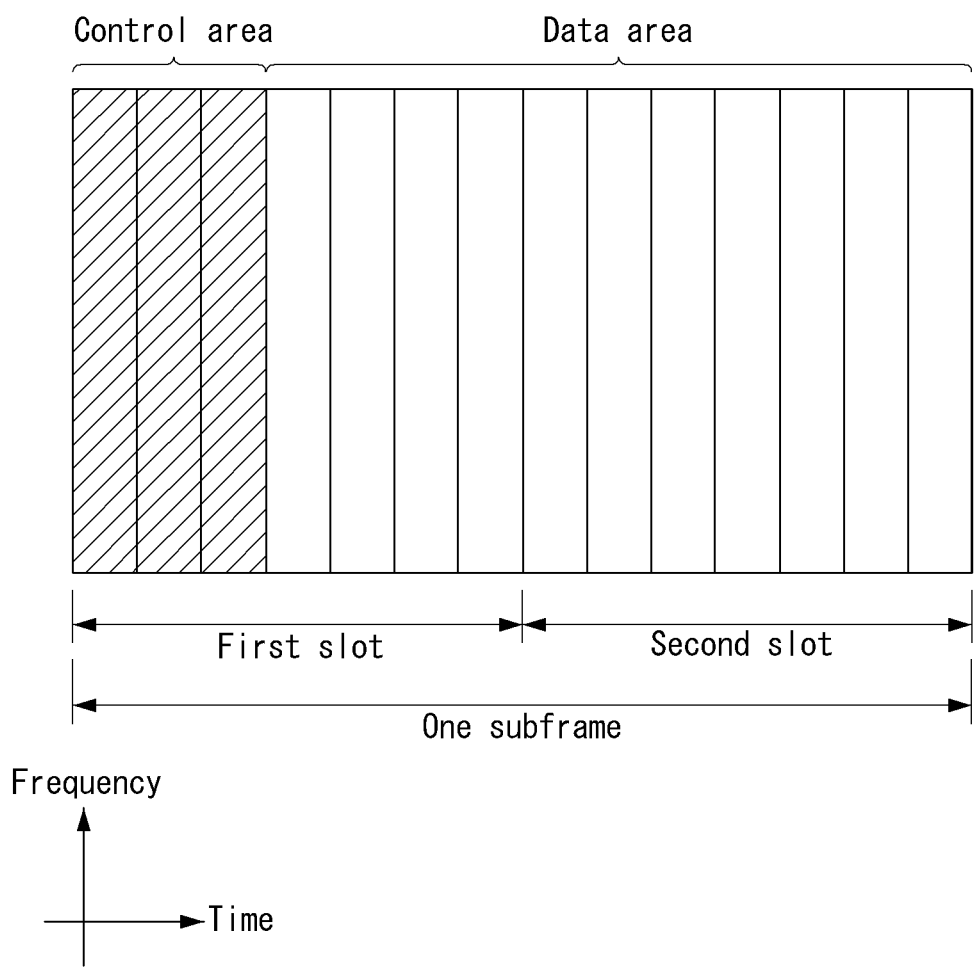
FIG. 7 illustrates an example of a downlink subframe structure.

FIG. 7 illustrates an example of a structure of a downlink subframe.

Referring to FIG. 7, a maximum of three OFDM symbols located in the first half of the first slot within the subframe is a control region to which control channels are allocated. Residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like. The PFCICH is transmitted in the first OFDM symbol of the subframe and transports information on the OFDM symbols used for transmitting the control channels in the subframe. The PHICH which is a response channel to the uplink transports an Acknowledgement (ACK)/Not-Acknowledgement (NACK) signal for a hybrid automatic repeat request (HARD). Control information transmitted through a PDCCH is referred to as downlink control information (DCI). The DCI includes uplink or downlink scheduling information, or an uplink transmission (Tx) power control command for a predetermined UE groups.

The PDCCH may transport A resource allocation and transmission format of a downlink shared channel (DL-SCH), resource allocation information of an uplink shared channel (UL-SCH), paging information in a paging channel (PCH), system information for the DL-SCH, resource allocation for an upper-layer control message such as a random access response transmitted in the PDSCH, a set of Tx power control commands for individual UEs in an arbitrary UE group, a Tx power control command of a voice over IP (VoIP), activation, etc. A plurality of PDCCHs may be transmitted in the control region and the UE may monitor the plurality of PDCCHs. The PDCCH is transmitted on an aggregation of one or a plurality of continuous control channel elements (CCEs). The CCE is a logical allocation unit used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs. The base station (BS) determines the PDCCH format according to the DCI to be transmitted and attaches a cyclic redundancy check (CRC) to the control information. The CRC is masked with a unique identifier (referred to as a radio network temporary identifier (RNTI)) according to an owner or a purpose of the PDCCH. In the case of a PDCCH for a specific UE, the unique identifier of the UE, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble of the UE.

Figure 8:
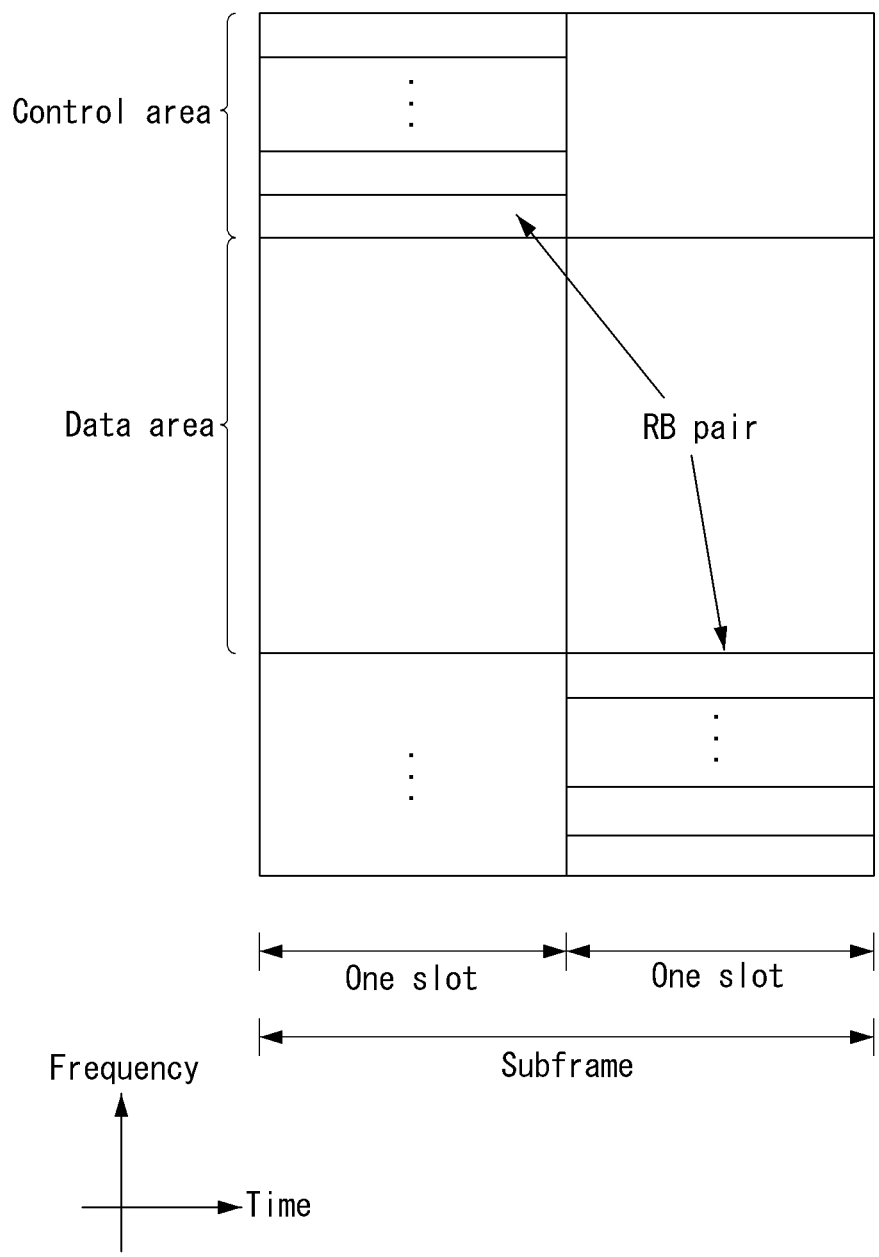
FIG. 8 illustrates an example of an uplink subframe structure.

FIG. 8 illustrates an example of a structure of an uplink subframe.

Referring to FIG. 8, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One UE does not simultaneously transmit the PUCCH and the PUSCH in order to maintain a single carrier characteristic. A resource block (RB) pair in the subframe are allocated to the PUCCH for one UE. RBs included in the RB pair occupy different subcarriers in two slots, respectively. The RB pair allocated to the PUCCH frequency-hops in a slot boundary.

Hereinafter, a frame structure in LTE is described in more detail.

Through LTE specification, unless otherwise noted, the size of various fields in the time domain is expressed as a number of time units $T_s=1/(15000 \times 2048)$ sec.

Downlink and uplink transmissions are organized into radio frames with $T_f=307200 \times T_s=10$ ms duration. Two radio frame structures are supported.

Type 1: applicable to FDD
Type 2: applicable to TDD
Frame Structure Type 1

Frame structure type 1 is applicable to both full duplex and half duplex FDD. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots, where subframe i consists of slots 2i and 2i+1.

For FDD, 10 subframes are available for downlink transmission, and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Figure 9:
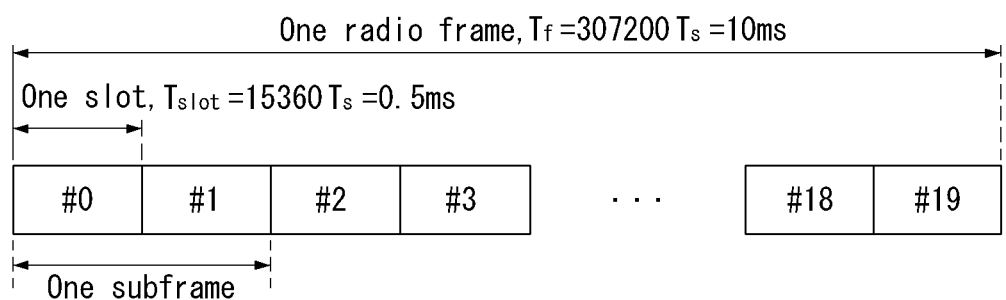
FIG. 9 illustrates an example of frame structure type 1.

FIG. 9 illustrates an example of frame structure type 1.
Frame Structure Type 2

Frame structure type 2 is applicable to TDD. Each radio frame of length $T_f=307200 \times T_s=10$ ms consists of two half-frames of length $15360 \cdot T_s=0.5$ ms each. Each half-frame consists of five subframes of length $30720 \cdot T_s=1$ ms. The supported uplink-downlink configurations are listed in Table 2, where for each subframe in a radio frame, "D" denotes the subframe is reserved for downlink transmissions, "U" denotes the subframe is reserved for uplink transmissions, and "S" denotes a special subframe with the three fields of a downlink pilot time slot (DwPTS), a guard period (GP), and an uplink pilot time slot (UpPTS). The length of DwPTS and UpPTS is given by Table 1 subject to the total length of DwPTS, GP and UpPTS being equal to $30720 \cdot T_s=1$ ms. Each subframe i is defined as two slots, 2i and 2i+1 of length $T_{slot}=15360 \cdot T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

Figure 10:
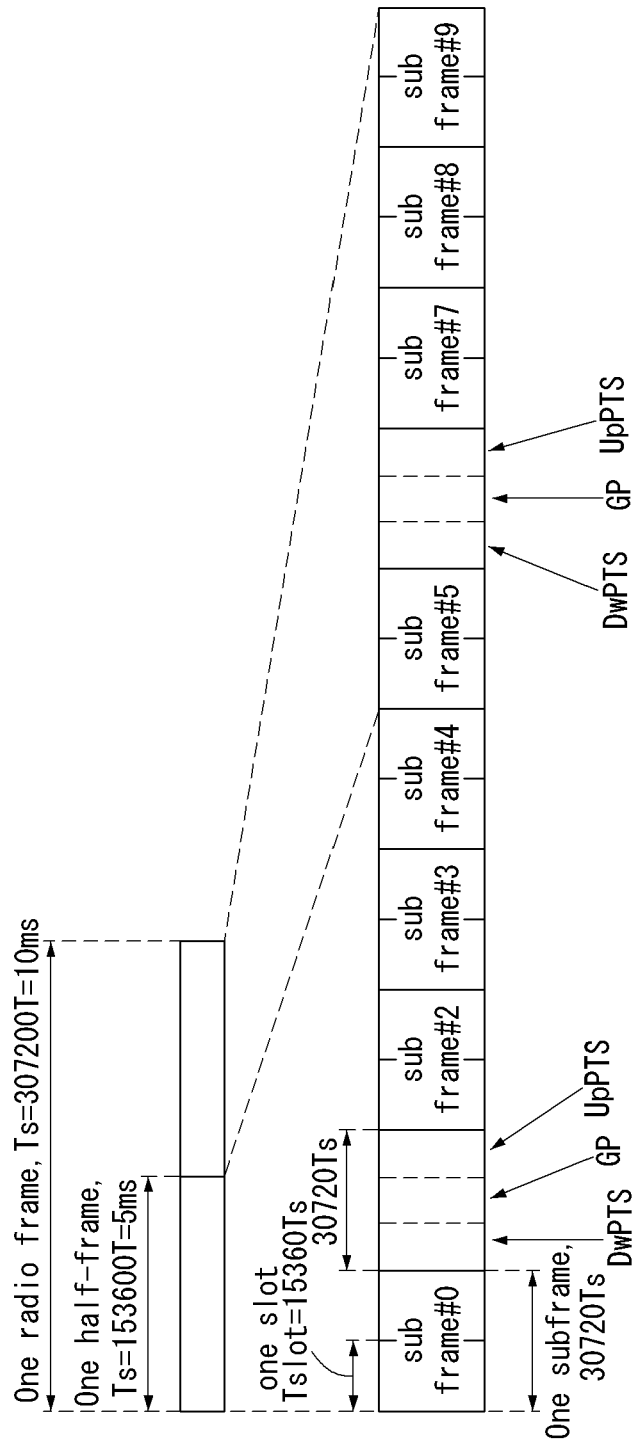
FIG. 10 illustrates another example of frame structure type 2.

FIG. 10 illustrates another example of frame structure type 2.

Table 1 represents an example of configuration of a special subframe.

NB-IoT reuses a channel or signal of the LTE, the NB-IoT may follow the standard defined in the legacy LTE.

Narrowband Primary Synchronization Signal (NPSS)

The sequence $d_l(n)$ used for the narrowband primary synchronization signal is generated from a frequency-domain Zadoff-Chu sequence according to the following Equation 1.

$$d_l(n) = S(l) \cdot e^{-j\frac{\pi u n(n+1)}{11}}, n = 0, 1, \ldots, 10 \qquad \text{[Equation 1]}$$

where the Zadoff-Chu root sequence index u=5 and S(l) for different symbol indices l is given by Table 3.

Table 3 represents an example of S(l).

TABLE 3

| Cyclic prefix length | S(3), . . . , S(13) | | | | | | | | | | |
|---|---|---|---|---|---|---|---|---|---|---|---|
| Normal | 1 | 1 | 1 | 1 | −1 | −1 | 1 | 1 | 1 | −1 | 1 |

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Table 2 shows an example of the uplink-downlink configuration.

TABLE 2

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Narrowband Internet of Things (NB-IoT)

Narrowband Internet of things (NB-IoT) as a standard for supporting low complexity and low cost devices is defined to perform only relatively simple operations compared to legacy LTE devices. The NB-IoT follows a basic structure of LTE, but operates based on contents defined below. If the The same antenna port shall be used for all symbols of the narrowband primary synchronization signal within a subframe.

The UE shall not assume that the narrowband primary synchronization signal is transmitted on the same antenna port as any of the downlink reference signals. The UE shall not assume that the transmissions of the narrowband primary synchronization signal in a given subframe use the same antenna port, or ports, as the narrowband primary synchronization signal in any other subframe.

The sequences $d_l(n)$ shall be mapped to resource elements (k, l) in increasing order of the first index k=0, 1, . . . , $N_{sc}^{RB}=2$ and then the index l=3, 4, . . . , $2N_{symb}^{DL}=1$ in subframe 5 in every radio frame. For resource elements (k, l) overlapping with resource elements where cell-specific reference signals are transmitted, the corresponding sequence element d(n) is not used for the NPSS but counted in the mapping process.

Narrowband Secondary Synchronization Signal (NSSS)

The sequence d(n) used for the narrowband secondary synchronization signal is generated from a frequency-domain Zadoff-Chu sequence according to the following Equation 2.

$$d(n) = b_q(n) \cdot e^{-j2\pi\theta_f n} \cdot e^{-j\frac{\pi u n'(n'+1)}{131}} \quad \text{[Equation 2]}$$

where $n = 0, 1, \ldots, 131$ $n' = n \bmod 131$ $m = n \bmod 128$ $u = N_{ID}^{Ncell} \bmod 126 + 3$ $q = \left\lfloor \frac{N_{ID}^{Ncell}}{126} \right\rfloor$ The binary sequence $b_q(n)$ is given by Table 4. The cyclic shift $\theta_f$ in frame number $n_f$ is given by $$\theta_f = \frac{33}{132}(n_f/2)\bmod 4.$$

Table 4 represents an example of $b_q(n)$.

TABLE 4

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1<br>1 −1 −1 1 1 1 −1 −1 1 −1 1 1 −1 1 −1 −1 1 −1 1 1<br>1 −1 −1 1 1 1 −1 1 −1 1 −1 1 1 1 −1 1 −1 −1 1 −1 −1<br>1 −1 1 1 −1 1 1 −1 1 1 −1 1 1 −1 1 −1 −1 1 −1 1 1 −1 1 −1 −1 1<br>1 −1 1 1 1 −1 1 −1 −1 1 1 1 −1 1 −1 1 1 −1 1 −1 −1 1<br>1 −1 1 1 1 −1 1 1 1 −1 1 −1 1 1 −1 1 −1 −1 1<br>1 1 −1 1 1 −1 1 1 −1] |
| 2 | [1 −1 −1 1 −1 1 1 1 −1 −1 1 1 −1 1 −1 −1 1 −1 1 1 −1<br>1 −1 −1 1 1 1 −1 −1 1 −1 1 1 1 −1 1 −1 −1 1<br>1 1 −1 1 1 −1 1 1 1 −1 1 −1 −1 1 1 −1 1 −1 1 1 1 −1<br>1 −1 −1 1 1 1 −1 1 −1 1 1 1 −1 1 1 −1 1 −1 −1 1<br>1 −1 1 1 −1 1 −1 1 1 1 −1 1 1 −1 1 1 −1 1 −1 1<br>1 −1 1 −1 1 1 1 −1 1 1 −1 1 1 1 −1 1 −1 −1 1 1 −1 1<br>1 −1 1 1 1 −1 1 −1 1 1]|
| 3 | [1 −1 −1 1 −1 1 1 1 −1 −1 1 1 −1 1 −1 −1 1 −1 1 1 −1<br>1 −1 −1 1 1 1 −1 −1 1 −1 1 1 1 −1 1 −1 −1 1<br>1 1 −1 1 1 −1 1 1 1 −1 1 −1 −1 1 1 −1 1 −1 1 1 1 −1<br>1 −1 −1 1 1 1 −1 1 −1 1 1 1 −1 1 −1 1 1 −1 1 1 1 −1<br>1 −1 −1 1 −1 1 1 1 −1 1 1 1 −1 1 −1 −1 1 1 1 −1 1<br>1 −1 1 1 1 −1 1 1 1 −1 1 −1 1 1 1 −1 1 −1 −1 1<br>1 1 −1 1 1 −1 1 1 −1] |

The same antenna port shall be used for all symbols of the narrowband secondary synchronization signal within a subframe.

The UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe.

The sequence d(n) shall be mapped to resource elements (k, l) in sequence starting with d(0) in increasing order of the first index k over the 12 assigned subcarriers and then the index l over the assigned last $N_{symb}^{NSSS}$ symbols in radio frames fulfilling $n_f \bmod 2=0$, where $N_{symb}^{NSSS}$ is given by Table 5.

Table 5 represents an example of the number of NSSS symbols.

TABLE 5

| Cyclic prefix length | $N_{symb}^{NSSS}$ |
|---|---|
| Normal | 11 |

For resource elements (k, l) overlapping with resource elements where cell-specific reference signals are transmitted, the corresponding sequence element d(n) is not used for the NSSS but counted in the mapping process.

Scrambling

Scrambling is done according to clause 6.6.1 of 3GPP TS 36.211 with $M_{bit}$ denoting the number of bits to be transmitted on the NPBCH. $M_{bit}$ equals 1600 for normal cyclic prefix. The scrambling sequence is initialized with $c_{init}=N_{ID}^{Ncell}$ in radio frames fulfilling $n_f \bmod 64=0$.

Modulation

Modulation is done according to clause 6.6.2 of TS 36.211 using the modulation scheme in Table 10.2.4.2-1.

Table 6 represents an example of a modulation scheme for NPBCH.

TABLE 6

| Physical channel | Modulation scheme |
|---|---|
| NPBCH | QPSK |

Layer Mapping and Precoding

Layer mapping and precoding are done according to clause 6.6.3 of 3GPP TS 36.211 with P∈{1,2}. The UE assumes antenna ports $R_{2000}$ and $R_{2001}$ are used for the transmission of the narrowband physical broadcast channel.

Mapping to Resource Elements

The block of complex-valued symbols $y^{(p)}(0), \ldots y^{(p)}(M_{symb}=1)$ for each antenna port is transmitted in subframe 0 during 64 consecutive radio frames starting in each radio frame fulfilling $n_f \bmod 64=0$ and shall be mapped in sequence starting with y(0) to resource elements (k, l). The mapping to resource elements (k, l) not reserved for transmission of reference signals shall be in increasing order of first the index k, then the index l. After mapping to a subframe, the subframe is repeated in subframe 0 in the 7 following radio frames, before continuing the mapping of $y^{(p)}(\cdot)$ to subframe 0 in the following radio frame. The first three OFDM symbols in a subframe are not be used in the mapping process.

For the purpose of the mapping, the UE assumes cell-specific reference signals for antenna ports 0-3 and narrowband reference signals for antenna ports 2000 and 2001 being present irrespective of the actual configuration. The frequency shift of the cell-specific reference signals shall be calculated by replacing $N_{ID}^{cell}$ with $N_{ID}^{Ncell}$ in the calculation of $v_{shift}$ in clause 6.10.1.2 of 3GPP TS 36.211.

Next, information related to MIB-NB and SIBN1-NB is described in detail.

MasterInformationBlock-NB

The MasterInformationBlock-NB includes system information transmitted on BCH.

Signalling radio bearer: N/A
RLC-SAP: TM
Logical channel: BCCH
Direction: E-UTRAN to UE Table 7 below represents an example of MasterInformationBlock-NB format.

TABLE 7

```
-- ASN1START
MasterInformationBlock-NB ::=         SEQUENCE {
    systemFrameNumber-MSB-r13             BIT STRING (SIZE (4)),
    hyperSFN-LSB-r13                      BIT STRING (SIZE (2)),
    schedulingInfoSIB1-r13                INTEGER (0..15),
    systemInfoValueTag-r13                INTEGER (0..31),
    ab-Enabled-r13                        BOOLEAN,
    operationModeInfo-r13                 CHOICE {
        inband-SamePCI-r13                    Inband-SamePCI-NB-r13,
        inband-DifferentPCI-r13               Inband-DifferentPCI-NB-r13,
        guardband-r13                         Guardband-NB-r13,
        standalone-r13                        Standalone-NB-r13
    },
    spare                                 BIT STRING (SIZE (11))
}
ChannelRasterOffset-NB-r13 ::=        ENUMERATED {khz-7dot5, khz-2dot5, khz2dot5, khz7dot5}
Guardband-NB-r13 ::=                  SEQUENCE {
    rasterOffset-r13                      ChannelRasterOffset-NB-r13,
    spare                                 BIT STRING (SIZE (3))
}
Inband-SamePCI-NB-r13 ::=             SEQUENCE {
    eutra-CRS-SequenceInfo-r13            INTEGER (0..31)
}
Inband-DifferentPCI-NB-r13 ::=        SEQUENCE {
    eutra-NumCRS-Ports-r13                ENUMERATED {same, four},
    rasterOffset-r13                      ChannelRasterOffset-NB-r13,
    spare                                 BIT STRING (SIZE (2))
}
Standalone-NB-r13 ::=                 SEQUENCE {
    spare                                 BIT STRING (SIZE (5))
}
-- ASN1STOP
```

Table 8 below represents description of MasterInformationBlock-NB field.

TABLE 8

| MasterInformationBlock-NB Field Descriptions |
| --- |
| ab-Enabled |
| Value TRUE indicates that access barring is enabled and that the UE shall acquire SystemInformationBlockType14-NB before initiating RRC connection establishment or resume. |
| eutra-CRS-SequenceInfo |
| Information of the carrier containing NPSS/NSSS/NPBCH. Each value is associated with an E-UTRA PRB index as an offset from the middle of the LTE system sorted out by channel raster offset. |
| eutra-NumCRS-Ports |
| Number of E-UTRA CRS antenna ports, either the same number of ports as NRS or 4 antenna ports. |
| hyperSFN-LSB |
| Indicates the 2 least significant bits of hyper SFN. The remaining bits are present in SystemInformationBlockType1-NB. |
| operationModeInfo |

TABLE 8-continued

MasterInformationBlock-NB Field Descriptions

Deployment scenario (in-band/guard-band/standalone) and related information. See TS 36.211 [21] and TS 36.213 [23].
Inband-SamePCI indicates an in-band deployment and that the NB-IoT and LTE cell share the same physical cell id and have the same number of NRS and CRS ports.
Inband-DifferentPCI indicates an in-band deployment and that the NB-IoT and LTE cell have different physical cell ID.
guardband indicates a guard-band deployment.
standalone indicates a standalone deployment.
rasterOffset
NB-IoT offset from LTE channel raster. Unit in kHz in set {−7.5, −2.5, 2.5, 7.5}.
schedulingInfoSIB1
This field contains an index to a table specified in TS 36.213 [23, Table 16.4.1.3-3] that defines SystemInformationBlockType1-NB scheduling information.
systemFrameNumber-MSB
Defines the 4 most significant bits of the SFN. As indicated in TS 36.211 [21], the 6 least significant bits of the SFN are acquired implicitly by decoding the NPBCH.
systemInfoValueTag
Common for all SIBs other than MIB-NB, SIB14-NB and SIB16-NB.

SystemInformationBlockType1-NB

The SystemInformationBlockType1-NB message contains information relevant when evaluating if a UE is allowed to access a cell and defines the scheduling of other system information.

Signalling radio bearer: N/A
RLC-SAP: TM
Logical channel: BCCH
Direction: E-UTRAN to UE Table 9 represents an example of SystemInformationBlockType1 (SIB1)-NB message.

TABLE 9

```
-- ASN1START
SystemInformationBlockType1-NB ::=       SEQUENCE {
    hyperSFN-MSB-r13                         BIT STRING (SIZE (8)),
    cellAccessRelatedInfo-r13                SEQUENCE {
        plmn-IdentityList-r13                    PLMN-IdentityList-NB-r13,
        trackingAreaCode-r13                     TrackingAreaCode,
        cellIdentity-r13                         CellIdentity,
        cellBarred-r13                           ENUMERATED {barred, notBarred},
        intraFreqReselection-r13                 ENUMERATED {allowed, notAllowed}
    },
    cellSelectionInfo-r13                    SEQUENCE {
        q-RxLevMin-r13                           Q-RxLevMin,
        q-QualMin-r13                            Q-QualMin-r9
    },
    p-Max-r13                                P-Max                              OPTIONAL,    -- Need OP
    freqBandIndicator-r13                    FreqBandIndicator-NB-r13,
    freqBandInfo-r13                         NS-PmaxList-NB-r13                 OPTIONAL,    - Need OR
    multiBandInfoList-r13                    MultiBandInfoList-NB-r13           OPTIONAL,    -- Need OR
    downlinkBitmap-r13                       DL-Bitmap-NB-r13                   OPTIONAL,
    eutraControlRegionSize-r13               ENUMERATED {n1, n2, n3}            OPTIONAL,    -- Cond inband
    nrs-CRS-PowerOffset-r13                  ENUMERATED {dB-6,  dB-4dot77, dB-3,
                                                         dB-1dot77,   dB0,         dB1,
                                                         dB1dot23,    dB2,         dB3,
                                                         dB4,         dB4dot23,    dB5,
                                                         dB6,         dB7,         dB8,
                                                         dB9}                      OPTIONAL,    -- Cond inband-SamePCI
    schedulingInfoList-r13                   SchedulingInfoList-NB-r13,
    si-WindowLength-r13                      ENUMERATED {ms160, ms320, ms480, ms640,
                                                         ms960, ms1280, ms1600, spare1},
    si-RadioFrameOffset-r13                  INTEGER (1..15)                    OPTIONAL,    -- Need OP
    systemInfoValueTagList-r13               SystemInfoValueTagList-NB-r13      OPTIONAL,
    lateNonCriticalExtension                 OCTET STRING                       OPTIONAL,
    nonCriticalExtension                     SEQUENCE { }                       OPTIONAL
}
```

TABLE 9-continued

| | |
|---|---|
| PLMN-IdentityList-NB-r13 ::= | SEQUENCE (SIZE (1..maxPLMN-r11)) OF PLMN-IdentityInfo-NB-r13 |
| PLMN-IdentityInfo-NB-r13 ::= | SEQUENCE { |
|     plmn-Identity-r13 |     PLMN-Identity, |
|     cellReservedForOperatorUse-r13 |     ENUMERATED {reserved, notReserved}, |
|     attachWithoutPDN-Connectivity-r13 |     ENUMERATED {true}     OPTIONAL -- Need OP |
| } | |
| SchedulingInfoList-NB-r13 ::= | SEQUENCE (SIZE (1..maxSI-Message-NB-r13)) OF SchedulingInfo-NB-r13 |
| SchedulingInfo-NB-r13::= | SEQUENCE { |
|     si-Periodicity-r13 |     ENUMERATED {rf64, rf128, rf256, rf512, rf1024, rf2048, rf4096, spare}, |
|     si-RepetitionPattern-r13 |     ENUMERATED {every2ndRF, every4thRF, every8thRF, every16thRF}, |
|     sib-MappingInfo-r13 |     SIB-MappingInfo-NB-r13, |
|     si-TB-r13 |     ENUMERATED {b56, b120, b208, b256, b328, b440, b552, b680} |
| } | |
| SystemInfoValueTagList-NB-r13 ::= OF | SEQUENCE (SIZE (1.. maxSI-Message-NB-r13)) |
| | SystemInfoValueTagSI-r13 |
| SIB-MappingInfo-NB-r13 ::= NB-r13 | SEQUENCE (SIZE (0..maxSIB-1)) OF SIB-Type- |
| SIB-Type-NB-r13 ::= | ENUMERATED { |
| sibType3-NB-r13, r13, | sibType4-NB-r13, sibType5-NB- |
| | sibType14-NB-r13, sibType16-NB-r13, spare3, |
| spare2, spare1} | |
| -- ASN1STOP | |

Table 10 represents description of SystemInformation-BlockType1-NB filed.

TABLE 10

SystemInformationBlockType1-NB Field Descriptions attachWithoutPDN-Connectivity
If present, the field indicates that attach without PDN connectivity as specified in TS 24.301
[35] is supported for this PLMN.
CellBarred
Barred means the cell is barred, as defined in TS 36.304 [4].
cellIdentity
Indicates the cell identity.
cellReservedForOperatorUse
As defined in TS 36.304 [4].
cellSelectionInfo
Cell selection information as specified in TS 36.304 [4].
downlinkBitmap
NB-IoT downlink subframe configuration for downlink transmission.
If the bitmap is not present, the UE shall assume that all subframes are valid (except for
subframes carrying NPSS/NSSS/NPBCH/SIB1-NB) as specified in TS 36.213[23].
eutraControlRegionSize
Indicates the control region size of the E-UTRA cell for the in-band operation mode. Unit is in
number of OFDM symbols.
freqBandIndicator
A list of as defined in TS 36.101 [42, Table 6.2.4-1] for the frequency band in
freqBandIndicator.
freqBandInfo
A list of additionalPmax and additionalSpectrumEmission values as defined in TS 36.101 [42,
Table 6.2.4-1] for the frequency band in freqBandInfofreqBandIndicator.
hyperSFN-MSB
Indicates the 8 most significant bits of hyper-SFN. Together with hyperSFN-LSB in MIB-NB,
the complete hyper-SFN is built up. hyper-SFN is incremented by one when the SFN wraps
around.
intraFreqReselection
Used to control cell reselection to intra-frequency cells when the highest ranked cell is barred,
or treated as barred by the UE, as specified in TS 36.304 [4].
multiBandInfoList
A list of additional frequency band indicators, additionalPmax and
additionalSpectrumEmission values, as defined in TS 36.101 [42, Table 5.5-1]. If the UE
supports the frequency band in the freqBandIndicator IE it shall apply that frequency band.
Otherwise, the UE shall apply the first listed band which it supports in the multiBandInfoList
IE.
nrs-CRS-PowerOffset
NRS power offset between NRS and E-UTRA CRS. Unit in dB. Default value of 0.
plmn-IdentityList TABLE 10-continued SystemInformationBlockType1-NB Field Descriptions List of PLMN identities. The first listed PLMN-Identity is the primary PLMN.
p-Max
Value applicable for the cell. If absent, the UE applies the maximum power according to the UE capability.
q-QualMin
Parameter "$Q_{qualmin}$" in TS 36.304 [4].
q-RxLevMin
Parameter $Q_{rxlevmin}$ in TS 36.304 [4]. Actual value $Q_{rxlevmin}$ = IE value * 2 [dB].
schedulingInfoList
Indicates additional scheduling information of SI messages.
si-Periodicity
Periodicity of the Si-message in radio frames, such that rf256 denotes 256 radio frames, rf512 denotes 512 radio frames, and so on.
si-RadioFrameOffset
Offset in number of radio frames to calculate the start of the SI window.
If the field is absent, no offset is applied.
si-RepetitionPattern
Indicates the starting radio frames within the SI window used for SI message transmission.
Value every2ndRF corresponds to every second radio frame, value every4thRF corresponds to every fourth radio frame and so on starting from the first radio frame of the SI window used for SI transmission.
si-TB
This field indicates the transport block size in number of bits used to broadcast the SI message.
si-WindowLength
Common SI scheduling window for all SIs. Unit in milliseconds, where ms160 denotes 160 milliseconds, ms320 denotes 320 milliseconds, and so on.
sib-MappingInfo
List of the SIBs mapped to this Systeminformation message. There is no mapping information of SIB2; it is always present in the first Systeminformation message listed in the schedulingInfoList list.
sy steminfo ValueTagList
Indicates SI message specific value tags. It includes the same number of entries, and listed in the same order, as in SchedulingInfoList.
systeminfoValueTagSI
SI message specific value tag as specified in Clause 5.2.1.3. Common for all SIBs within the SI message other than SIB14.
trackingAreaCode
AtrackingAreaCode that is common for all the PLMNs listed.

TABLE 11

| Conditional presence | Explanation |
| --- | --- |
| In-band | The field is mandatory present if IE operationModeInfo in MIB-NB is set to inband-SamePCI or inband-DifferentPCI. Otherwise the field is not present. |
| In-band-SamePCI | The field is mandatory present, if IE operationModeInfo in MIB-NB is set to inband-SamePCI. Otherwise the field is not present. |

Uplink
The following narrowband physical channels are defined.
Narrowband Physical Uplink Shared Channel, NPUSCH
Narrowband Physical Random Access Channel, NPRACH
The following uplink narrowband physical signals are defined.
Narrowband demodulation reference signal
In terms of $N_{sc}^{UL}$ an uplink bandwidth and slot duration $T_{slot}$ are given by Table 12 below.
Table 12 shows an example of NB-IoT parameters.

TABLE 12

| Subcarrier spacing | $N_{sc}^{UL}$ | $T_{slot}$ |
| --- | --- | --- |
| $\Delta f$ = 3.75 kHz | 48 | 61440 · $T_s$ |
| $\Delta f$ = 15 kHz | 12 | 15360 · $T_s$ |

A single antenna port p=0 is used for all the uplink transmissions.

Resource Unit

Resource units are used to describe the mapping of the NPUSCH to resource elements. A resource unit is defined as $N_{symb}^{UL} N_{slots}^{UL}$ consecutive symbols in the time domain and $N_{sc}^{RU}$ consecutive subcarriers in the frequency domain, where $N_{sc}^{RU}$ and $N_{symb}^{UL}$ are given by Table 13.

Table 13 shows an example of supported combinations of $N_{sc}^{RU}$, $N_{slots}^{UL}$ and $N_{symb}^{UL}$.

TABLE 13

| NPUSCH format | $\Delta f$ | $N_{sc}^{RU}$ | $N_{slots}^{UL}$ | $N_{symb}^{UL}$ |
| --- | --- | --- | --- | --- |
| 1 | 3.75 kHz | 1 | 16 | 7 |
|  | 15 kHz | 1 | 16 |  |
|  |  | 3 | 8 |  |
|  |  | 6 | 4 |  |
|  |  | 12 | 2 |  |
| 2 | 3.75 kHz | 1 | 4 |  |
|  | 15 kHz | 1 | 4 |  |

Narrowband Uplink Shared Channel (NPUSCH)

The narrowband physical uplink shared channel supports two formats:
NPUSCH format 1, used to carry the UL-SCH
NPUSCH format 2, used to carry uplink control information Scrambling shall be done according to clause 5.3.1 of TS36.211. The scrambling sequence generator shall be initialized with with $c_{ini}=n_{RNTI} \cdot 2^{14}+n_f \mod 2 \cdot 2^{13}+\lfloor n_s/2 \rfloor + N_{ID}^{Ncell}$ where $n_s$ is the first slot of the transmission of the codeword. In case of NPUSCH repetitions, the scrambling sequence shall be reinitialized according to the above formula after every $M_{idendical}^{NPUSCH}$ transmission of the codeword with $n_s$ and $n_f$ set to the first slot and the frame, respectively, used for the transmission of the repetition. The quantity $M_{idendical}^{NPUSCH}$ is given by clause 10.1.3.6 in TS36.211.

Table 14 specifies the modulation mappings applicable for the narrowband physical uplink shared channel.

TABLE 14

| NPUSCH format | $N_{sc}^{RU}$ | Modulation scheme |
|---|---|---|
| 1 | 1 | BPSK, QPSK |
|   | >1 | QPSK |
| 2 | 1 | BPSK |

NPUSCH can be mapped to one or more than one resource units, $N_{RU}$, as given by clause of 3GPP TS 36.213, each of which is transmitted $M_{rep}^{NPUSCH}$ times.

The block of complex-valued symbols $z(0), z(M_{rep}^{NPUSCH}-1)$ is multiplied with the amplitude scaling factor $\beta_{NPUSCH}$ in order to conform to the transmit power $P_{NPUSCH}$ specified in 3GPP TS 36.213, and mapped in sequence starting with $z(0)$ to subcarriers assigned for transmission of NPUSCH. The mapping to resource elements (k, l) corresponding to the subcarriers assigned for transmission and not used for transmission of reference signals, is in increasing order of first the index k, then the index l, starting with the first slot in the assigned resource unit.

After mapping to $N_{slots}$ slots, the $N_{slots}$ slots are repeated $M_{idendical}^{NPUSCH}-1$ additional times, before continuing the mapping of $z(\cdot)$ to the following slot, where the following Equation 3 is repeated until the slots have been transmitted.

$$M_{idendical}^{NPUSCH} = \begin{cases} \min(\lceil M_{rep}^{NPUSCH}/2 \rceil, 4) & N_{sc}^{RU} > 1 \\ 1 & N_{sc}^{RU} = 1 \end{cases}$$ [Equation 3]

$$N_{slots} = \begin{cases} 1 & \Delta f = 3.75 \text{ kHz} \\ 2 & \Delta f = 15 \text{ kHz} \end{cases}$$

If the mapping to the $N_{slots}$ slots or the repetition of mapping includes resource elements overlapping any configured NPRACH resource according to NPRACH-ConfigSIB-NB, NPUSCH transmission of the overlapped $N_{slots}$ slots is postponed until next $N_{slots}$ slots do nopt overlap any configured NPRACH resource.

The mapping of $z(0), z(M_{rep}^{NPUSCH}-1))$ is repeated until $M_{rep}^{NPUSCH} N_{RU} N_{slots}^{UL}$ slots are transmitted. After transmissions and/or postponements due to NPRACH of $256 \cdot 30720 T_s$ time units, a gap of $40 \cdot 30720 T_s$ time units is inserted where the NPUSCH transmission is postponed. The portion of a postponement due to NPRACH which coincides with a gap is counted as part of the gap.

When higher layer parameter npusch-AllSymbols is set to false, resource elements in SC-FDMA symbols overlapping with a symbol configured with SRS according to srs-SubframeConfig are counted in the NPUSCH mapping but not used for transmission of the NPUSCH. When higher layer parameter npusch-AllSymbols is set to true, all symbols are transmitted.

Uplink Control Information on NPUSCH without UL-SCH Data

The one bit information of HARQ-ACK $o_0^{ACK}$ is coded according to Table 6, where for a positive acknowledgement of $o_0^{ACK}=1$ and for a negative acknowledgement $o_0^{ACK}=0$.

Table 15 represents an example of HARQ-ACK code words.

TABLE 15

| HARQ-ACK $<o_0^{ACK}>$ | HARQ-ACK $<b_0, b_1, b_2, \ldots, b_{15}>$ |
|---|---|
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |

Power Control

The UE transmit power for NPUSCH transmission in NB-IoT UL slot i for the serving cell is given by the following Equations 4 and 5.

If the number of repetitions of the allocated NPUSCH RUs is greater than 2, $$P_{NPUSCH,c}(i) = P_{CMAX,c}(i) [dBm]$$ [Equation 4]

otherwise, $$P_{NPUSCH,c}(i) = \min \begin{Bmatrix} P_{CMAX,c}(i), \\ 10\log_{10}(M_{NPUSCH,c}(i)) + \\ P_{O\_NPUSCH,c}(j) + \alpha_c(j) \cdot PL_c \end{Bmatrix} [dBm]$$ [Equation 5]

where, $P_{CMAX,c}(i)$ is the configured UE transmit power defined in 3GPP TS 36.101 in NB-IoT UL slot i for serving cell c.

$M_{NPUSCH,c}$ is $\{1/4\}$ for 3.75 kHz subcarrier spacing, and is $\{1, 3, 6, 12\}$ for 15 kHz subcarrier spacing.

$P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided by higher layers for j=1 and for serving cell c, where $j \in \{1,2\}$. For NPUSCH (re)transmissions corresponding to a dynamic scheduled grant then j=1 and for NPUSCH (re)transmissions corresponding to the random access response grant then j=2.

$P_{O\_UE\_NPUSCH,c}(2)=0$ and $P_{O\_NOMINAL\_NPUSCH,c}(2)=P_{O\_PRE}+\Delta_{PREAMBLE\_Msg3}$, where the parameter preambleInitialReceivedTargetPower $P_{O\_PRE}$ and $\Delta_{PREAMBLE\_Msg3}$ are signalled from higher layers for serving cell c.

For j=1, for NPUSCH format 2, $\alpha_c(j)=1$; for NPUSCH format 1, $\alpha_c(j)$ is provided by higher layers for serving cell c. For j=2, $\alpha_c(j)=1$.

$PL_c$ is the downlink path loss estimate calculated in the UE for serving cell c in dB and $PL_c$=nrs-Power+nrs-PowerOffsetNonAnchor–higher layer filtered NRSRP, where nrs-Power is provided by higher layers and subclause 16.2.2 in 3GPP 36.213, nrs-powerOffsetNonAnchor is set to zero if it is not provided by higher layers and NRSRP is defined in 3GPP TS 36.214 for serving cell c and the higher layer filter configuration is defined in 3GPP TS 36.331 for serving cell c.

If the UE transmits NPUSCH in NB-IoT UL slot i for serving cell c, power headroom is computed using the following Equation 6.

$$PH_c(i) = P_{CMAX,c}(i) - \{P_{O\_NPUSCH,c}(1) + \alpha_c(1) \cdot PL_c\} [db] \quad \text{[Equation 6]}$$

UE Procedure for Transmitting Format 1 NPUSCH

A UE, upon detection on a given serving cell of a NPDCCH with DCI format N0 ending in NB-IoT DL subframe n intended for the UE, performs, at the end of n+$k_0$ DL subframe, a corresponding NPUSCH transmission using NPUSCH format 1 in N consecutive NB-IoT UL slots $n_i$ with i=0, 1, . . . , N−1 according to the NPDCCH information, where subframe n is the last subframe in which the NPDCCH is transmitted and is determined from the starting subframe of NPDCCH transmission and the DCI subframe repetition number field in the corresponding DCI, and $N = N_{Rep} N_{RU} N_{slots}^{UL}$, where the value of $N_{REP}$ is determined by the repetition number field in the corresponding DCI, the value of $N_{RU}$ is determined by the resource assignment field in the corresponding DCI, and the value of $N_{slots}^{UL}$ is the number of NB-IoT UL slots of the resource unit corresponding to the allocated number of subcarriers in the corresponding DCI.

$n_0$ is the first NB-IoT UL slot starting after the end of subframe n+$k_0$.

The value of $k_0$ is determined by the scheduling delay field ($I_{Delay}$) in the corresponding DCI according to Table 7.

Table 16 represents an example of $k_0$ for DCI format N0.

TABLE 16

| $I_{Delay}$ | $k_0$ |
|---|---|
| 0 | 8 |
| 1 | 16 |
| 2 | 32 |
| 3 | 64 |

The resource allocation information in uplink DCI format N0 for NPUSCH transmission indicates to a scheduled UE.
- a set of contiguously allocated subcarriers ($n_{sc}$) of a resource unit determined by the subcarrier indication field in the corresponding DCI,
- a number of resource units ($N_{RU}$) determined by the resource assignment field in the corresponding DCI according to Table 18,
- a repetition number ($N_{Rep}$) determined by the repetition number field in the corresponding DCI according to Table 19.

The subcarrier spacing Δf of NPUSCH transmission is determined by the uplink subcarrier spacing field in the narrowband random access response grant according to subclause 16.3.3 in 3GPP TS 36.213.

For NPUSCH transmission with subcarrier spacing Δf=3.75 kHz, $n_{sc}=I_{SC}$, where $I_{SC}$ is the subcarrier indication field in the DCI.

For NPUSCH transmission with subcarrier spacing Δf=15 kHz, the subcarrier indication field ($I_{SC}$) in the DCI determines the set of contiguously allocated subcarriers ($n_{sc}$) according to Table 8.

Table 17 represents an example of allocated subcarriers for NPUSCH with Δf=15 kHz.

TABLE 17

| Subcarrier indication field ($I_{sc}$) | Set of Allocated subcarriers ($n_{sc}$) |
|---|---|
| 0-11 | $I_{sc}$ |
| 12-15 | 3($I_{sc}$ − 12) + {0, 1, 2} |
| 16-17 | 6($I_{sc}$ − 16) + {0, 1, 2, 3, 4, 5} |
| 18 | {0, 1, 2, 3, 4, 5, 6, 7, 8, 9, 10, 11} |
| 19-63 | Reserved |

Table 18 represents an example of the number of resource units for NPUSCH.

TABLE 18

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 19 represents an example of the number of repetitions for NPUSCH.

TABLE 19

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Demodulation Reference Signal (DMRS)

The reference signal sequence $\bar{r}_u(n)$ for $N_{sc}^{RU}=1$ is defined by the following Equation 7.

$$\bar{r}_u(n) = \frac{1}{\sqrt{2}}(1 + j)(1 - 2c(n))w(n \bmod 16), \quad \text{[Equation 7]}$$

$$0 \le n < M_{rep}^{NPUSCH} N_{RU} N_{slots}^{UL}$$

where the binary sequence c(n) is defined by clause 7.2 of TS 36.211 and shall be initialized with $c_{init}=35$ at the start of the NPUSCH transmission. The quantity w(n) is given by Table 20 where $u = N_{ID}^{Ncell} \bmod 16$ for NPUSCH format 2, and for NPUSCH format 1 if group hopping is not enabled, and by clause 10.1.4.1.3 of 3GPP TS 36.211 if group hopping is enabled for NPUSCH format 1.

Table 20 represents an example of w(n).

TABLE 20

| u | w(0), ..., w(15) |
|---|---|
| 0  | 1  1  1  1   1  1  1  1   1  1  1  1   1  1  1  1 |
| 1  | 1 -1  1 -1   1 -1  1 -1   1 -1  1 -1   1 -1  1 -1 |
| 2  | 1  1 -1 -1   1  1 -1 -1   1  1 -1 -1   1  1 -1 -1 |
| 3  | 1 -1 -1  1   1 -1 -1  1   1 -1 -1  1   1 -1 -1  1 |
| 4  | 1  1  1  1  -1 -1 -1 -1   1  1  1  1  -1 -1 -1 -1 |
| 5  | 1 -1  1 -1  -1  1 -1  1   1 -1  1 -1  -1  1 -1  1 |
| 6  | 1  1 -1 -1  -1 -1  1  1   1  1 -1 -1  -1 -1  1  1 |
| 7  | 1 -1 -1  1  -1  1  1 -1   1 -1 -1  1  -1  1  1 -1 |
| 8  | 1  1  1  1   1  1  1  1  -1 -1 -1 -1  -1 -1 -1 -1 |
| 9  | 1 -1  1 -1   1 -1  1 -1  -1  1 -1  1  -1  1 -1  1 |
| 10 | 1  1 -1 -1   1  1 -1 -1  -1 -1  1  1  -1 -1  1  1 |
| 11 | 1 -1 -1  1   1 -1 -1  1  -1  1  1 -1  -1  1  1 -1 |
| 12 | 1  1  1  1  -1 -1 -1 -1  -1 -1 -1 -1   1  1  1  1 |
| 13 | 1 -1  1 -1  -1  1 -1  1  -1  1 -1  1   1 -1  1 -1 |
| 14 | 1  1 -1 -1  -1 -1  1  1  -1 -1  1  1   1  1 -1 -1 |
| 15 | 1 -1 -1  1  -1  1  1 -1  -1  1  1 -1   1 -1 -1  1 |

The reference signal sequence for NPUSCH format 1 is given by the following Equation 8.

$$r_u(n) = \bar{r}_u(n) \quad \text{[Equation 8]}$$

The reference signal sequence for NPUSCH format 2 is given by the following Equation 9.

$$r_u(3n+m) = \bar{w}(m)\bar{r}_u(n), \quad m=0,1,2 \quad \text{[Equation 9]}$$

where $\bar{w}(m)$ is defined in Table 5.5.2.2.1-2 of 3GPP TS 36.211 with the sequence index chosen according to $$\left(\sum_{i=0}^{7} c(8n_s + i)2^i\right) \bmod 3$$

with $c_{init} = N_{ID}^{Ncell}$.

The reference signal sequences $r_u(n)$ for $N_{sc}^{RU} > 1$ is defined by a cyclic shift α of a base sequence according to the following Equation 10.

$$r_u(n) = e^{j\alpha n} e^{j\phi(n)\pi/4}, \quad 0 \leq n < N_{sc}^{RU} \quad \text{[Equation 10]}$$

where φ(n) is given by Table 10.1.4.1.2-1 for $N_{sc}^{RU}=3$, is given by Table 21 for $N_{sc}^{RU}=6$, and is given by Table 22 for $N_{sc}^{RU}=12$.

If group hopping is not enabled, the base sequence index u is given by higher layer parameters threeTone-BaseSequence, sixTone-BaseSequence, and twelveTone-BaseSequence for $N_{sc}^{RU}=3$, $N_{sc}^{RU}=6$, and $N_{sc}^{RU}=12$, respectively. If not signalled by higher layers, the base sequence is given by the following Equation 11.

$$u = \begin{cases} N_{ID}^{Ncell} \bmod 12 & \text{for } N_{sc}^{RU} = 3 \\ N_{ID}^{Ncell} \bmod 14 & \text{for } N_{sc}^{RU} = 6 \\ N_{ID}^{Ncell} \bmod 30 & \text{for } N_{sc}^{RU} = 12 \end{cases} \quad \text{[Equation 11]}$$

If group hopping is enabled, the base sequence index u is given by clause 10.1.4.1.3 of 3GPP TS 36.211.

The cyclic shift for $N_{sc}^{RU}=3$ and $N_{sc}^{RU}=6$ is derived from higher layer parameters threeTone-CyclicShift and sixTone-CyclicShift, respectively, as defined in Table 23. For $N_{sc}^{RU}=12$, α=0.

Table 21 represents an example of φ(n) for $N_{sc}^{RU}=3$.

TABLE 21

| u | φ(0), φ(1), φ(2) | | |
|---|---|---|---|
| 0  | 1 | -3 | -3 |
| 1  | 1 | -3 | -1 |
| 2  | 1 | -3 |  3 |
| 3  | 1 | -1 | -1 |
| 4  | 1 | -1 |  1 |
| 5  | 1 | -1 |  3 |
| 6  | 1 |  1 | -3 |
| 7  | 1 |  1 | -1 |
| 8  | 1 |  1 |  3 |
| 9  | 1 |  3 | -1 |
| 10 | 1 |  3 |  1 |
| 11 | 1 |  3 |  3 |

Table 22 represents another example of φ(n) for $N_{sc}^{RU}=6$.

TABLE 22

| u | φ(0), ..., φ(5) | | | | | |
|---|---|---|---|---|---|---|
| 0  |  1 |  1 |  1 |  1 |  3 | -3 |
| 1  |  1 |  1 |  3 |  1 | -3 |  3 |
| 2  |  1 | -1 | -1 | -1 |  1 | -3 |
| 3  |  1 | -1 |  3 | -3 | -1 | -1 |
| 4  |  1 |  3 |  1 | -1 | -1 |  3 |
| 5  |  1 | -3 | -3 |  1 |  3 |  1 |
| 6  | -1 | -1 |  1 | -3 | -3 | -1 |
| 7  | -1 | -1 | -1 |  3 | -3 | -1 |
| 8  |  3 | -1 |  1 | -3 | -3 |  3 |
| 9  |  3 | -1 |  3 | -3 | -1 |  1 |
| 10 |  3 | -3 |  3 | -1 |  3 |  3 |
| 11 | -3 |  1 |  3 |  1 | -3 | -1 |
| 12 | -3 |  1 | -3 |  3 | -3 | -1 |
| 13 | -3 |  3 | -3 |  1 |  1 | -3 |

Table 23 represents an example of α.

TABLE 23

| $N_{sc}^{RU} = 3$ | | $N_{sc}^{RU} = 6$ | |
|---|---|---|---|
| threeTone-CyclicShift | α | sixTone-CyclicShift | α |
| 0 | 0 | 0 | 0 |
| 1 | 2π/3 | 1 | 2π/6 |
| 2 | 4π/3 | 2 | 4π/6 |
|   |      | 3 | 8π/6 |

For the reference signal for NPUSCH format 1, sequence-group hopping can be enabled, where the sequence-group number u in slot $n_s$ is defined by a group hopping pattern $f_{gh}(n_s)$ and a sequence-shift pattern $f_{ss}$ according to the following Equation 12.

$$u=(f_{gh}(n_s)+f_{ss}) \bmod N_{seq}^{RU} \quad \text{Equation 12}$$

The number of reference signal sequences available for each resource unit size and $N_{seq}^{RU}$ are given by the following Table 24.

TABLE 24

| $N_{sc}^{RU}$ | $N_{seq}^{RU}$ |
|---|---|
| 1 | 16 |
| 3 | 12 |
| 6 | 14 |
| 12 | 30 |

Sequence-group hopping is enabled or disabled by means of the cell-specific parameter groupHoppingEnabled provided by higher layers. Sequence-group hopping for NPUSCH can be disabled for a certain UE through the higher-layer parameter groupHoppingDisabled despite being enabled on a cell basis unless the NPUSCH transmission corresponds to a random access response grant or a retransmission of the same transport block as part of the contention based random access procedure.

The group hopping pattern $f_{gh}(n_s)$ is given by the following Equation 13.

$$f_{gh}=(n_s)=(\Sigma_{i=0}^{7} c(8n'_s+i) \cdot 2^i) \bmod N_{seq}^{RU} \quad \text{[Equation 13]}$$

where $n'_s = n_s$ for $N_{sc}^{RU} > 1$ and $n'_s$ is the slot number of the first slot of the resource unit for $N_{sc}^{RU} > 1$. The pseudo-random sequence c(i) is defined by clause 7.2. The pseudo-random sequence generator is initialized with $$c_{init} = \left\lfloor \frac{N_{ID}^{Ncell}}{N_{seq}^{RU}} \right\rfloor$$

at the beginning of the resource unit for $N_{sc}^{RU}=1$ and in every even slot for $N_{sc}^{RU}>1$.

The sequence-shift pattern $f_{ss}$ is given by the following Equation 14.

$$f_{ss}=(N_{ID}^{Ncell}+\Delta_{ss}) \bmod N_{seq}^{RU} \quad \text{[Equation 14]}$$

where $\Delta_{ss} \in \{0, 1, \ldots, 29\}$ is given by higher-layer parameter groupAssignmentNPUSCH. If no value is signalled, $\Delta_{ss}=0$.

The sequence r(•) shall be multiplied with the amplitude scaling factor $\beta_{NPUSCH}$ and mapped in sequence starting with r(0) to the sub-carriers.

The set of subcarriers used in the mapping process shall be identical to the corresponding NPUSCH transmission as defined in clause 10.1.3.6 in 3GPP 36.211.

The mapping to resource elements (k, l) shall be in increasing order of first k, then l, and finally the slot number. The values of the symbol index l in a slot are given in Table 25.

Table 25 represents an example of the demodulation reference signal location for NPUSCH.

TABLE 25

| NPUSCH format | Values for l | |
|---|---|---|
| | $\Delta f = 3.75$ kHz | $\Delta f = 15$ kHz |
| 1 | 4 | 3 |
| 2 | 0, 1, 2 | 2, 3, 4 |

SF-FDMA Baseband Signal Generation

For $N_{sc}^{RU}>1$, the time-continuous signal $s_l(t)$ in SC-FDMA symbol l in a slot is defined by clause 5.6 with the quantity $N_{RB}^{UL} N_{sc}^{RB}$ replaced by $N_{sc}^{UL}$.

For $N_{sc}^{RU}=1$, the time-continuous signal $s_{k,l}(t)$ for sub-carrier index k in SC-FDMA symbol l in an uplink slot is defined by Equation 15.

$$s_{k,l}(t) = a_{k^{(-)},l} \cdot e^{j\phi_{k,l}} \cdot e^{j 2\pi(k+1/2)\Delta f(t-N_{CP,l}T_s)}$$

$$k^{(-)} = k + \lfloor N_{sc}^{UL}/2 \rfloor \quad \text{[Equation 15]}$$

For $0 \le t < (N_{CP,l}+N)T_s$, where parameters for $\Delta f=15$ kHz and $\Delta f=3.75$ kHz are given in Table 26, $a_{k^{(-)},l}$ is the modulation value of symbol l, and the phase rotation $\varphi_{k,l}$ is defined by Equation 16.

$$\varphi_{k,l} = \rho(\tilde{l} \bmod 2) + \hat{\varphi}_k(\tilde{l}) \quad \text{[Equation 16]}$$

$$\rho = \begin{cases} \frac{\pi}{2} & \text{for BPSK} \\ \frac{\pi}{4} & \text{for QPSK} \end{cases}$$

$$\hat{\varphi}_k(\tilde{l}) = \begin{cases} 0 & \tilde{l}=0 \\ \hat{\varphi}_k(\tilde{l}-1) + 2\pi\Delta f(k+1/2)(N+N_{CP,l})T_s & \tilde{l}>0 \end{cases}$$

$$\tilde{l} = 0, 1, \ldots, M_{rep}^{NPUSCH} N_{RU} N_{slots}^{UL} N_{symb}^{UL} - 1$$

$$l = \tilde{l} \bmod N_{symb}^{UL}$$

where $\tilde{l}$ is a symbol counter that is reset at the start of a transmission and incremented for each symbol during the transmission.

Table 26 represents an example of SC-FDMA parameters for $N_{sc}^{RU}=1$.

TABLE 26

| Parameter | $\Delta f = 3.75$ kHz | $\Delta f = 15$ kHz |
|---|---|---|
| N | 8192 | 2048 |
| Cyclic prefix length $N_{CP,l}$ | 256 | 160 for l = 0<br>144 for l = 1, 2, . . . , 6 |
| Set of values for k | −24, −23, . . . , 23 | −6, −5, . . . , 5 |

The SC-FDMA symbols in a slot shall be transmitted in increasing order of l, starting with l=0, where SC-FDMA symbol l>0 starts at time $\Sigma_{l'=0}^{\tilde{l}-1}(N_{CP,l'}+N)T_s$ within the slot. For $\Delta f=3.75$ kHz, the remaining $2304T_s$ in $T_{slot}$ is not transmitted and used for guard period.

Narrowband Physical Random Access Channel (NPRACH)

The physical layer random access preamble is based on single-subcarrier frequency-hopping symbol groups. A symbol group is a random access symbol group illustrated in FIG. 11, consisting of a cyclic prefix of length $T_{CP}$ and a sequence of 5 identical symbols with total length $T_{SEQ}$. The parameter values are random access preamble parameters listed in Table 27.

Figure 11:
FIG. 11 illustrates an example of a random access symbol group.

FIG. 11 illustrates an example of the random access symbol group.

Table 27 represents an example of the random access preamble parameters.

TABLE 27

| Preamble format | $T_{CP}$ | $T_{SEQ}$ |
|---|---|---|
| 0 | $2048T_s$ | $5 \cdot 8192T_s$ |
| 1 | $8192T_s$ | $5 \cdot 8192T_s$ |

The preamble consisting of 4 symbol groups transmitted without gaps is transmitted $N_{rep}^{NPRACH}$ times.

The transmission of a random access preamble, if triggered by the MAC layer, is restricted to certain time and frequency resources.

A NPRACH configuration provided by higher layers contains the following.

NPRACH resource periodicity $N_{period}^{NPRACH}$ (nprach-Periodicity),

Frequency location of the first subcarrier allocated to NPRACH $N_{scoffset}^{NPRACH}$ (nprach-SubcarrierOffset), The number of subcarriers allocated to NPRACH $N_{sc}^{NPRACH}$ (nprach-NumSubcarriers), The number of starting subcarriers allocated to contention based NPRACH random access $N_{sc\_cont}^{NPRACH}$ (nprach-NumCBRA-StartSubcarriers), The number of NPRACH repetitions per attempt $N_{rep}^{NPRACH}$ (numRepetitionsPerPreambleAttempt), NPRACH starting time $N_{start}^{NPRACH}$ (nprach-StartTime), Fraction for calculating starting subcarrier index for the range of NPRACH subcarriers reserved for indication of UE support for multi-tone msg3 transmission $N_{MSG3}^{NPRACH}$ (nprach-SubcarrierMSG3-RangeStart).

NPRACH transmission can start only $N_{start}^{NPRACH} \cdot 30720T_s$ time units after the start of a radio frame fulfilling $n_f \bmod(N_{period}^{NPRACH}/10)=0$. After transmissions of $4 \cdot 64(T_{CP}T_{SEQ})$ time units, a gap of $40 \cdot 30720 T_s$ time units is inserted.

NPRACH configurations where $N_{scoffset}^{NPRACH}+N_{sc}^{NPRACH}>N_{sc}^{UL}$ are invalid.

The NPRACH starting subcarriers allocated to contention based random access are split in two sets of subcarriers, $\{0, 1, \ldots, N_{sc\_cont}^{NPRACH}N_{MSG3}^{NPRACH}-1\}$ and $\{N_{sc\_cont}^{NPRACH}N_{MSG3}^{NPRACH}, \ldots, N_{sc\_cont}^{NPRACH}-1\}$, where the second set, if present, indicates UE support for multi-tone msg3 transmission.

The frequency location of the NPRACH transmission is constrained within $N_{sc}^{RA}=12$ subcarriers. Frequency hopping is used within the 12 subcarriers, where the frequency location of the $i^{th}$ symbol group is given by $n_{sc}^{RA}(i)=n_{start}+\tilde{n}_{sc}^{RA}(i)$ where $n_{start}=N_{scoffset}^{NPRACH}+\lfloor n_{init}/N_{sc}^{RA}\rfloor \cdot N_{sc}^{RA}$, and $$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & \begin{array}{l} i \bmod 4 = 1, 3 \text{ and} \\ \tilde{n}_{sc}^{RA}(i-1) \bmod 2 = 0 \end{array} \\ \tilde{n}_{sc}^{RA}(i-1) - 1 & \begin{array}{l} i \bmod 4 = 1, 3 \text{ and} \\ \tilde{n}_{sc}^{RA}(i-1) \bmod 2 = 1 \end{array} \\ \tilde{n}_{sc}^{RA}(i-1) + 6 & \begin{array}{l} i \bmod 4 = 2 \text{ and} \\ \tilde{n}_{sc}^{RA}(i-1) < 6 \end{array} \\ \tilde{n}_{sc}^{RA}(i-1) - 6 & \begin{array}{l} i \bmod 4 = 2 \text{ and} \\ \tilde{n}_{sc}^{RA}(i-1) \geq 6 \end{array} \end{cases} \quad \text{[Equation 17]}$$

$$f(t) = \left( f(t-1) + \left( \sum_{n=10t+1}^{10t+9} c(n)2^{n-(10t+1)} \right) \bmod(N_{sc}^{RA}-1) + 1 \right) \bmod N_{sc}^{RA}$$

$$f(-1) = 0$$

where $\tilde{n}_{sc}^{RA}(0)=n_{init} \bmod N_{sc}^{RA}$ with $n_{init}$ being the subcarrier selected by the MAC layer from $\{0, 1, \ldots, N_{sc}^{NPRACH}-1\}$, and the pseudo random sequence c(n) is given by clause 7.2 of 3GPP TS 36.211. The pseudo random sequence generator is initialized with $c_{init}=N_{ID}^{Ncell}$.

The time-continuous random access signal $s_i(t)$ for symbol group i is defined by the following Equation 18.

$$s_i(t)=\beta_{NPRACH} e^{j2\pi(n_{SC}^{RA}(i)+Kk_0+1/2)\Delta f_{RA}(t-T_{CP})} \quad \text{[Equation 18]}$$

Where $0 \leq t < T_{SEQ}+T_{CP}$, $\beta_{NPRACH}$ is an amplitude scaling factor in order to conform to the transmit power $P_{NPRACH}$ specified in clause 16.3.1 in 3GPP TS 36.213, $k_0=-N_{sc}^{UL}/2$, $K=\Delta f/\Delta f_{RA}$ accounts for the difference in subcarrier spacing between the random access preamble and uplink data transmission, and the location in the frequency domain controlled by the parameter $N_{sc}^{RA}(i)$ is derived from clause 10.1.6.1 of 3GPP TS 36.211. The variable $\Delta f_{RA}$ is given by Table 28.

Table 28 represents an example of random access baseband parameters.

TABLE 28

| Preamble format | $\Delta f_{RA}$ |
|---|---|
| 0, 1 | 3.75 kHz |

Downlink

A downlink narrowband physical channel corresponds to a set of resource elements carrying information originating from higher layers and is the interface defined between 3GPP TS 36.212 and 3GPP TS 36.211.

The following downlink physical channels are defined:
Narrowband Physical Downlink Shared Channel (NPDSCH)
Narrowband Physical Broadcast Channel (NPBCH)
Narrowband Physical Downlink Control Channel (NPDCCH)

A downlink narrowband physical signal corresponds to a set of resource elements used by the physical layer but does not carry information originating from higher layers.

A downlink narrowband physical signal corresponds to a set of resource elements used by the physical layer but does not carry information originating from higher layers. The following downlink physical signals are defined:

Narrowband reference signal (NRS)
Narrowband synchronization signal
Narrowband physical downlink shared channel (NPDSCH)

The scrambling sequence generator is initialized with $c_{ini}=n_{RNTI} \cdot 2^{14}+n_f \mod 2 \cdot 2^{13}+\lfloor n_s/2 \rfloor+N_{ID}^{Ncell}$, where $n_s$ is the first slot of the transmission of the codeword. In case of NPDSCH repetitions and the NPDSCH carrying the BCCH, the scrambling sequence generator is reinitialized according to the expression above for each repetition. In case of NPDSCH repetitions and the NPDSCH is not carrying the BCCH, the scrambling sequence generator is reinitialized according to the expression above after every min $(M_{rep}^{NPDSCH}, 4)$ transmission of the codeword with $n_s$ and $n_f$ set to the first slot and the frame, respectively, used for the transmission of the repetition.

Modulation is done using a QPSK modulation scheme.

NPDSCH can be mapped to one or more than one subframes, $N_{SF}$, as given by clause 16.4.1.5 of 3GPP TS 36.213, each of which shall be transmitted NPDSCH $M_{rep}^{NPDSCH}$ times.

For each of the antenna ports used for transmission of the physical channel, the block of complex-valued symbols $y^{(p)}(0), \ldots, y^{(p)} (M_{symb}^{ap}-1)$ shall be mapped to resource elements (k, l) which meet all of the following criteria in the current subframe.

The subframe is not used for transmission of NPBCH, NPSS, or NSSS, and they are assumed by the UE not to be used for NRS, and they are not overlapping with resource elements used for CRS (if any), and the index l in the first slot in a subframe fulfills $l_{DataStart}$ where $l_{DataStart}$ is given by clause 16.4.1.4 of 3GPP TS 36.213.

The mapping of $y^{(p)}(0), y^{(p)} (M_{symb}^{ap}-1)$ in sequence starting with $y^{(p)}(0)$ to resource elements (k, l) on antenna port p meeting the criteria above is increasing order of the first the index k and the index l, starting with the first slot and ending with the second slot in a subframe. For NPDSCH not carrying BCCH, after mapping to a subframe, the subframe is repeated for $M_{rep}^{NPDSCH}-1$ additional subframes, before continuing the mapping of $y^{(p)}(\cdot)$ to the following subframe. The mapping of $y^{(p)}(0), \ldots, y^{(p)} (M_{symb}^{ap}-1)$ is then repeated until $M_{rep}^{NPDSCH}$ subframes have been transmitted. For NPDSCH carrying BCCH, the $y^{(p)}(0), \ldots, y^{(p)} (M_{symb}^{ap}-1)$ is mapped to $N_{SF}$ subframes in sequence and then repeated until $M_{rep}^{NPDSCH} N_{SF}$ subframes have been transmitted.

The NPDSCH transmission can be configured by higher layers with transmission gaps where the NPSDCH transmission is postponed. There are no gaps in the NPDSCH transmission if $R_{max}<N_{gap,threshold}$ where $N_{gap,threshold}$ is given by the higher layer parameter dl-GapThreshold and $R_{max}$ is given by 3GPP TS 36.213. The gap starting frame and subframe are given by $(10 n_f+\lfloor n_s/2 \rfloor) \mod N_{gap,period}=0$ where the gap periodicity, $N_{gap,period}$, is given by the higher layer parameter dl-GapPeriodicity. The gap duration in a plurality of subframes is given by $N_{gap,duration}=N_{gap,coeff}N_{gap,period}$, where $N_{gap,coeff}$ is given by the higher layer parameter dl-GapDurationCoeff. For NPDSCH carrying the BCCH there are no gaps in the transmission.

The UE does not expect NPDSCH in subframe i if it is not a NB-IoT downlink subframe, except for transmissions of NPDSCH carrying SystemInformationBlockType1-NB in subframe 4. In case of NPDSCH transmissions, in subframes that are not NB-IoT downlink subframes, the NPDSCH transmission is postponed until the next NB-IoT downlink subframe.

UE Procedure for Receiving the NPDSCH

A NB-IoT UE shall assume a subframe as a NB-IoT DL subframe in the following case.

If the UE determines that the subframe does not contain NPSS/NSSS/NPBCH/NB-SIB1 transmission, and for a NB-IoT carrier that a UE receives higher layer parameter operationModeInfo, the subframe is configured as NB-IoT DL subframe after the UE has obtained SystemInformationBlockType1-NB.

for a NB-IoT carrier that DL-CarrierConfigCommon-NB is present, the subframe is configured as NB-IoT DL subframe by the higher layer parameter downlinkBitmapNonAnchor.

For a NB-IoT UE that supports two HARQ-Processes-r14, there shall be a maximum of 2 downlink HARQ processes.

A UE shall upon detection on a given serving cell of a NPDCCH with DCI format N1, N2 ending in subframe n intended for the UE, decode, starting in n+5 DL subframe, the corresponding NPDSCH transmission in N consecutive NB-IoT DL subframe(s) $n_i$ with i=0, 1, ..., N−1 according to the NPDCCH information, where subframe n is the last subframe in which the NPDCCH is transmitted and is determined from the starting subframe of NPDCCH transmission and the DCI subframe repetition number field in the corresponding DCI.

subframe(s) $n_i$ with i=0, 1, ..., N−1 are N consecutive NB-IoT DL subframe(s) excluding subframes used for SI messages, where $n_0<n_1<\ldots,n_{N-1}$, $N=N_{Rep}N_{SF}$, where the value of $N_{Rep}$ is determined by the repetition number field in the corresponding DCI, and the value of $N_{SF}$ is determined by the resource assignment field in the corresponding DCI, and $k_0$ is the number of NB-IoT DL subframe(s) starting in DL subframe n+5 until DL subframe $n_0$, where $k_0$ is determined by the scheduling delay field ($I_{Delay}$) for DCI format N1, and $k_0=0$ for DCI format N2. For DCI CRC scrambled by G-RNTI, $k_0$ is determined by the scheduling delay field ($I_{Delay}$) according to Table 30, otherwise $k_0$ is determined by the scheduling delay field ($I_{Delay}$) according to Table 29. The value of $R_{m,ax}$ is according to subclause 16.6 in 3GPP 36.213 for the corresponding DCI format N1.

Table 29 represents an example of $k_0$ for DCI format N1.

TABLE 29

| | $k_0$ | |
|---|---|---|
| $I_{Delay}$ | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

Table 30 represents an example of $k_0$ for DCI format N1 with DCI CRC scrambled by G-RNTI.

TABLE 30

| $I_{Delay}$ | $k_0$ |
|---|---|
| 0 | 0 |
| 1 | 4 |
| 2 | 8 |

TABLE 30-continued

| $I_{Delay}$ | $k_0$ |
|---|---|
| 3 | 12 |
| 4 | 16 |
| 5 | 32 |
| 6 | 64 |
| 7 | 128 |

A UE is not expected to receive transmissions in 3 DL subframes following the end of a NPUSCH transmission by the UE.

The resource allocation information in DCI format N1, N2 (paging) for NPSICH indicates the following information to a scheduled UE.

a number of subframes ($N_{SF}$) determined by the resource assignment field ($I_{SF}$) in the corresponding DCI according to Table 31, a repetition number ($N_{Rep}$) determined by the repetition number field ($I_{Rep}$) in the corresponding DCI according to Table 32.

TABLE 31

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

TABLE 32

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

The number of repetitions for the NPDSCH carrying SystemInformationBlockType1-NB is determined based on the parameter schedulingInfoSIB1 configured by higher-layers and according to Table 33.

Table 33 represents an example of number of repetitions for SIB1-NB.

TABLE 33

| Value of schedulingInfoSIB1 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

The starting radio frame for the first transmission of the NPDSCH carrying SystemInformationBlockType1-NB is determined according to Table 34.

Table 34 represents an example of the starting radio frame for the first transmission of the NPDSCH carrying SIB1-NB.

TABLE 34

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell}$ mod 4 = 0 | 0 |
|   | $N_{ID}^{Ncell}$ mod 4 = 1 | 16 |
|   | $N_{ID}^{Ncell}$ mod 4 = 2 | 32 |
|   | $N_{ID}^{Ncell}$ mod 4 = 3 | 48 |
| 8 | $N_{ID}^{Ncell}$ mod 2 = 0 | 0 |
|   | $N_{ID}^{Ncell}$ mod 2 = 1 | 16 |
| 16 | $N_{ID}^{Ncell}$ mod 2 = 0 | 0 |
|   | $N_{ID}^{Ncell}$ mod 2 = 1 | 1 |

The starting OFDM symbol for NPDSCH is given by index $l_{DataStrart}$ in the first slot in a subframe k and is determined as follows.

If subframe k is a subframe used for receiving SIB1-NB, $l_{DataStrart}=3$ if the value of the high layer parameter operationModeInfo is set to '00' or '01', $l_{DataStrart}=0$ otherwise else, $l_{DataStrart}$ is given by the higher layer parameter eutraControlRegionSize if the value of the higher layer parameter eutraControlRegionSize is present $l_{DataStrart}=0$ otherwise.

UE Procedure for Reporting ACK/NACK

The UE shall upon detection of a NPDSCH transmission ending in NB-IoT subframe n intended for the UE and for which an ACK/NACK shall be provided, start, at the end of n+$k_0$−1 DL subframe transmission of the NPUSCH carrying ACK/NACK response using NPUSCH format 2 in N consecutive NB-IoT UL slots, where N=$N_{Rep}^{AN}N_{slots}^{UL}$, where the value of $N_{Rep}^{AN}$ is given by the higher layer parameter ack-NACK-NumRepetitions-Msg4 configured for the associated NPRACH resource for Msg4 NPDSCH transmission, and higher layer parameter ack-NACK-NumRepetitions otherwise, and the value of $N_{slots}^{UL}$ is the number of slots of the resource unit, allocated subcarrier for ACK/NACK and value of $k_0$ is determined by the ACK/NACK resource field in the DCI format of the corresponding NPDCCH according to Table 16.4.2-1, and Table 16.4.2-2 in 3GPP TS 36.213.

Narrowband Physical Broadcast Channel (NPBCH)

The processing structure for the BCH transport channel is according to section 5.3.1 of 3GPP TS 36.212, with the following differences.

The transmission time interval (TTI) is 640 ms.

The size of the BCH transport block is set to 34 bits.

The CRC mask for NPBCH is selected according to 1 or 2 transmit antenna ports at eNodeB according to Table 5.3.1.1-1 of 3GPP TS 36.212, where the transmit antenna ports are defined in section 10.2.6 of 3GPP TS 36.211.

The number of rate matched bits is defined in section 10.2.4.1 of 3GPP TS 36.211.

Scrambling is done according to clause 6.6.1 of 3GPP TS 36.211 with $M_{bit}$ denoting the number of bits to be transmitted on the NPBCH. $M_{bit}$ equals 1600 for normal cyclic prefix. The scrambling sequence is initialized with $c_{init}=N_{ID}^{Ncell}$ in radio frames fulfilling $n_f \mod 64=0$.

Modulation is done using the QPSK modulation scheme for each antenna port and is transmitted in subframe 0 during 64 consecutive radio frames starting in each radio frame fulfilling $n_f \mod 64=0$.

Layer mapping and precoding are done according to clause 6.6.3 of 3GPP TS 36.211 with $P \in \{1,2\}$. The UE assumes antenna ports $R_{2000}$ and $R_{2001}$ are used for the transmission of the narrowband physical broadcast channel.

The block of complex-valued symbols $y^{(p)}(0), \ldots y^{(p)}(M_{symb}-1)$ for each antenna port is transmitted in subframe 0 during 64 consecutive radio frames starting in each radio frame fulfilling $n_f \mod 64=0$ and shall be mapped in sequence starting consecutive radio frames starting with y(0) to resource elements (k, l) not reserved for transmission of reference signals shall be in increasing order of the first the index k, then the index l. After mapping to a subframe, the subframe is repeated in subframe 0 in the 7 following radio frames, before continuing the mapping of $y^{(p)}(\bullet)$ to subframe 0 in the following radio frame. The first three OFDM symbols in a subframe are not used in the mapping process. For the purpose of the mapping, the UE assumes cell-specific reference signals for antenna ports 0-3 and narrowband reference signals for antenna ports 2000 and 2001 being present irrespective of the actual configuration. The frequency shift of the cell-specific reference signals is calculated by replacing cell $N_{ID}^{cell}$ with $N_{ID}^{Ncell}$ in the calculation of $v_{shift}$ in clause 6.10.1.2 of 3GPP TS 36.211.

Narrowband Physical Downlink Control Channel (NPDCCH)

A narrowband physical downlink control channel transports control information. The narrowband physical downlink control channel is transmitted through aggregation of one or two consecutive narrowband control channel elements (NCCEs), here, the narrowband control channel elements correspond to 6 consecutive subcarriers in the subframe, and here, NCCE 0 occupies subcarriers 0 to 5 and NCCE 1 occupies subcarriers 6 to 11. The NPDCCH supports various formats listed in Table 35. In the case of NPDCCH format 1, all NCCEs belong to the same subframe. One or two NPDCCHs may be transmitted in the subframe.

Table 35 shows an example of supported NPDCCH formats.

TABLE 35

| NPDCCH format | Number of NCCEs |
|---|---|
| 0 | 1 |
| 1 | 2 |

Scrambling should be performed according to Section 6.8.2 of TS36.211. A scrambling sequence should be initialized at a beginning of subframe $k_0$ according to Section 16.6 of TS36.213 after every fourth NPDCCH subframe having $c_{init}=\lfloor n_s/2 \rfloor 2^9+N_{ID}^{Ncell}$, and here, $n_s$ represents a first slot of an NPDCCH subframe in which scrambling is (re-) initialized.

Modulation is performed by using a QPSK modulation scheme according to Section 6.8.3 of TS36.211.

Layer mapping and precoding are performed according to Section 6.6.3 of TS36.211 by using the same antenna port.

A block $y(0), \ldots y(M_{symb}-1)$ of complex-value symbols is mapped to resource elements (k,l) in a sequence starting as y(0) through an associated antenna port satisfying all of the following criteria:

They are parts of NCCE(s) allocated for NPDCCH transmission, and it is assumed that they are not sued for transmission of NPBCH, NPSS, or NSSS, and it is assumed that they are not used by the UE for an NRS, and they (if exists) do not overlap with resource elements used for PBCH, PSS, SSS, or CRS as defined in Section 6 of TS 36.211, and an index l of the first slot of the subframe satisfies $l \geq l_{NPDCCHStart}$, and here, $l_{NPDCCHStart}$ is provided by Section 16.6.1 of 3GPP TS 36.213.

Mapping to resource elements (k, l) through an antenna port p satisfying the aforementioned criteria is an increase order of an index l after a first index k, which starts from the first slot of the subframe and ends with the second slot.

The NPDCCH transmission may be configured by higher layers having transmission gaps in which the NPDCCH transmission is delayed. The configuration is the same as that described for the NPDSCH in Section 10.2.3.4 of TS 36.211.

In the case where a subframe other than the NB-IoT downlink subframe, the UE does not expect the NPDCCH in the subframe i. In the case of NPDCCH transmission, in subframes other than the NB-IoT downlink subframes, the NPDCCH transmissions are delayed up to a next NB-IoT downlink subframe.

DCI Format

DCI Format N0

DCI format N0 is used for the scheduling of NPUSCH in one UL cell. The following information is transmitted by means of the DCI format N0.

Flag for format N0/format N1 differentiation (1 bit), subcarrier indication (6 bits), resource assignment (3 bits), scheduling delay (2 bits), modulation and coding scheme (4 bits), redundancy version (1 bit), repetition number (3 bits), new data indicator (1 bit), DCI subframe repetition number (2 bits)

DCI Format N1

DCI format N1 is used for the scheduling of one NPDSCH codeword in one cell and random access procedure initiated by a NPDCCH order. The DCI corresponding to a NPDCCH order is carried by NPDCCH. The following information is transmitted by means of the DCI format N1:

Flag for format N0/format N1 differentiation (1 bit), NPDCCH order indicator (1 bit)

Format N1 is used for random access procedure initiated by a NPDCCH order only if NPDCCH order indicator is set to "1", format N1 CRC is scrambled with C-RNTI, and all the remaining fields are set as follows:

Starting number of NPRACH repetitions (2 bits), subcarrier indication of NPRACH (6 bits), all the remaining bits in format N1 are set to one.

Otherwise,

Scheduling delay (3 bits), resource assignment (3 bits), modulation and coding scheme (4 bits), repetition number (4 bits), new data indicator (1 bit), HARQ-ACK resource (4 bits), DCI subframe repetition number (2 bits)

When the format N1 CRC is scrambled with a RA-RNTI, then the following fields among the fields above are reserved.

New data indicator, HARQ-ACK resource

If the number of information bits in format N1 is less than the number of information bits in format N0, zeros are appended to format N1 until the payload size equals that of format N0.

DCI Format N2

DCI format N2 is used for paging and direct indication. The following information is transmitted by means of the DCI format N2.

Flag for paging/direct indication differentiation (1 bit)
If Flag=0:
Direct indication information (8 bits), reserved information bits are added until the size is equal to the size of format N2 with Flag=1
If Flag=1:
Resource assignment (3 bits), modulation and coding scheme (4 bits), repetition number (4 bits), DCI subframe repetition number (3 bits)

NPDCCH Related Procedure

A UE shall monitor a set of NPDCCH candidates as configured by higher layer signalling for control information, where monitoring implies attempting to decode each of the NPDCCHs in the set according to all the monitored DCI formats.

An NPDCCH search space $NS_k^{(L,R)}$ at aggregation level $L' \in \{1,2\}$ and repetition level $R \in \{1, 2, 4, 8, 16, 32, 64, 128, 256, 512, 1024, 2048\}$ is defined by a set of NPDCCH candidates, where each candidate is repeated in a set of R consecutive NB-IoT downlink subframes excluding subframes used for transmission of SI messages starting with subframe k.

The locations of starting subframe k are given by $k=k_b$, where $k=k_b$ is the bth consecutive NB-IoT DL subframe from subframe k0, excluding subframes used for transmission of SI messages, and b=u·R, and u=0, 1, ... , $$\frac{R_{max}}{R} - 1,$$

and where subframe k0 is a subframe satisfying the condition $(10n_f + \lfloor n_s/2 \rfloor \mod T) = \lfloor \alpha_{offset} \cdot T \rfloor$, where $T = R_{max} \cdot G$, $T \geq 4$. G and $\alpha_{offset}$ are given by the higher layer parameters.

For Type1-NPDCCH common search space, k=k0 and is determined from locations of NB-IoT paging opportunity subframes.

If the UE is configured by higher layers with a NB-IoT carrier for monitoring of NPDCCH UE-specific search space, the UE monitors the NPDCCH UE-specific search space on the higher layer configured NB-IoT carrier, the UE is not expected to receive NPSS, NSSS, NPBCH on the higher layer configured NB-IoT carrier.

Otherwise, the UE monitors the NPDCCH UE-specific search space on the same NB-IoT carrier on which NPSS/NSSS/NPBCH are detected.

The starting OFDM symbol for NPDCCH given by index $l_{NPDCCHStart}$ in the first slot in a subframe k and is determined as follows.

If higher layer parameter eutraControlRegionSize is present $l_{NPDCCHStart}$ is given by the higher layer parameter eutraControlRegionSize.

otherwise, $l_{NPDCCHStart}=0$.

Narrowband Reference Signal (NRS)

Before a UE obtains operationModeInfo, the UE may assume narrowband reference signals are transmitted in subframes #0 and #4 and in subframes #9 not containing NSSS.

When the UE receives higher-layer parameter operationModeInfo indicating guardband or standalone, Before the UE obtains SystemInformationBlockType1-NB, the UE may assume narrowband reference signals are transmitted in subframes #0, #1, #3, #4 and in subframes #9 not containing NSSS.

After the UE obtains SystemInformationBlockType1-NB, the UE may assume narrowband reference signals are transmitted in subframes #0, #1, #3, #4, subframes #9 not containing NSSS, and in NB-IoT downlink subframes and does not expect narrowband reference signals in other downlink subframes.

When the UE receives higher-layer parameter operationModeInfo indicating inband-SamePCI or inband-DifferentPCI, Before the UE obtains SystemInformationBlockType1-NB, the UE may assume narrowband reference signals are transmitted in subframes #0, #4 and in subframes #9 not containing NSSS.

After the UE obtains SystemInformationBlockType1-NB, the UE may assume narrowband reference signals are transmitted in subframes #0, #4, subframes #9 not containing NSSS, and in NB-IoT downlink subframes and does not expect narrowband reference signals in other downlink subframes.

Narrowband Primary Synchronization Signal (NPSS)

The sequence $d_l(n)$ used for the narrowband primary synchronization signal is generated from a frequency-domain Zadoff-Chu sequence according to the following Equation 19.

$$d_1(n) = S(l) \cdot e^{-j\frac{\pi u n(n+1)}{11}}, \quad [\text{Equation 19}]$$
$$n = 0, 1, \ldots, 10$$

where the Zadoff-Chu root sequence index u=5 and S(l) for different symbol indices l is given by Table 36.

Table 36 represents an example of S(l).

TABLE 36

| Cyclic prefix length | S(3), ..., S(13) | | | | | | | | | | |
|---|---|---|---|---|---|---|---|---|---|---|---|
| Normal | 1 | 1 | 1 | 1 | −1 | −1 | 1 | 1 | 1 | −1 | 1 |

The same antenna port shall be used for all symbols of the narrowband primary synchronization signal within a subframe.

The UE shall not assume that the narrowband primary synchronization signal is transmitted on the same antenna port as any of the downlink reference signals. The UE shall not assume that the transmissions of the narrowband primary synchronization signal in a given subframe use the same antenna port, or ports, as the narrowband primary synchronization signal in any other subframe.

The sequences $d_l(n)$ shall be mapped to resource elements (k, l) in increasing order of the first index k=0, 1, ..., $N_{sc}^{RB}-2$ and then the index l=3, 4, ..., $2N_{symb}^{DL}-1$ in subframe 5 in every radio frame. For resource elements (k, l) overlapping with resource elements where cell-specific reference signals are transmitted, the corresponding sequence element d(n) is not used for the NPSS but counted in the mapping process.

Narrowband Secondary Synchronization Signal (NSSS)

The sequence d(n) used for the narrowband secondary synchronization signal is generated from a frequency-domain Zadoff-Chu sequence according to the following Equation 20.

$$d(n) = b_q(n) \cdot e^{-j2\pi\theta_f n} \cdot e^{-j\frac{\pi u n'(n'+1)}{131}}$$ [Equation 20]

Where $n = 0, 1, \ldots, 131$ $n' = n \bmod 131$ $m = n \bmod 128$ $u = N_{ID}^{Ncell} \bmod 126 + 3$ $q = \left\lfloor \frac{N_{ID}^{Ncell}}{126} \right\rfloor$ The binary sequence $b_q(n)$ is given by Table 35. The cyclic shift $\theta_f$ in frame number $n_f$ is given by $$\theta_f = \frac{33}{132}(n_f/2) \bmod 4.$$

Table 37 represents an example of $b_q(n)$.

TABLE 37

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 1 1 −1 1 1 −1 1 −1 −1 1 1 1 −1 −1 1 −1 1 1 −1 1 −1 −1 1 −1 1 1 −1 −1 1 1 1 −1 1 −1 −1 1 1 −1 1 1 −1 1 −1 −1 1 1 1 −1 −1 1 −1 1 −1 −1 1 1 1 −1 −1 1 1 1 −1 −1 1 1 −1 −1 1 1 1 −1 −1 1 1 −1 −1 1 1 1 −1 −1 1 1 −1 −1 1 −1 1 1 −1 1 1 −1 −1 1 1 −1 1 1 −1] |
| 2 | [1 −1 −1 1 −1 1 1 −1 −1 1 1 −1 1 −1 1 1 −1 1 1 −1 1 −1 −1 1 1 1 −1 −1 1 −1 1 1 −1 1 −1 −1 1 −1 1 1 1 1 −1 1 1 −1 1 1 −1 −1 1 −1 1 1 −1 −1 1 1 1 −1 −1 1 1 −1 −1 1 1 1 −1 −1 1 1 −1 −1 1 −1 1 1 −1 1 1 −1 1 1 −1 −1 1 −1 1 1 −1 1 −1 −1 1 1 1 −1 −1 1 −1 1 −1 −1 1 1 −1 1 1 −1 1 −1 −1 1 1 −1 1 1 −1 −1 1 1] |
| 3 | [1 −1 −1 1 −1 1 1 −1 −1 1 1 −1 1 −1 1 1 −1 1 1 −1 1 −1 −1 1 1 1 −1 −1 1 −1 1 1 −1 1 −1 −1 1 −1 1 1 1 1 −1 1 1 −1 1 1 −1 −1 1 −1 1 1 −1 −1 1 1 1 −1 −1 1 −1 1 1 −1 1 −1 −1 1 1 1 −1 −1 1 1 1 −1 −1 1 1 −1 −1 1 1 1 −1 −1 1 1 −1 −1 1 1 1 −1 −1 1 1 −1 −1 1 −1 1 1 −1 1 1 −1 −1 1 1 −1 1 1 −1] |

The same antenna port shall be used for all symbols of the narrowband secondary synchronization signal within a subframe.

The UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe.

The sequence d(n) shall be mapped to resource elements (k, l) in sequence starting with d(0) in increasing order of the first index k over the 12 assigned subcarriers and then the index l over the assigned last $N_{symb}^{NSSS}$ symbols in radio frames fulfilling $n_f$ mod 2=0, where $N_{symb}^{NSSS}$ is given by Table 38.

Table 38 represents an example of the number of NSSS symbols.

TABLE 38

| Cyclic prefix length | $N_{symb}^{NSSS}$ |
|---|---|
| Normal | 11 |

OFDM Baseband Signal Generation

If higher-layer parameter operationModeInfo does not indicate 'inband-SamePCI', and samePCI-Indicator does not indicate 'samePCI', time-consecutive signal $s_l^{(p)}(t)$ on antenna port p of OFDM symbol l on a downlink slot is defined by the following Equation 21.

$$s_l^{(p)}(t) = \sum_{k=-\lfloor N_{sc}^{RB}/2 \rfloor}^{\lceil N_{sc}^{RB}/2 \rceil - 1} a_{k^{(-)},l}^{(p)} \cdot e^{j2\pi(k+\frac{1}{2})\Delta f(t-N_{CP,l}T_s)}$$ [Equation 21]

For $0 \leq t < (N_{CP,l}+N) \times T_s$, where $k^{(-)}=k+\lfloor N_{sc}^{RB}/2 \rfloor$, N=2048, Δf=15 kHz, and $a_{k,l}^{(p)}$ is the content of resource element (k, l) on the antenna port.

If higher-layer parameter operationModeInfo indicates 'inband-SamePCI' or samePCI-Indicator indicates 'samePCI', time-consecutive signal $s_l^{(p)}(t)$, where $l'=l+N_{symb}^{DL}(n_s \bmod 4) \in \{0, \ldots, 27\}$, on the antenna port p of OFDM symbol is an OFDM symbol index at the start of the last even-numbered subframe and is defined by the following Equation 22.

$$s_l^{(p)}(t) = $$ [Equation 22]

$$\sum_{k=-\lfloor N_{RB}^{DL} N_{sc}^{RB}/2 \rfloor}^{-1} e^{\theta_{k^{(-)}}} a_{k^{(-)},1}^{(p)} \cdot e^{j2\pi k \Delta f(t - N_{CP,l'\bmod N_{symb}^{DL}}T_s)} +$$

$$\sum_{k=1}^{\lceil N_{RB}^{DL} N_{sc}^{RB}/2 \rceil} e^{\theta_{k^{(+)}}} a_{k^{(+)},1}^{(p)} \cdot e^{j2\pi k \Delta f(t - N_{Cp,l'\bmod N_{symb}^{DL}}T_s)}$$

For $0 \leq t < (N_{CP,l}+N) \times T_s$, where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor - 1$, $\theta_{k,l}=j2\pi f_{NB-IoT} T_s(N+\Sigma_{i=0}^{l'} N_{CP,i \bmod 7})$ if resource element (k, l') is used for Narrowband IoT, and 0 otherwise, and $f_{NB-IoT}$ is the frequency location of the carrier of the narrowband IoT PRB minus the frequency location of the center of the LTE signal.

Only normal CP is supported for narrowband IoT downlink in this release of the 3GPP specification.

Initial Access Procedure of NB-IoT

In a general signal transmission/reception procedure of NB-IoT, an initial access procedure to the base station by the NB-IoT UE is briefly described. Specifically, the initial access procedure to the base station by the NB-IoT UE may be constituted by a procedure of searching an initial cell and a procedure of acquiring the system information by the NB-IoT UE.

Figure 12:
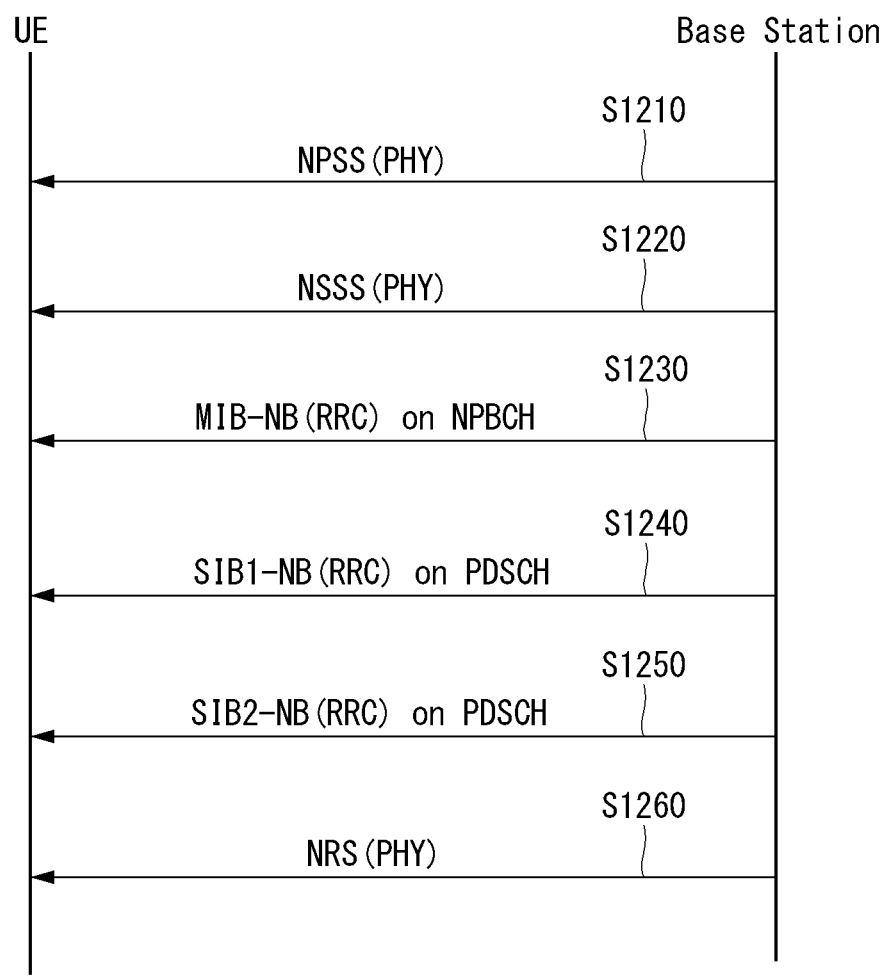
FIG. 12 is a flow chart illustrating an initial access process in relation to a radio system supporting a narrowband internet of things system.

In this regard, a specific signaling procedure between a UE and a base station (e.g., NodeB, eNodeB, eNB, gNB, etc.) related to the initial access of NB-IoT may be illustrated as in FIG. 12. Hereinafter, detailed contents of the initial access procedure of general NB-IoT, the configuration of NPSS/NSSS, acquisition of the system information (e.g., MIB, SIB, etc.), etc., will be described through description of FIG. 12.

FIG. 12 is a flowchart for describing an initial access process in relation to a wireless system supporting a narrowband Internet of things system.

FIG. 12 illustrates an example for the initial access procedure of the NB-IoT, and a name(s) of each physical channel and/or physical signal may be set or named differently according to the wireless communication system to which the NB-IoT is applied. As an example, basically, FIG. 12 is described, but the NB-IoT based on the LTE system is considered, but this is only for convenience of description, and contents thereof may be extensively applied even to the NB-IoT based on the NR system, of course.

As illustrated in FIG. 12, the NB-IOT is based on the following signals transmitted in the downlink: primary and secondary narrowband synchronization signals NPSS and NSSS. The NPSS is transmitted through 11 subcarriers from the first subcarrier to the 11th subcarrier in the 6th subframe of each frame (S1210) and the NSSS is transmitted through 12 subcarriers on an NB-IoT carrier in the first subframe of every even frame in the 10th subframe for FDD and in the first subframe of every even frame for TDD (S1220).

The NB-IoT UE may receive a MasterInformationBlock-NB (MIB-NB) on an NB Physical Broadcast Channel (NPBCH) (S1230).

The MIB-NB uses a fixed schedule with a period of 640 ms and repetitions made within 640 ms. The first transmission of the MIB-NB is scheduled in subframe #0 of radio frames with SFN mod 64=0, and scheduled in subframe #0 of radio frames in which repetitions are all different. The transmissions are arranged in eight independently decodable blocks with a time duration of 80 ms.

Thereafter, the NB-IoT UE may receive a SystemInformationBlockType1-NB (SIB1-NB) on the PDSCH (S1240).

The SIB1-NB uses a fixed schedule with a period of 2560 ms. SIB1-NB transmission occurs in subframe #4 of all different frames in 16 consecutive frames. The start frame for the first transmission of the SIB1-NB is derived by a cell PCID and the number of repetitions at the period of 2560 ms. The repetitions are made at an equal interval within the period of 2560 ms. The TBS for the SystemInformationBlockType1-NB and the repetitions made within 2560 ms are indicated by a field scheduleInfoSIB1 of the MIB-NB.

An SI message is transmitted within time domain windows (referred to as SI windows) which occur periodically by using scheduling information provided by the SystemInformationBlockType1-NB. Each SI message is associated with an SI window, and SI windows of other SI messages do not overlap. That is, only SI corresponding to one SI window is transmitted. When the SI message is configured, the length of the SI window is common to all SI messages.

In the SI window, the corresponding SI message may be transmitted multiple times through 2 or 8 consecutive NB-IoT downlink subframes according to the TBS. The UE uses detailed time/frequency domain scheduling information and other information. The other information may be, for example, a transmission format for the SI message in a field schedulingInfoList of the SystemInformationBlockType1-NB. The UE need not accumulate multiple SI messages in parallel, but may need to accumulate the SI messages over multiple SI windows depending on a coverage condition.

The SystemInformationBlockType1-NB configures the length and the transmission period of the SI window for all SI messages.

Further, the NB-IoT UE may receive a SystemInformationBlockType2-NB (SIB2-NB) on the PDSCH (S1250).

As illustrated in FIG. 12, NRS means a narrowband reference signal.

Random Access Procedure of NB-IoT

In the general signal transmission/reception procedure of the NB-IoT, a random access procedure to the base station by the NB-IoT UE is briefly described. Specifically, the random access procedure to the base station by the NB-IoT UE may be performed through a procedure of transmitting the preamble to the base station and receiving a response thereto.

Figure 13:
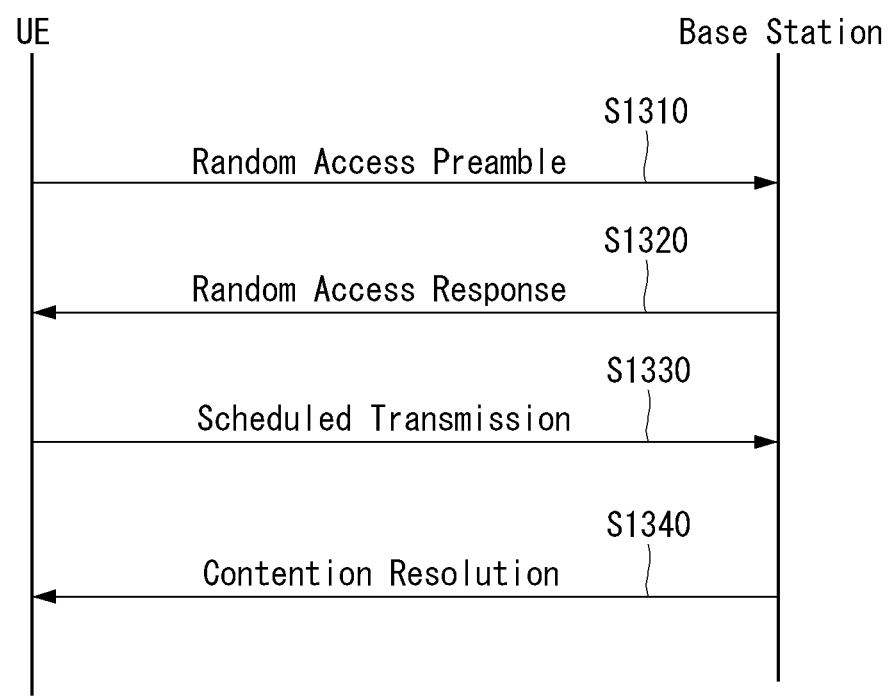
FIG. 13 is a flow chart illustrating a random access process in relation to a radio system supporting a narrowband internet of things system.

In this regard, a specific signaling procedure between a UE and a base station (e.g., NodeB, eNodeB, eNB, gNB, etc.) related to the random access of the NB-IoT may be illustrated as in FIG. 13. Hereinafter, specific contents of a random access procedure based on messages (e.g., msg1, msg2, msg3, and msg4) used for the random access procedure of the general NB-IoT will be described through description of FIG. 13.

FIG. 13 is a flowchart for describing a random access process in relation to a wireless system supporting a narrowband Internet of things system.

FIG. 13 illustrates an example for the random access procedure of the NB-IoT, and a name(s) of each physical channel, physical signal, and/or message may be set or named differently according to the wireless communication system to which the NB-IoT is applied. As an example, basically, FIG. 13 is described, but the NB-IoT based on the LTE system is considered, but this is only for convenience of description, and contents thereof may be extensively applied even to the NB-IoT based on the NR system, of course.

As illustrated in FIG. 13, in the case of the NB-IOT, the RACH procedure has the same message flow as LTE having different parameters.

Hereafter, in regard to the random access procedure of the NB-IOT, the NPRACH which the NB-IoT UE transmits to the base station will be described in detail.

Figure 14:
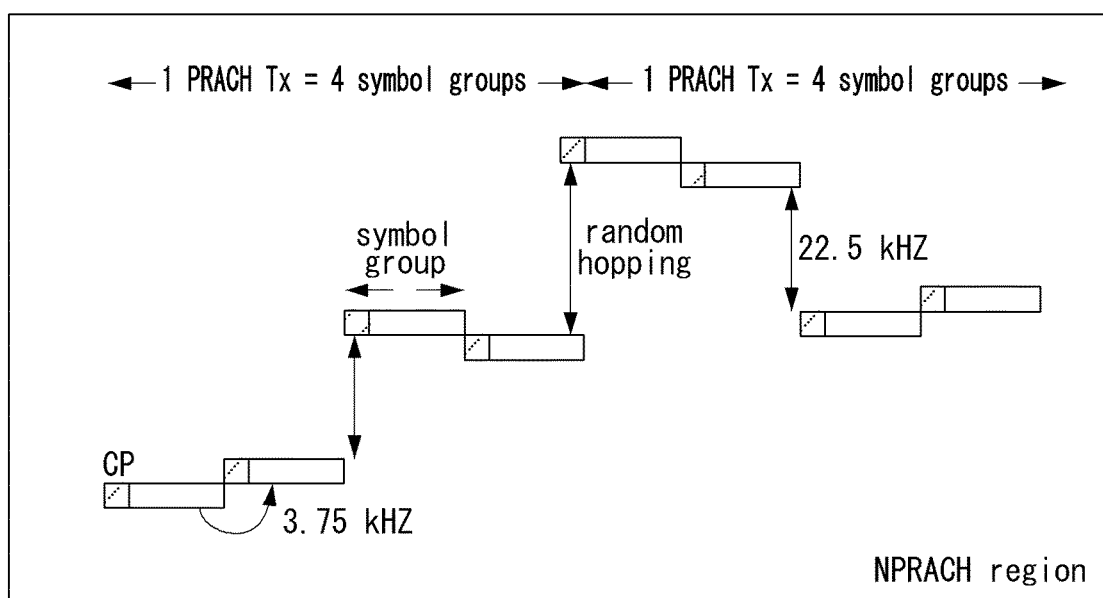
FIG. 14 illustrates a narrowband physical random access channel (NPRACH) region in relation to a radio system supporting a narrowband internet of things system.

FIG. 14 is a diagram for describing a narrowband physical random access channel (NPRACH) region in relation to a random access process in relation to a wireless system supporting a narrowband Internet of things system.

As illustrated in FIG. 14, a random access symbol group is constituted by a cyclic prefix having a length and a sequence of identical symbols having a total length. The total number of symbol groups in units of preamble repetition is represented by P. The number of time-continuous symbol groups is given by G.

Parameter values of frame structures 1 and 2 are shown in Tables 39 and 40, respectively.

TABLE 39

| Preamble format | G | P | N | $T_{CP}$ | $T_{SEQ}$ |
|---|---|---|---|---|---|
| 0 | 4 | 4 | 5 | $2048T_s$ | $5 \cdot 8192\ T_s$ |
| 1 | 4 | 4 | 5 | $8192T_s$ | $5 \cdot 8192\ T_s$ |
| 2 | 6 | 6 | 3 | $24576T_s$ | $3 \cdot 24576T_s$ |

TABLE 40

| Preamble format | Supported uplink-downlink configurations | G | P | N | $T_{CP}$ | $T_{SEQ}$ |
|---|---|---|---|---|---|---|
| 0 | 1, 2, 3, 4, 5 | 2 | 4 | 1 | $4778T_s$ | $1 \cdot 8192T_s$ |
| 1 | 1, 4 | 2 | 4 | 2 | $8192T_s$ | $2 \cdot 8192T_s$ |
| 2 | 3 | 2 | 4 | 4 | $8192T_s$ | $4 \cdot 8192T_s$ |
| 0-a | 1, 2, 3, 4, 5 | 3 | 6 | 1 | $1536T_s$ | $1 \cdot 8192T_s$ |
| 1-a | 1, 4 | 3 | 6 | 2 | $3072T_s$ | $2 \cdot 8192T_s$ |

Due to a specific uplink transmission scheme in the NB-IoT, tone information is further included in the RAR message, and an equation for deriving the Random Access Radio Network Temporary Identifier (RA-RNTI) is newly defined. In order to support transmission repetition, corresponding parameters including an RAR window size and a medium access control (MAC) contention resolution timer are extended.

Referring to FIG. 14, the physical layer random access preamble (i.e., PRACH) is based on single subcarrier/tone transmission with frequency hopping for a single user. The PRACH uses a subcarrier spacing of 3.75 kHz (i.e., a symbol length of 266.7 us), and two cyclic prefix lengths are provided to support different cell sizes. Frequency hopping is performed between random access symbol groups, and here, each symbol group includes 5 symbols and a cyclic prefix with pseudo-random hopping between repetitions of the symbol groups.

An NPRACH configuration provided by a higher layer (e.g., RRC) may include the following.

NPRACH resource periodicity $N_{period}^{NPRACH}$ (nprach-periodicity)

frequency location of the first subcarrier allocated to NPRACH, $N_{scoffset}^{NPRACH}$ (nprach-SubcarrierOffset)

The number of subcarriers allocated to NPRACH, $N_{sc}^{NPRACH}$ (nprach-NumSubcarriers)

The number of starting sub-carriers allocated to contention based NPRACH random access, $N_{sc\_cont}^{NPRACH}$ (nprach-NumCBRA-StartSubcarriers)

The number of NPRACH repetitions per attempt, $N_{rep}^{NPRACH}$ (numRepetitionsPerPreambleAttempt)

NPRACH starting time, $N_{start}^{NPRACH}$ (nprach-StartTime),

Fraction for calculating starting subcarrier index for the range of NPRACH subcarriers reserved for indication of UE support for multi-tone msg3 transmission $N_{MSG3}^{NPRACH}$ (nprach-SubcarrierMSG3-RangeStart)

NPRACH transmission can start only $N_{start}^{NPRACH} \cdot 30720T_s$ time units after the start of a radio frame fulfilling $n_f \bmod(N_{period}^{NPRACH}/10)=0$. After transmissions of $4 \cdot 64(T_{CP}+T_{SEQ})$ time units, a gap of $40 \cdot 30720T_s$ time units shall be inserted.

NPRACH configurations where $N_{scoffset}^{NPRACH} + N_{sc}^{NPRACH} > N_{sc}^{UL}$ are invalid.

The NPRACH starting subcarriers allocated to contention based random access are split in two sets of subcarriers, $\{0, 1, \ldots, N_{sc\_cont}^{NPRACH} N_{MSG3}^{NPRACH} - 1\}$ and $\{N_{sc\_cont}^{NPRACH}$ $N_{MSG3}{}^{NPRACH}, \ldots, N_{sC_{cont}}{}^{NPRACH}-1\}$, where the second set, if present, indicate UE support for multi-tone msg3 transmission.

The frequency location of the NPRACH transmission is constrained within $N_{sc}{}^{RA}=12$ subcarriers. Frequency hopping shall be used within the 12 subcarriers, where the frequency location of the $i^{th}$ symbol group is given by $n_{sc}{}^{RA}(i)=n_{start}+\tilde{n}_{sc}{}^{RA}(i)$, where $$n_{start} = N_{scoffset}^{NRPACH} + \lfloor n_{init}/N_{sc}^{RA} \rfloor \cdot N_{sc}^{RA},$$

and $$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & \begin{matrix} i \bmod 4 = 1, 3 \text{ and} \\ \tilde{n}_{sc}^{RA}(i-1) \bmod 2 = 0 \end{matrix} \\ \tilde{n}_{sc}^{RA}(i-1) - 1 & \begin{matrix} i \bmod 4 = 1, 3 \text{ and} \\ \tilde{n}_{sc}^{RA}(i-1) \bmod 2 = 1 \end{matrix} \\ \tilde{n}_{sc}^{RA}(i-1) + 6 & \begin{matrix} i \bmod 4 = 2 \text{ and} \\ \tilde{n}_{sc}^{RA}(i-1) < 6 \end{matrix} \\ \tilde{n}_{sc}^{RA}(i-1) - 6 & \begin{matrix} i \bmod 4 = 2 \text{ and} \\ \tilde{n}_{sc}^{RA}(i-1) \geq 6 \end{matrix} \end{cases}$$

$$f(t) = \left( f(t-1) + \left( \sum_{n=10t+1}^{10t+9} c(n) 2^{n-(10t+1)} \right) \bmod (N_{sc}^{RA}-1) + 1 \right) \bmod N_{sc}^{RA}$$

$$f(-1) = 0$$

where $\tilde{n}_{sc}{}^{RA}(0)=n_{init} \bmod N_{sc}{}^{RA}$ with $n_{init}$ being the subcarrier selected by the MAC layer from $\{0, 1, \ldots, N_{sc}{}^{NPRACH}-1\}$, and the pseudo random sequence $c(n)$ is given by $c(n)=(x_1(n+N_C)+x_2(n+N_c)) \bmod 2$ $x_1(n+31)=(x_i(n+3)+x_1(n)) \bmod 2$ $x_2(n+31)=(x_2(n+3)+x_2(n+2)+x_2(n+1)+x_2(n)) \bmod 2$ Where $N_C=1600$ and the first m-sequence shall be initialized with $x_1(0)=1$, $x_1(n)=0$, $n=1, 2, \ldots, 30$. The initialization of the second m-sequence may be denoted by $c_{init}=\Sigma_{i=0}{}^{30}x_2(i) \cdot 2^i$. For NPRACH, the pseudo random sequence generator shall be initialized with $c_{init}=N_{ID}{}^{Ncell}$.

In each NPRACH occurrence, $\{12, 24, 36, 48\}$ subcarriers may be supported. Further, the random access preamble transmission (i.e., PRACH) may be repeated up to $\{1, 2, 4, 8, 16, 32, 64, 128\}$ times to enhance coverage.

Discontinuous Reception (DRX) Procedure for NB-IoT

During performing the general signal transmission and reception procedure for the NB-IoT, the NB-IoT UE may switch to an idle state (e.g., RRC_IDLE state) and/or an inactive state (e.g., RRC_INACTIVE state) to reduce power consumption. In this case, the NB-IoT UE which is switched to the idle state and/or the inactive state may be configured to use a DRX scheme. For example, the NB-IoT UE which is switched to the idle state and/or the inactive state may be configured to monitor an NPDCCH related to paging only in a specific subframe (or frame, slot) according to a DRX cycle configured by the base station. Here, the NPDCCH related to paging may refer to an NPDCCH scrambled with a P-RNTI (Paging Access-RNTI).

Figure 15:
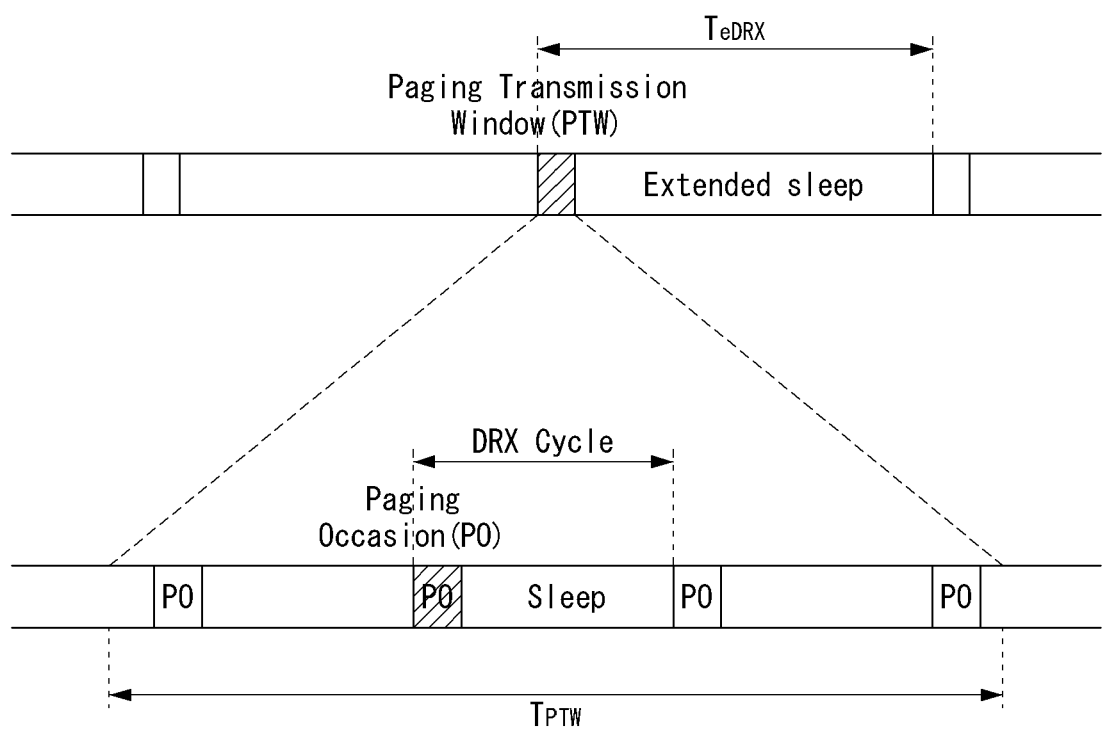
FIG. 15 illustrates an example of a discontinuous reception (DRX) scheme in an idle state and/or an inactive state.

FIG. 15 illustrates an example of a discontinuous reception (DRX) scheme in an idle state and/or an inactive state.

As shown in FIG. 15, the NB-IoT UE in the RRC_IDLE state monitors only some subframes (SFs) with respect to paging occasions (POs) within a subset of radio frames (i.e., paging frames (PFs)). Paging is used to trigger an RRC connection and to indicate a change in system information for UE in the RRC_IDLE mode.

If the NB-IoT UE detects a NPDCCH using a paging access radio network temporary identifier (P-RNTI) in the PO, then the NB-IoT UE decodes a corresponding NPDSCH. A paging message is sent on the NPDSCH and may contain a list of NB-IoT UEs to be paged and information about whether paging is for connection setup or whether system information has changed. Each NB-IoT UE which finds its ID in this list forwards to its upper layer that it is paged, and may receive in turn a command to initialize an RRC connection. If system information is changed, the NB-IoT UE may start to read SIB1-NB and may obtain from the SIB1-NB the information, which SIBs have to be read again.

If coverage enhancement repetitions are applied, the PO refers to a first transmission within the repetition. The PFs and POs are determined from the DRX cycle provided in SIB2-NB and IMSI provided by an USIM card. The DRX is the discontinuous reception of DL control channel used to save battery lifetime. Cycles of 128, 256, 512 and 1024 radio frames are supported, corresponding to a time interval between 1.28 sec and 10.24 sec. Due to the fact that an algorithm to determine the PFs and POs depends on the IMSI, different UEs have different paging occasions, which are uniformly distributed in time. It is sufficient for the UE to monitor one paging occasion within a DRX cycle, and the paging is repeated in every one of them if there are several paging occasions therein.

The concept of extended DRX (eDRX) may be applied for NB-IoT as well. This is done using hyper frames (HFNs). If eDRX is supported, then a time interval in which the UE does not monitor the paging messages may be extended, up to 3 hours. Hence, the UE shall know on which HFN and on which time interval within this HFN, the paging time window (PTW), it has to monitor the paging. The PTW is defined by a start and stop SFN. Within the PTW, the determination of the PFs and POs is done in the same way as for the non-extended DRX.

Figure 16:
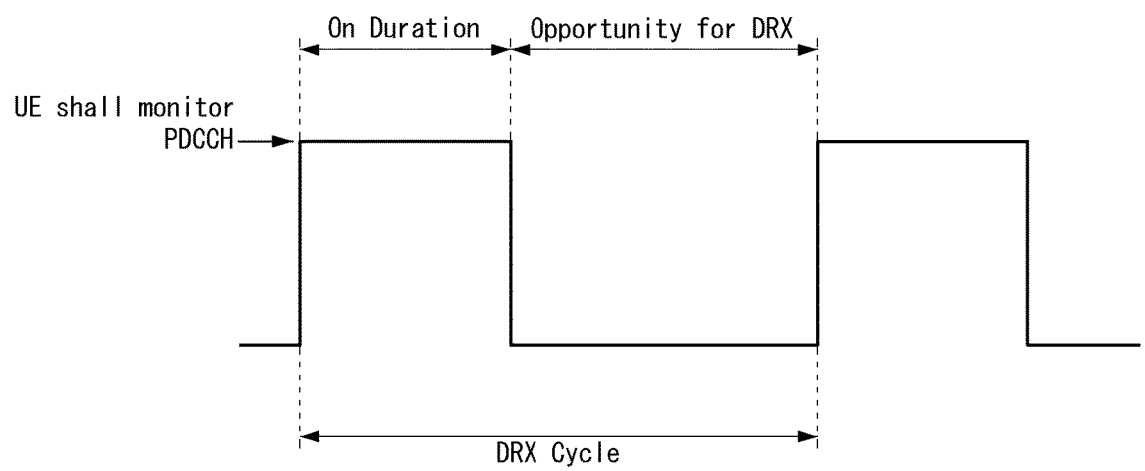
FIG. 16 illustrates an example of a DRX cycle.

FIG. 16 illustrates an example of a DRX cycle.

As shown in FIG. 16, the DRX cycle specifies the periodic repetition of the On-duration followed by a possible period of inactivity. The MAC entity may be configured by RRC with a DRX functionality that controls the UE's PDCCH monitoring activity for the MAC entity's RNTIs (e.g., C-RNTI). Thus, the NB-IoT UE monitors the PDCCH for a short period (e.g., on-duration), and may stop monitoring the PDCCH for a long period (e.g., opportunity for DRX). When in RRC_CONNECTED, if DRX is configured (i.e., connected mode DRX (CDRX)), the MAC entity may monitor the PDCCH discontinuously using the DRX operation specified below. Otherwise the MAC entity monitors the PDCCH continuously. For NB-IoT, the PDCCH may refer to the NPDCCH. For NB-IoT, an extended DRX cycle of 10.24 s is supported in RRC Connected.

RRC controls DRX operation by configuring the timers onDurationTimer, drx-InactivityTimer, drx-Retransmission-Timer (for HARQ processes scheduled using 1 ms TTI, one per DL HARQ process except for the broadcast process), drx-RetransmissionTimerShortTTI (for HARQ processes scheduled using short TTI, one per DL HARQ process), drx-ULRetransmissionTimer (for HARQ processes scheduled using 1 ms TTI, one per asynchronous UL HARQ process), drx-ULRetransmissionTimerShortTTI (for HARQ processes scheduled using short TTI, one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process are also defined.

First, definitions for the terms are provided as follows.

onDurationTimer: specifies the number of consecutive PDCCH-subframe(s) at the beginning of a DRX cycle.

drx-InactivityTimer: except for NB-IoT, it specifies the number of consecutive PDCCH-subframe(s) after the subframe in which a PDCCH indicates an initial UL, DL or SL user data transmission for this MAC entity. For NB-IoT, it specifies the number of consecutive PDCCH-subframe(s) after the subframe in which the HARQ RTT timer or UL HARQ RTT timer expires.

drx-RetransmissionTimer: specifies the maximum number of consecutive PDCCH-subframe(s) until a DL retransmission is received.

drx-ULRetransmissionTimer: specifies the maximum number of consecutive PDCCH-subframe(s) until a grant for UL retransmission is received.

drxShortCycleTimer: specifies the number of consecutive subframe(s) the MAC entity shall follow the short DRX cycle.

drxStartOffset: specifies the subframe where the DRX cycle starts.

HARQ RTT Timer: this parameter specifies the minimum amount of subframe(s) before a DL HARQ retransmission is expected by the MAC entity.

PDCCH-subframe: refers to a subframe with PDCCH. For a FDD serving cell, this may represent any subframe. For a TDD serving cell, this may represent a downlink subframe or a subframe including DwPTS of the TDD UL/DL configuration.

Active time: time related to DRX operation, during which the MAC entity monitors the PDCCH.

When a DRX cycle is configured, the active time includes the time while:
- onDurationTimer or drx-InactivityTimer or drx-RetransmissionTimer or drx-RetransmissionTimerShortTTI or drx-ULRetransmissionTimer or drx-ULRetransmissionTimerShortTTI or mac-ContentionResolutionTimer is running; or
- a Scheduling Request is sent on PUCCH/SPUCCH and is pending; or
- an uplink grant for a pending HARQ retransmission can occur and there is data in the corresponding HARQ buffer for synchronous HARQ process; or
- a PDCCH indicating a new transmission addressed to the C-RNTI of the MAC entity has not been received after successful reception of a Random Access Response for the preamble not selected by the MAC entity.

When DRX is configured, the MAC entity shall for each subframe:
  if a HARQ RTT Timer expires in this subframe:
  if the data of the corresponding HARQ process is not successfully decoded:
    start the drx-RetransmissionTimer or drx-RetransmissionTimerShortTTI for the corresponding HARQ process.
  if NB-IoT, start or restart the drx-InactivityTimer.
  if an UL HARQ RTT Timer expires in this subframe:
    start the drx-ULRetransmissionTimer or drx-ULRetransmissionTimerShortTTI for the corresponding HARQ process.
  if NB-IoT, start or restart the drx-InactivityTimer.
  if a DRX Command MAC control element or a Long DRX Command MAC control element is received:
  stop onDurationTimer;
  stop drx-InactivityTimer.
  if drx-InactivityTimer expires or a DRX Command MAC control element is received in this subframe:
  if the Short DRX cycle is configured:
  start or restart drxShortCycleTimer;
  use the Short DRX Cycle.
  if the Short DRX cycle is not configured:
  use the Long DRX cycle.
  if drxShortCycleTimer expires in this subframe:
  use the Long DRX cycle.
  if the Long DRX Command MAC control element is received:
  stop drxShortCycleTimer;
  use the Long DRX cycle.
  if the Short DRX cycle is used and [(SFN*10)+subframe number]modulo (shortDRX-Cycle)=(drxStartOffset) modulo (shortDRX-Cycle); or
  if the Long DRX Cycle is used and [(SFN*10)+subframe number]modulo (longDRX-Cycle)=drxStartOffset:
  if NB-IoT:
  if there is at least one HARQ process for which neither HARQ RTT Timer nor UL HARQ RTT Timer is running, start onDurationTimer.
  if not NB-IoT:
  start onDurationTimer.
  during the Active Time, for a PDCCH-subframe, if the subframe is not required for uplink transmission for half-duplex FDD UE operation, and if the subframe is not a half-duplex guard subframe and if the subframe is not part of a configured measurement gap, and for NB-IoT if the subframe is not required for uplink transmission or downlink reception other than on PDCCH:
  monitor PDCCH;
  if the PDCCH indicates a DL transmission or if a DL assignment has been configured for this subframe:
  if the UE is a NB-IoT UE:
  start the HARQ RTT Timer for the corresponding HARQ process in the subframe containing the last repetition of the corresponding PDSCH reception;
  if the UE is not a NB-IoT UE:
  start the HARQ RTT Timer for the corresponding HARQ process;
  stop the drx-RetransmissionTimer or drx-RetransmissionTimerShortTTIfor the corresponding HARQ process.
  if NB-IoT, stop drx-ULRetransmissionTimer for all UL HARQ processes.
  if the PDCCH indicates an UL transmission for an asynchronous HARQ process or if an UL grant has been configured for an asynchronous HARQ process for this subframe, or if the PDCCH indicates an UL transmission for an autonomous HARQ process; or
  if the uplink grant is a configured grant for the MAC entity's AUL C-RNTI and if the corresponding PUSCH transmission has been performed in this subframe:
  stop the drx-ULRetransmissionTimer or drx-ULRetransmissionTimerShortTTI for the corresponding HARQ process;
  if NB-IoT, stop drx-RetransmissionTimer for all DL HARQ processes.

if the PDCCH indicates a transmission (DL, UL) for a NB-IoT UE:
  if the NB-IoT UE is configured with a single DL and UL HARQ process:
    stop drx-InactivityTimer.
    stop onDurationTimer.
    if the PUSCH transmission is completed:
      stop drx-ULRetransmissionTimer for all UL HARQ processes.
  if the PDCCH indicates HARQ feedback for one or more HARQ processes for which UL HARQ operation is autonomous:
    stop drx-ULRetransmissionTimer for the corresponding HARQ process(es).

When the NB-IoT UE receives PDCCH, the UE executes the corresponding action specified in the above in the subframe following the subframe containing the last repetition of the PDCCH reception where such subframe is determined by the starting subframe and the DCI subframe repetition number field in the PDCCH, unless explicitly stated otherwise.

The same Active Time applies to all activated serving cells. For NB-IoT, except for operation in TDD mode, DL and UL transmissions will not be scheduled in parallel. That is, if a DL transmission has been scheduled, an UL transmission will not be scheduled until HARQ RTT Timer of the DL HARQ process has expired (and vice versa).

MTC (Machine Type Communication)

MTC has been mainly designed to use LTE for machine-to-machine (M2M) or Internet of things (IoT). In general, such an application requires not that much throughput (in most case it needs very low throughput). The key requirements of M2M communications include cost reduction, reduced power consumption, enhanced coverage, etc.

To facilitate MTC, long-term evolution (LTE) Release 12 has introduced some initial features, such as new low-cost user equipment (UE) category, power saving mode (PSM), and UE assistance information for evolved NodeB (eNB) parameter tuning. The new low-cost UE category introduced in LTE Release 12 is called as Category 0. In order to reduce the baseband and RF complexity of the UE, the Category 0 defines reduced peak data rate (e.g. 1 Mbps), half duplex operation with relaxed radio frequency (RF) requirements, and a single receive antenna. The PSM allows the UE to greatly reduce power consumption for applications with delay-tolerant mobile-originated (MO) traffic in order to achieve years of battery lifetime.

Enhanced MTC (eMTC)

In LTE Release 13, additional improvements have been introduced to further drive down the cost and power consumption, i.e., eMTC. The eMTC introduces a set of physical layer features aiming to reduce the cost and power consumption of UEs and extending coverage, while at the same time reusing most of the LTE physical layer procedures. An eMTC UE can be deployed in any eNB configured to support eMTC and can be served together with other LTE UEs by the same eNB. The main features introduced by eMTC are as follows.

Narrowband operation: An eMTC UE follows narrowband operation for the transmission and reception of physical channels and signals. The eMTC supporting narrowband operation is called a bandwidth reduced low complexity (BL) UE.
  A BL UE can operate in any LTE system bandwidth but with a limited channel bandwidth of 6 PRBs (physical resource blocks), which corresponds to the maximum channel bandwidth available in a 1.4 MHz LTE system, in downlink and uplink.
  6 PRBs is selected to allow the eMTC UE to follow the same cell search and random access procedures as legacy UEs, which use the channels and signals that occupy 6 RBs: primary synchronization signal (PSS), secondary synchronization signal (SSS), physical broadcast channel (PBCH), and physical random access channel (PRACH).
  The eMTC UE can be served by a cell with much larger bandwidth (e.g. 10 MHz), but the physical channels and signals transmitted or received by the eMTC UE are always contained in 6 PRBs.
  Low cost and simplified operation: Many features introduced for Category 0 UEs are maintained for eMTC UEs, such as a single receive antenna, reduced soft buffer size, reduced peak data rate (1 Mbps), and half duplex operation with relaxed switching time. The following new features are introduced to further reduce the cost of eMTC UEs. Specifically, reduced transmission mode support, reduced number of blind decodings for control channel, no simultaneous reception (a UE is not required to decode unicast and broadcast data simultaneously), and the aforementioned narrowband operation have been introduced.
  Transmission of downlink control information (DCI): Instead of the legacy control channel (i.e., physical downlink control channel (PDCCH)), a new control channel called MTC PDCCH (MPDCCH) is introduced. This new control channel spans up to 6 PRBs in the frequency domain and one subframe in the time domain. The MPDCCH is similar to enhanced PDCCH (EPDCCH), with the additional support of common search space for paging and random access. Furthermore, instead of physical control format indicator channel (PCFICH) to indicate the size of the control region, the size of the control region is semi-statically signalled in the system information block (SIB), so eMTC devices do not need to decode PCFICH. Further, instead of physical hybrid automatic repeat request (HARQ) indicator channel (PHICH) to transmit HARQ feedback for uplink transmissions, there is no support of the PHICH, and retransmissions are adaptive, asynchronous, and based on new scheduling assignment received in an MPDCCH.
  Extended coverage: The presence of devices in extreme coverage conditions (e.g. a meter in a basement) requires the UEs to operate with much lower signal-to-noise ratio (SNR). The enhanced coverage is obtained by repeating in time almost every channel beyond one subframe (1 ms) to accumulate enough energy to decode. Repetition is extended up to 2048 subframes for the data channels in Release 13 eMTC. The following channels support repetition in eMTC: physical downlink shared channel (PDSCH), physical uplink shared channel (PUSCH), MPDCCH, PRACH, physical uplink control channel (PUCCH), and PBCH. Two modes of operation are introduced to support coverage enhancement (CE). CE mode A is defined for small coverage enhancements, for which full mobility and channel state information (CSI) feedback are supported. CE mode B is defined for UE in extremely poor coverage conditions, for which no CSI feedback and limited mobility are supported.
  Frequency diversity by RF retuning: In order to reduce the effect of fading and outages, frequency hopping is introduced among different narrowbands by RF retuning. This hopping is applied to the different uplink and downlink physical channels when repetition is enabled. For example, if 32 subframes are used for transmission of PDSCH, the 16 first subframes may be transmitted over the first narrowband; then the RF front-end is retuned to a different narrowband, and the remaining 16 subframes are transmitted over the second narrowband.

Cell Search for MTC

Cell search is the procedure by which a UE acquires time and frequency synchronization with a cell and detects the cell ID of that cell. E-UTRA cell search supports a scalable overall transmission bandwidth corresponding to 6 RBs and upwards. PSS and SSS are transmitted in the downlink to facilitate cell search. If a resynchronization signal is transmitted in the downlink, it can be used to re-acquire time and frequency synchronization with the cell. Physical layer provides 504 unique cell identities using synchronization signals.

The UE searches for the PSS/SSS in the center 6 PRBs to obtain the cell ID, subframe timing information, duplexing mode (time division duplex (TDD), or frequency division duplex (FDD)), and cyclic prefix (CP) length. The PSS uses Zadoff-Chu (ZC) sequence. For frame structure type 1 (i.e., FDD), the PSS shall be mapped to the last orthogonal frequency division multiplexing (OFDM) symbol in slots 0 and 10. For frame structure type 2 (i.e., TDD), the PSS shall be mapped to the third OFDM symbol in subframes 1 and 6. The SSS uses an interleaved concatenation of two length-31 binary sequences. The concatenated sequence is scrambled with a scrambling sequence given by the PSS. For FDD, the SSS shall be mapped to OFDM symbol number $N_{symb}^{DL-2}$ in slots 0 and 10, where $N_{symb}^{DL}$ is the number of OFDM symbols in a downlink slot. For TDD, the SSS shall be mapped to OFDM symbol number $N_{symb}^{DL-1}$ in slots 1 and 11, where $N_{symb}^{DL}$ is the number of OFDM symbols in a downlink slot.

System Information Acquisition for MTC

Upon searching the cell by using the PSS/SSS, the UE acquires system information (SI). This is described below with reference to FIG. 17.

Figure 17:
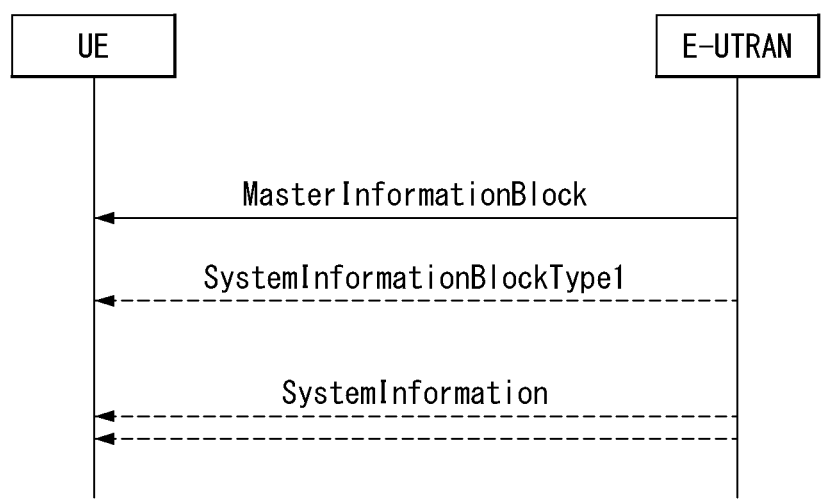
FIG. 17 illustrates a general system regarding a system information acquisition procedure.

FIG. 17 illustrates a general system regarding a system information acquisition procedure.

The UE applies the system information acquisition procedure to acquire the access stratum (AS) and non-access stratum (NAS) system information that is broadcasted by the E-UTRAN. The procedure applies to UEs in RRC_IDLE and UEs in RRC_CONNECTED.

System information is divided into a master information block (MIB; MasterInformationBlock) and a number of system information blocks (SIBs). The MIB defines the most essential physical layer information of the cell required to receive further system information. The MIB is transmitted on PBCH. SIBs other than system information block type-1 (SIB1; SystemInformationBlockType1) are carried in SI messages and mapping of SIBs to SI messages is flexibly configurable by SchedulingInfoList included in SystemInformationBlockType1, with restrictions that: each SIB is contained only in a single SI message, and at most once in that message; only SIBs having the same scheduling requirement (periodicity) can be mapped to the same SI message; system information block type-1 (SIB2; SystemInformationBlockType2) is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH. The BL UEs and UEs in CE apply BR version of the SIB or SI messages, for example.

The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For TDD/FDD system with a bandwidth larger than 1.4 MHz that supports BL UEs or UEs in CE, it is scheduled in subframe #0 of the same radio frame, and in subframe #5 of the same radio frame for FDD and TDD.

The SystemInformationBlockType1 contain information relevant when evaluating if a UE is allowed to access a cell and defines the scheduling of other system information blocks. The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

For BL UEs or UEs in CE, MIB is applied which may be provided with additional repetitions, while for SIB1 and further SI messages, separate messages are used which are scheduled independently and with content that may differ. The separate instance of SIB1 is named as SystemInformationBlockType1-BR. The SystemInformationBlockType1-BR includes information such as valid downlink and uplink subframes, maximum support of coverage enhancement, and scheduling information for other SIBs. The SystemInformationBlockType1-BR is transmitted over PDSCH directly, without any control channel associated with it. The SystemInformationBlockType1-BR uses a schedule with a periodicity of 80 ms. Transport block size (TBS) for SystemInformationBlockType1-BR and the repetitions made within 80 ms are indicated via scheduling information SIB1-BR in MIB or optionally in the RRCConnectionReconfiguration message including the MobilityControlInfo. Specifically, five reserved bits in the MIB are used in eMTC to convey scheduling information about SystemInformationBlockType1-BR, including time and frequency location, and transport block size. SIB-BR remains unchanged for 512 radio frames (5120 ms) to allow a large number of subframes to be combined.

The SI messages are transmitted within periodically occurring time domain windows (referred to as SI-windows) using dynamic scheduling. Each SI message is associated with a SI-window, and the SI-windows of different SI messages do not overlap. That is, within one SI-window only the corresponding SI is transmitted. The length of the SI-window is common for all SI messages and is configurable. Within the SI-window, the corresponding SI message can be transmitted a number of times in any subframe other than multimedia broadcast multicast service single frequency network (MBSFN) subframes, uplink subframes in TDD, and subframe #5 of radio frames for which SFN mod 2=0. The UE acquires the detailed time-domain scheduling (and other information, e.g., frequency-domain scheduling, used transport format) from decoding system information radio network temporary identity (SI-RNTI) on PDCCH. For a BL UE or a UE in CE, the detailed time/frequency domain scheduling information for the SI messages is provided in SystemInformationBlockType1-BR.

The SystemInformationBlockType2 contains common and shared channel information. After decoding all the necessary SIBs, the UE is able to access the cell by starting a random access procedure.

Random Access Procedure for MTC

The random access procedure is performed for the following events.
- initial access from RRC_IDLE;
- RRC connection re-establishment procedure;
- Handover;
- DL data arrival during RRC_CONNECTED requiring random access procedure;
- UL data arrival during RRC_CONNECTED requiring random access procedure;
- For positioning purpose during RRC_CONNECTED requiring random access procedure.

The legacy random access procedure and the random access procedure for eMTC are same in terms of general big picture and overall protocol sequence. That is, the main purpose of the random access procedure is to achieve uplink synchronization and obtain the grant for initial attach. Overall protocol sequence of the random access procedure is made up of four messages, i.e., Msg1, Msg2, Msg3 and Msg4. Basic information about the random access procedure is informed to the UE via SIB2.

On the other hand, the random access procedure for eMTC supports the signalling of different PRACH resources and different CE levels. This provides some control of the near-far effect for a PRACH by grouping together UEs that experience similar path loss. Up to four different PRACH resources can be signalled, each one with a reference signal received power (RSRP) threshold. The UE estimates the RSRP using the downlink cell-specific reference signal (CRS), and based on the measurement result selects one of the resources for random access. Each of these four resources has an associated number of repetitions for a PRACH and number of repetitions for the random access response (RAR). Thus, a UE in bad coverage would need a larger number of repetitions to be successfully detected by the eNB and need to receive the RAR with the corresponding number of repetitions to meet their CE level. The search spaces for RAR and contention resolution messages are also defined in the system information, separately for each CE level. The UE can be configured to be in either CE mode A or CE mode B with a UE-specific search space to receive uplink grants and downlink assignments.

A random access procedure for eMTC is described in more detail.

The random access procedure is initiated by a PDCCH order, by the media access control (MAC) sub-layer itself or by the radio resource control (RRC) sub-layer. The random access procedure on a secondary cell (SCell) shall only be initiated by a PDCCH order. If a MAC entity receives a PDCCH transmission consistent with a PDCCH order masked with its cell RNTI (C-RNTI), and for a specific serving cell, the MAC entity shall initiate a random access procedure on this serving cell. For random access on the speciall cell (SpCell), a PDCCH order or RRC optionally indicate the ra-PreambleIndex and the ra-PRACH-MaskIndex; and for random access on an SCell, the PDCCH order indicates the ra-PreambleIndex with a value different from 000000 and the ra-PRACH-MaskIndex. For the primary timing advance group (pTAG), preamble transmission on PRACH and reception of a PDCCH order are only supported for SpCell.

The following information for a related serving cell is assumed to be available before the procedure can be initiated for BL UEs or UEs in CE.

- the available set of PRACH resources associated with each enhanced coverage level supported in the serving cell for the transmission of the random access preamble, prach-ConfigIndex.
- the groups of random access preambles and the set of available random access preambles in each group (SpCell only):
  if sizeOfRA-PreamblesGroupA is not equal to numberOfRA-Preambles:
    random access preamble groups A and B exist and are calculated as above;
  if sizeOfRA-PreamblesGroupA is equal to numberOfRA-Preambles:
    the preambles that are contained in random access preamble groups for each enhanced coverage level, if it exists, are the preambles firstPreamble to lastPreamble.
- the criteria to select PRACH resources based on RSRP measurement per CE level supported in the serving cell rsrp-ThresholdsPrachInfoList.
- the maximum number of preamble transmission attempts per CE level supported in the serving cell maxNumPreambleAttemptCE.
- the number of repetitions required for preamble transmission per attempt for each CE level supported in the serving cell numRepetitionPerPreambleAttempt.
- the configured UE transmitted power of the serving cell performing the random access procedure, PCMAX, c.
- the RA response window size ra-ResponseWindowSize and the contention resolution timer mac-ContentionResolutionTimer (SpCell only) per CE level supported in the serving cell.
- the power-ramping factor powerRampingStep and optionally powerRampingStepCE1.
- the maximum number of preamble transmission TransMax-CE.
- the initial preamble power preambleInitialReceivedTargetPower and optionally preambleInitialReceivedTargetPowerCE1.
- the preamble format based offset DELTA_PREAMBLE.

The random access procedure shall be performed as follows.

1> flush the Msg3 buffer;
1> set the PREAMBLE TRANSMISSION COUNTER to 1;
1> if the UE is a BL UE or a UE in CE:
  2> set the PREAMBLE TRANSMISSION COUNTER CE to 1;
  2> if the starting CE level has been indicated in the PDCCH order which initiated the random access procedure, or if the starting CE level has been provided by upper layers:
    3> the MAC entity considers itself to be in that CE level regardless of the measured RSRP;
  2> else:
    3> if the RSRP threshold of CE level 3 is configured by upper layers in rsrp-ThresholdsPrachInfoList and the measured RSRP is less than the RSRP threshold of CE level 3 and the UE is capable of CE level 3 then:
      4> the MAC entity considers to be in CE level 3;
    3> else if the RSRP threshold of CE level 2 is configured by upper layers in rsrp-ThresholdsPrachInfoList and the measured RSRP is less than the RSRP threshold of CE level 2 and the UE is capable of CE level 2 then:
      4> the MAC entity considers to be in CE level 2;
    3> else if the measured RSRP is less than the RSRP threshold of CE level 1 as configured by upper layers in rsrp-ThresholdsPrachInfoList then:

4> the MAC entity considers to be in CE level 1;
3> else:
4> the MAC entity considers to be in CE level 0;
1> set the backoff parameter value to 0 ms;
1> proceed to the selection of the random access resource.

A random access preamble (referred to as "Msg1") is transmitted over PRACH. A UE randomly selects one random access preamble from a set of random access preambles indicated by system information or a handover command, selects a PRACH resource able to transmit the random access preamble, and transmits the same.

The physical layer random access preamble consists of a cyclic prefix of length TCP and a sequence part of length TSEQ. The parameter values are listed in Table 32 below and may depend on the frame structure and the random access configuration. Higher layers control the preamble format.

TABLE 41

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24526 \cdot T_s$ |
| 4 | $448 \cdot T_s$ | $4096 \cdot T_s$ |

The transmission of a random access preamble, if triggered by the MAC layer, is restricted to certain time and frequency resources. These resources are enumerated in increasing order of the subframe number within the radio frame and the PRBs in the frequency domain such that index 0 corresponds to the lowest numbered PRB and subframe within the radio frame. PRACH resources within the radio frame are indicated by a PRACH configuration index.

For BL/CE UEs, for each PRACH CE level, there is a PRACH configuration configured by higher layers with a PRACH configuration index (prach-ConfigurationIndex), a PRACH frequency offset $\bar{n}_{PRBoffset}^{RA}$ (prach-FrequencyOffset), a number of PRACH repetitions per attempt $N_{rep}^{PRACH}$ (numRepetitionPerPreambleAttempt) and optionally a PRACH starting subframe periodicity $N_{start}^{PRACH}$ (prach-StartingSubframe). PRACH of preamble format 0-3 is transmitted $N_{rep}^{PRACH} \geq 1$ times, whereas PRACH of preamble format 4 is transmitted one time only.

For BL/CE UEs and for each PRACH CE level, if frequency hopping is enabled for a PRACH configuration by the higher-layer parameter prach-HoppingConfig, the value of the parameter $n_{PRB\ offset}^{RA}$ depends on the system frame number (SFN) and the PRACH configuration index and is given as follows.

In case the PRACH configuration index is such that a PRACH resource occurs in every radio frame, $$n_{PRB\ offset}^{RA} = \begin{cases} \bar{n}_{PRB\ offset}^{RA} & \text{if } n_f \bmod 2 = 0 \\ (\bar{n}_{PRB\ offset}^{RA} + f_{PRB,hop}^{PRACH}) \bmod N_{RB}^{UL} & \text{if } n_f \bmod 2 = 1 \end{cases}$$

- otherwise $$n_{PRB\ offset}^{RA} = \begin{cases} \bar{n}_{PRB\ offset}^{RA} & \text{if } \left\lfloor \frac{n_f \bmod 4}{2} \right\rfloor = 0 \\ (\bar{n}_{PRB\ offset}^{RA} + f_{PRB,hop}^{PRACH}) \bmod N_{RB}^{UL} & \text{if } \left\lfloor \frac{n_f \bmod 4}{2} \right\rfloor = 1 \end{cases},$$

where $n_f$ is the system frame number corresponding to the first subframe for each PRACH repetition, $f_{PRB,hop}^{PRACH}$ corresponds to a cell-specific higher-layer parameter prach-HoppingOffset. If frequency hopping is not enabled for the PRACH configuration, then $n_{PRB\ offset}^{RA} = \bar{n}_{PRB\ offset}^{RA}$.

For BL/CE UEs, only a subset of the subframes allowed for preamble transmission are allowed as starting subframes for the $N_{rep}^{PRACH}$ repetitions. The allowed starting subframes for a PRACH configuration are determined as follows:

Enumerate the subframes that are allowed for preamble transmission for the PRACH configuration as $n_{sf}^{RA}=0, \ldots N_{sf}^{RA}-1$, where $n_{sf}^{RA}=0$ and $n_{sf}^{RA}=N_{sf}^{RA}-1$ correspond to the two subframes allowed for preamble transmission with the smallest and the largest absolute subframe number $n_{sf}^{abs}$, respectively.

If a PRACH starting subframe periodicity $N_{start}^{PRACH}$ is not provided by higher layers, the periodicity of the allowed starting subframes in terms of subframes allowed for preamble transmission is $N_{rep}^{PRACH}$. The allowed starting subframes defined over $n_{sf}^{RA}=0, \ldots N_{sf}^{RA}-1$ are given by $jN_{rep}^{PRACH}$, where $j=0, 1, 2 \ldots$.

If a PRACH starting subframe periodicity $N_{start}^{PRACH}$ is provided by higher layers, it indicates the periodicity of the allowed starting subframes in terms of subframes allowed for preamble transmission. The allowed starting subframes defined over $n_{sf}^{RA}=0, \ldots N_{sf}^{RA}-1$ are given by $jN_{rep}^{PRACH}+N_{rep}^{PRACH}$ where $j=0, 1, 2 \ldots$.

No starting subframe defined over $n_{sf}^{RA}=0, \ldots N_{sf}^{RA}-1$ such that $n_{sf}^{RA}>N_{sf}^{RA}-N_{rep}^{PRACH}$ is allowed.

The random access preambles are generated from Zadoff-Chu (ZC) sequences with zero correlation zone, generated from one or several root Zadoff-Chu sequences. The network configures the set of preamble sequences the UE is allowed to use.

There are up to two sets of 64 preambles available in a cell, where Set 1 corresponds to higher layer PRACH configuration using prach-ConfigurationIndex and prach-FrequencyOffset, and Set 2, if configured, corresponds to higher layer PRACH configuration using prach-ConfigurationIndexHighSpeed and prach-FrequencyOffsetHighSpeed.

The set of 64 preamble sequences in a cell may be found by including first, in the order of increasing cyclic shift, all the available cyclic shifts of a root Zadoff-Chu sequence with the logical index rootSequenceIndexHighSpeed (for Set 2, if configured) or with the logical index RACH ROOT SEQUENCE (for Set 1), where both rootSequenceIndexHighSpeed and RACH ROOT SEQUENCE are broadcasted as part of the system information. Additional preamble sequences, in case 64 preambles cannot be generated from a single root Zadoff-Chu sequence, are obtained from the root sequences with the consecutive logical indexes until all the 64 sequences are found.

2. After the random access preamble is transmitted, the UE attempts to receive a random access response (may be referred to as "Msg2") hereof generated by MAC on DL-SCH within a random access response reception window indicated by the system information or the handover command. In detail, the random access response information is transmitted in the form of a MAC PDU, and the MAC PDU is transferred on a physical downlink shared channel (PDSCH).

In order to allow the UE to properly receive the information transmitted on the PDSCH, a PDCCH is also transferred together. For eMTC, the MPDCCH is newly introduced.

MPDCCH carries downlink control information and is transmitted across $N_{rep}^{MPDCCH} \geq 1$ consecutive BL/CE DL subframes. Within each of the $N_{rep}^{MPDCCH}$, BL/CE DL subframes, an MPDCCH is transmitted using an aggregation of one or several consecutive enhanced control channel elements (ECCEs), where each ECCE consists of multiple enhanced resource element groups (EREGs). Furthermore, the narrowband for MPDCCH is determined by SIB2 parameter mpdcch-NarrowbandsToMonitor.

The MPDCCH includes information regarding a UE which is to receive the PDSCH, frequency and time information of radio resource of the PDSCH, a transmission format of the PDSCH, and the like. When the UE successfully receives the MPDCCH destined therefor, the UE appropriately receives the random access response transmitted on the PDSCH according to the information items of the MPDCCH. The random access response includes a random access preamble identifier (ID), a UL grant (uplink radio resource), C-RNTI, and a time alignment command (TAC). In the above, the reason why the random access preamble identifier is required is that, since a single random access response may include random access response information for one or more UEs, so the random access preamble identifier informs for which UE the UL grant, temporary C-RNTI, and TAC are valid. The random access preamble identifier is identical to a random access preamble selected by the UE in step 1. UL grant included in the random access response depends on CE mode.

3. When the UE receives the random access response valid therefor, the UE processes the information items included in the random access response. That is, the UE applies the TAC and stores the temporary C-RNTI. Also, the UE transmits scheduled data (may be referred to as "Msg3") stored in a buffer thereof or newly generated data to the base station by using the UL grant on UL-SCH. In this case, an identifier of the UE should be included in the data included in the UL grant. The reason is because, in the contention based random access procedure, the base station cannot determine which UEs perform the random access procedure, so in order to resolve collision later, the base station should identify UEs. Also, there are two types of methods for including an identifier of the UE. A first method is that when the UE has a valid cell identifier already allocated in the corresponding cell before the random access procedure, the UE transmits its cell identifier through the UL grant. When the UE has not been allocated a valid cell identifier before the random access procedure, the UE includes its unique identifier (e.g., S-TMSI) or a random ID in data and transmits the same. In general, the unique identifier is longer than a cell identifier. When the UE transmits the data through the UL grant, the UE starts a contention resolution timer.

4. After the UE transmits the data including its identifier through the UL grant included in the random access response, the UE waits for an instruction from the base station for a contention resolution (may be referred to as "Msg4"). That is, in order to receive a particular message, the UE attempts to receive the MPDCCH. There are two methods for receiving the MPDCCH. As described above, if the identifier of the UE transmitted via the UL grant is a cell identifier, the UE attempts to receive the MPDCCH by using its cell identifier, and if the identifier is a unique identifier, the UE attempts to receive the MPDCCH by using the temporary C-RNTI included in the random access response. Hereafter, in the former case, when the MPDCCH is received through its cell identifier before the contention resolution timer expires, the UE determines that the random access procedure has been normally performed, and terminates the random access procedure. In the latter case, when the UE receives the MPDCCH through the temporary cell identifier before the contention resolution time expires, the UE checks data transferred by the PDSCH indicated by the MPDCCH. If the data content includes its unique identifier, the UE determines that the random access procedure has been normally performed, and terminates the random access procedure.

At completion of the random access procedure, the MAC entity shall:
  discard explicitly signalled ra-PreambleIndex and ra-PRACH-MaskIndex;
  flush the HARQ buffer used for transmission of the MAC PDU in the Msg3 buffer.

Extended Discontinuous Reception (DRX)

Extended DRX cycles are introduced in LTE Release 13 for both idle and connected modes, thus enabling further UE power savings when the UE is not required to be reachable as frequently. For the idle mode, the maximum possible DRX cycle length is extended to 43.69 min, while for connected mode the maximum DRX cycle is extended up to 10.24 sec. Since the SFN wraps around every 1024 radio frames (i.e., 10.24 sec), eDRX introduces hyper-SFN (H-SFN) cycles to enable an extended common time reference to be used for paging coordination between the UE and the network. The H-SFN is broadcast by the cell and increments by one when the SFN wraps around (i.e., every 10.24 sec). The maximum eDRX cycle corresponds to 256 hyper-frames.

A UE configured with an eDRX cycle in the idle mode monitors the control channel for paging during a paging transmission window (PTW). The PTW is periodic with starting time defined by a paging hyper-frame (PH), which is based on a formula that is known by the mobility managing entity (MME), UE, and eNB as a function of the eDRX cycle and UE identity. During the PTW, the UE monitors paging according to the legacy DRX cycle (TDRX) for the duration of the PTW or until a paging message is received for the UE, whichever is earlier. During the idle time outside of the PTW, the UE power (Pdeep_sleep) will generally be much lower than the sleep power within the PTW (Psleep). The transition to the deep-sleep state is not instantaneous and requires some preparation time for the UE to load or save the context into non-volatile memory. Hence, in order to take full advantage of power savings in deep-sleep state, the eDRX cycle (TeDRX) should be sufficiently long and the PTW as small as possible.

The description illustrated in FIGS. 1 to 17 can be applied to clarify or specify the present disclosure.

The present disclosure relates to a method of defining and supporting narrowband (NB) and wideband (WB) for efficiently supporting LTE machine type communication (MTC) services with various frequency bandwidths, in order to support LTE MTC services in various frequency environments, the number of supported UEs, an amount of data, etc. upon standalone operation of LTE MTC.

In the present disclosure, for convenience of explanation, LTE-MTC supporting only an existing LTE in-band operation is referred to as 'eMTC', MTC supporting a standalone operation is referred to as sMTC', and legacy LTE is referred to as 'LTE'.

The present disclosure also includes, in the sMTC category, a UE or service implementing additional functions compared to eMTC, in order to efficiently operate in NR in-band. The terms for explaining methods described in the present disclosure are as follows.

In the present disclosure, band refarming means that a specific frequency is reused in other communication services (LTE, NR, etc.).

Figure 18:
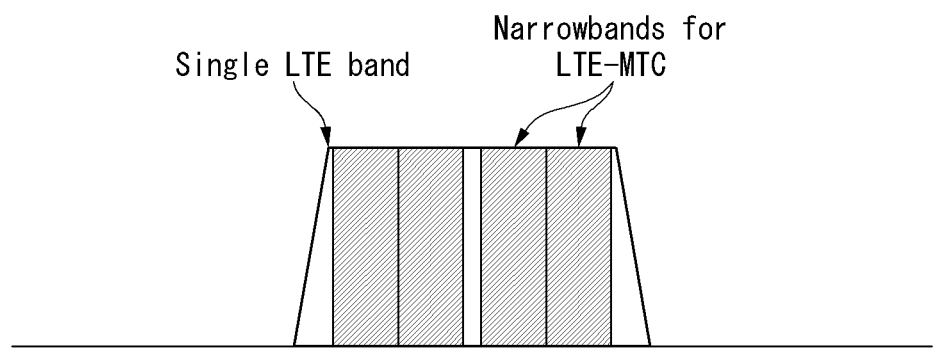
FIG. 18 illustrates an example of an In-band system and a standalone system to which a method described in the present disclosure is applicable.
Figure 18:
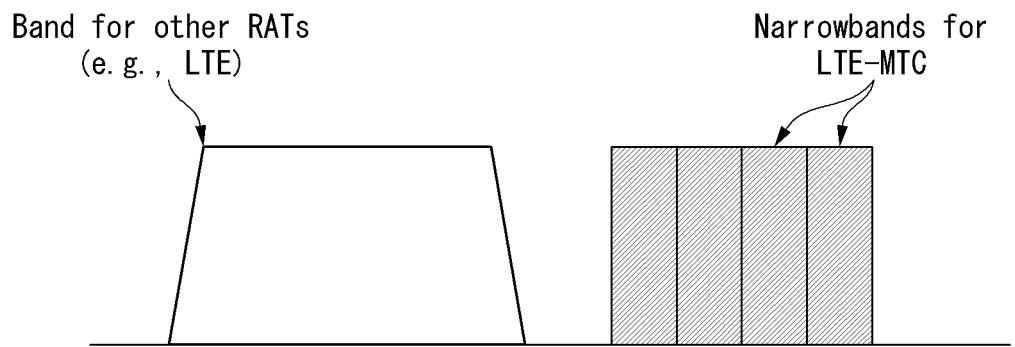

FIG. 18 illustrates an example of an In-band system and a standalone system to which a method described in the present disclosure is applicable. More specifically, FIG. 18a illustrates an in-band system, and FIG. 18b illustrates a standalone system.

Referring to FIG. 18a, an in-band mode (or in-band system) refers to a system or mode in which specific narrowband (NB)(s) in a legacy LTE band is used for LTE-MTC, and some resource blocks of LTE system carrier may be allocated and operated.

Referring to FIG. 18b, a standalone mode (or standalone system) refers to a system or mode configured independently from the legacy LTE band, and, for example, a frequency band (hereafter reallocated GSM carrier) used in GERAN may be separately allocated and operated. Alternatively, as the legacy LTE band is refarmed to NR band, it may include the case where only the LTE-MTC exists, or a concept of LTE-MTC operating independently from NR in the NR band.

In addition, the meanings of NB, WB, A-NB (or P-NB), and S-NB used in the present disclosure are described.

Narrowband (NB): the unit of RA for data transmission and reception of LTE MTC UEs (bandwidth reduced Low cost (BL) devices); consisting of multiple RBs (e.g., 1 NB in eMTC consists of 6 RBs).

Wideband (WB): consisting of multiple NBs; capable of supporting WB according to the device category (e.g., wideband in eMTC consists of 4 NBs).

Anchor NB (A-NB) or Primary NB (P-NB): the NB that supports initial cell selection carrying essential physical signals such as PSS/SSS/PBCH.

In addition, the A-NB may have to mandatorily transmit CRS, may support data transmission and reception, and may limit the use of LTE control region considering the connectivity of eMTC.

Secondary or non-anchor NB (S-NB): the NB that does not support initial cell selection and therefore does not carry essential physical signals such as PSS/SSS/PBCH; the NB that a base station (additionally) allocates to a UE considering the number of UEs accessing the cell on the A-NB, overall load balancing, etc.

The sMTC aims to efficiently operate as compared to the eMTC in a situation where LTE band is refarmed to NR or is deployed in a frequency band not the LTE band based on the eMTC operating in LTE in-band. Further, the sMTC has an important aim for backward compatibility for the existing eMTC service and the corresponding eMTC UEs. For example, when the LTE band is refarmed NR in a situation where the existing eMTC is deployed in the LTE in-band, the LTE band basically supports existing eMTC service/UE. The sMTC UE may be a UE that operates more efficiently in terms of resource utilization, etc.

For reference, a NR frequency band is defined as two types (FR1 and FR2) of frequency ranges. FR1 is sub 6 GHz range, and FR2 is above 6 GHz range and is a millimeter wave (mmW).

The following table represents a definition of NR frequency band.

TABLE 42

| Frequency Range designation | Corresponding frequency range |
| --- | --- |
| FR1 | 450 MHz-6000 MHz |
| FR2 | 24250 MHz-52600 MHz |

The present disclosure proposes a narrowband and wideband supporting method of the sMTC for the following two representative use cases.

LTE MTC operation in NR frequency band (e.g., if it is refarmed to NR in a situation where the eMTC is deployed)

LTE MTC operation in the form of standalone deployment

Because a center frequency deployment of the existing eMTC complies with LTE channel raster of 100 kHz spacing, the sMTC may also deploy the center frequency based on 100 kHz channel raster in order to simultaneously support the eMTC and the sMTC. The channel raster represents the smallest unit from in which a UE reads a resource, and the channel raster in the LTE system has a value of 100 kHz. The UE sequentially monitors a frequency value of the smallest possible frequency bandwidth (6RB, 1.08 MHz) at channel raster (e.g., 100 kHz) spacing. In this instance, a difference between the center frequencies of the channel raster and the eMTC system is referred to as a channel raster offset. Examples of the channel raster offset may include four values of ±2.5 kHz (+2.5 kHz, −2.5 kHz) and ±7.5 kHz (+7.5 kHz, −7.5 kHz).

First Embodiment: Single-NB sMTC Supporting Method

A first embodiment relates to a method of first operating sMTC with single-NB upon LTE MTC operation in a NR frequency band. This method does not support frequency hopping since the sMTC operates in one NB. For a single-NB operation of the sMTC upon LTE MTC operation in the NR frequency band, a system BW value of MIB may be set to 6 RBs irrespective of an actual NR system BW. In this case, all signals and channels are transmitted on the single-NB of the NR system BW. For example, all the signals/channels such as PSS/SSS/PBCH, SIBx, and CRS are included in the single-NB.

Since the above method does not require consideration of various complex problems due to an interaction with NR scheduling according to frequency hopping, the above method has an advantage of being able to operate most simply the sMTC or the eMTC in the NR frequency band.

However, since the method supports only 1 NB, the method has a disadvantage in that there is a limitation in terms of data rate, the number of accessible UEs, etc. Since there is no difference between the single-NB sMTC operation and the existing eMTC, a support is possible without changes from the existing eMTC.

The 'single-NB' is limited to only the DL, and may still operate as multi-NB or wideband with respect to the UL. Such an operation may be useful in a use case when an UL data rate is relatively large, for example, when regular reporting from multiple UEs is a main traffic.

Second Embodiment: Multi-NB Supporting Method

As described above, the single-NB sMTC has a limitation in terms of data rate, the number of accessible UEs, etc. A base station may configure multiple NBs and allocate the multiple NBs to UEs to support the more sMTC UEs or increase the data rate, in order to overcome the disadvantage.

Hereinafter, the Multi-NB configuration method is described in more detail.

(Multi-NB Configuration Method 1): Configuration Method with Multiple A-NB s

This method is a method of configuring multi-NB with multiple A-NBs. In this instance, each single-NB includes signals/channels required for a cell selection, such as PSS/SSS/PBCH, in the form of A-NB. The base station supports the multi-NB in a way of additionally configuring the single-NB sMTC as the number of sMTC UEs, that are accessed at the same time, increases.

Since each of the added NBs sets a system BW of MIB to, for example, 6 RBs and operates as the single-NB, PBCH repetition cannot be supported in the same manner as the case where the eMTC operates in 6RB system BW. The base station operates in multi-NB, but the UE may perform transmission/reception operation using single-NB according to sMTC UE capability, or perform wideband transmission/reception operation in the same form as CA or DC of LTE that is allocated one or multiple single-NB(s) and transmits and receives it at the same time.

In this instance, the base station may be informed about whether or not the corresponding UE supports the multi-NB in the form of capability report.

The multi-MB configuration method 1 may be implemented by the following UE/base station operations.

UE Operation

First, a UE receives a signal (or information or channel) related to a cell selection on A-NB.

Here, the cell selection may include (i) a procedure of acquiring a synchronization with the base station and a cell ID on PSS/SSS, (ii) a procedure of receiving system information such as a master information block (MIB) and a system information block (SIB) on a broadcast channel (BCH), and (iii) a procedure of acquiring UL synchronization through a random access procedure.

Here, the cell selection means a procedure that the UE identifies a cell covered by the base station, and may be expressed as cell search, initial cell selection, etc.

Here, the broadcast channel (BCH) means a transmission channel and is mapped to each of PBCH and PDSCH corresponding to a physical channel. More specifically, the MIB is mapped to the PBCH, and the SIB is mapped to the PDSCH.

The UE receives, from the base station, information about additional A-NB configuration.

In addition, the UE receives data from the base station on multi-NB including single-NB (A-NB) or multiple A-NBs based on UE's capability.

Base Station Operation

First, a base station transmits, to a UE, a signal (or information or channel) related to a cell selection on A-NB.

The base station configures additional A-NB and transmits information about this to the UE.

In addition, the base station transmits (or receives) data to (or from) the UE on multi-NB including multiple A-NBs. If the configuration information is able to be transmitted to the UE via UE-specific RRC or broadcast RRC (e.g., SIB, SI, etc.), the base station may refer to capability report information reported from the UE upon configuration of the multi-NB.

(Multi-NB Configuration Method 2): Configuration Method with One A-NB and One or Multiple S-NB(s)

In this method, if multi-NB is configured with multiple S-NBs, frequency hopping of sMTC for signal transmission/reception may be performed except A-NB. This reason is that there is a problem that scheduling of eMTC cannot be efficiently performed if the A-NB is not excluded from frequency hopping.

That is, the UE's operation for the multi-NB configuration method 2 may receive, from the base station, configuration for multiple S-NBs for the sMTC, and transmit and receive the signal through the frequency hopping between the configured NBs (except A-NB).

Accordingly, the multi-NB configuration method 2 may be divided into the following two cases and described.

(1) Operation when the A-NB does not support access of the eMTC UE

The base station sends, to the UE, a SIB1-NR message containing eMTC barred information indicating that the eMTC UE is not supported in the corresponding cell.

The UE determines whether to access in the corresponding cell based on the received SIB1-NR message.

Here, the access means an initial access (or initial random access) of the UE, and may include a process of acquiring UL synchronization through a random access procedure.

(2) Operation when the A-NB supports access of the eMTC UE and the sMTC UE

If the eMTC UE is defined or configured to operate in only the A-NB, the base station sets a system BW for the MIB to 6 RBs and broadcasts the configured MIB to the UE.

This is described in more detail below.

This method is a method of extending to the A-NB and one or multiple S-NB(s) supporting the initial cell selection. That is, this is a configuration method in the form of A-NB+S-NB(s) (similar to anchor carrier+non-anchor carrier concept in NB-IoT). Alternatively, the form of A-NB+WB may be used. For example, the sMTC UEs may access the cell on A-NB and then may be allocated WB consisting of four S-NBs or X RBs (X>6) not the unit of NB to perform the data transmission/reception operation. Here, a channel raster of the S-NB may be different from the A-NB, and the S-NB may be allocated subsequent to the A-NB from a frequency resource perspective and may be configured with one larger frequency resource for the sMTC. The multiple newly allocated S-NBs may configure an independent WB or WB set for sMTC UE(s).

A center frequency of the A-NB is determined by 100 kHz channel raster or NR channel raster or NR sync raster. The sMTC UEs access the cell on the A-NB to perform the data transmission/reception operation on the A-NB, or are (additionally) allocated one or multiple S-NB(s) from the base station to perform the data transmission/reception operation. In this instance, the A-NB may allow only the access of the sMTC UE, or allow the access of both the eMTC UE and the sMTC UE. Since the existing eMTC cannot understand the S-NB allocation method, the S-NB may be additionally allocated to only the sMTC UE. If the A-NB allows the access of the eMTC UE, the A-NB may additionally allow the eMTC data transmission/reception. Alternatively, the A-NB allows the access of the eMTC UE, but the eMTC may be limited to operate in only the A-NB. The A-NB may support only the allocation of one or multiple S-NB(s) for the cell access and data transmission/reception to the sMTC UE, and may allow the data transmission/reception to be performed on the S-NB.

If the A-NB does not support the eMTC UE and supports only the sMTC UE, the A-NB may transmit "eMTC barred"

information that the A-NB does not support the eMTC UE in a cell, that attempts the access via SIB1-BR, in order to reduce unnecessary power consumption of the eMTC UE. In this instance, the sMTC UE receiving the "eMTC barred" information may sense that a current cell is a cell that does not allow the access of the eMTC UE, i.e., allows only the access of the sMTC UE, and may perform an operation in a sMTC dedicated cell. The operation in a sMTC dedicated cell may mean applying an operation performing DL transmission using, for example, a LTE control region, or a NB configuration method applied to the sMTC dedicated cell. If the A-NB allows the access of the eMTC UE, and the eMTC wants to limit to operate in only the A-NB, the eMTC may set a system BW of the MIB to 6 RBs so that the eMTC limits to operate in only the A-NB. In this case, the system BW of the MIB may be interpreted as only a system BW of the eMTC, and the sMTC UE may additionally receive system BW information or S-NB(s) extended information of the sMTC irrespective of the system BW of the MIB to determine the sMTC system BW. Additional sMTC system BW related information for the sMTC may be transmitted in the form of broadcast (e.g., SIB1, SIBx (x>1)), or may be configured and transmitted per UE or per UE group for the sMTC UEs. If the A-NB sets the system BW of the MIB to 6 RBs, PBCH repetition may not be supported in the same manner as the eMTC. If the A-NB supports the access and the data transmission/reception of the eMTC UE as above, the use of the LTE control region of the A-NB may be limited. For example, it may be allowed to use the LTE control region in only a subframe for the sMTC UEs. Further, if the S-NB is configured to only the sMTC UEs as above, the sMTC UEs may receive the DL channel (MPDCCH, PDSCH, etc.) using the LTE control region. The base station may configure DL transmission related information through the LTE control region for the sMTC UEs and may perform a DL transmission operation such as the transmission of MPDCCH and PDSCH. In this instance, the DL transmission related information through the LTE control region may include, for example, MPDCCH/PDSCH RE mapping information, and the like.

Next, a multi-NB sMTC supporting method is described.

(Multi-NB sMTC Supporting Method 1): eMTC Compatible Method

The multi-NB sMTC supporting method 1 equally supports a system BW of eMTC for the purpose of compatibility with the eMTC (1.4/3/5/10/15/20 MHz). Because this method can apply as it is almost all methods defined for the eMTC, for example, a frequency hopping rule, etc. defined per system BW, this method has the most advantageous advantage from an eMTC support perspective.

Figure 19:
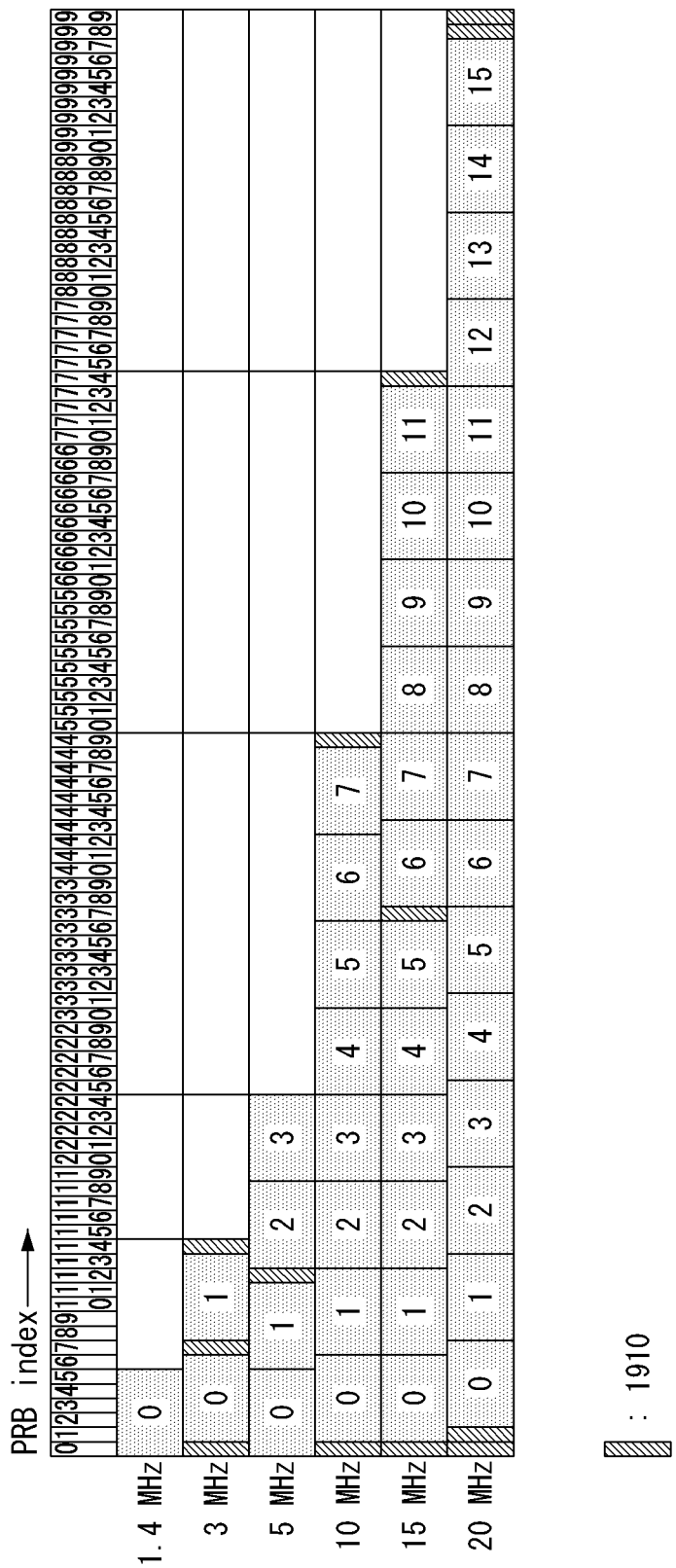
FIG. 19 illustrates an example of a PRB-to-NB mapping method in eMTC.

On the other hand, considering standalone deployment, unnecessary constraints are imposed to a supportable system BW, and an unused RB for MPDCCH/PDSCH/PUSCH transmission occurs according to the system BW (see FIG. 19). For example, in FIG. 19, in case of 15 MHz, i.e., 75 RB system BW, RB #0, RB #37, RB #74, and three RBs (represented in gray in FIG. 2) cannot be used for the MPDCCH/PDSCH/PUSCH transmission. FIG. 19 illustrates an example of a PRB-to-NB mapping method in eMTC.

According to the PRB-to-NB mapping method in current eMTC, there exists a RF (1910 in FIG. 19) that does not belong to 0 to 4 NBs according to the system BW and thus cannot be used for the MPDCCH/PDSCH/PUSCH transmission. Thus, in order to increase the resource usage efficiency of the sMTC UE and to additionally use RBs not belonging to the NB in the sMTC UE, each RB may be indicated in the form of bitmap (0 to 4 bits according to the system BW) as many as the number of corresponding RBs and may be used for the MPDCCH/PDSCH/PUSCH transmission. For example, if the sMTC UE allocates 3 bits to three unused RBs in 15 MHz system BW and wants to use RB #37 at the center of the frequency, the sMTC UE may indicate the RB in the form of "010" and use the corresponding RB in the MPDCCH/PDSCH/PUSCH transmission or other UL/DL transmission.

Alternatively, in order to reduce the number of signaling bits, whether to use the RBs may be configured at the same time by bundling some or all of the RBs. For example, bit may be allocated only to contiguous RBs per UE considering a RF BW, etc. of the sMTC UE, and whether to use the contiguous RBs may be configured by one bit. For example, for 20 MHz system BW, 2 bits may be allocated to RBs, and two contiguous RBs at each spectrum edge may be represented as a 1-bit bitmap. That is, if 1 bit is allocated to {RB #0, RB #1} and '1' is obtained, it indicates that all of {RB #0, RB #1} are used. If '0' is obtained, it indicates that all of {RB #0, RB #1} are not used. The RBs may be indicated in the same manner by allocating remaining 1 bit to {RB #98, RB #99}.

Alternatively, RBs not belonging to the NB are not allocated independently from the NB and may be used in a shift form of NB defined in eMTC. For example, assuming system BW 20 MHz, in FIG. 19, unused RBs can be used by shifting NB #0 (or NB #15) to 1 or 2 RB left (or right). Alternatively, the sMTC supporting a reception BW larger than 6 RB includes unused RBs and may perform the resource allocation. For example, assuming system BW 20 MHz, if NB #0 (or NB #15) is allocated, in the UL, in order to satisfy conditions of a restriction (multiples of 2, 3 and 5) of DFT-s-OFDM, the DL and the UL may be differently defined. For example, 7RB may be consecutively scheduled in the DL, but the resource allocation may be performed based on 6RB or 8RB instead of 7RB in UL transmission using DFT-s-OFDM. The bitmap or the shift information, etc. may be added to a DCI field.

Multi-NB sMTC Supporting Method 2): Flexible NB Allocation Method Considering NR Coexistence NR coexistence refers to a system in which a LTE-MTC system and a NR system coexist. For example, LTE-MTC may aim to efficiently support a LTE-MTC UE while a LTE in-band based LTE-MTC system occupies a part of a NR system BW, and NR may be an operation aiming to efficiently support a NR UE without a collision with the LTE-MTC UE through gNB scheduling in a state where the LTE-MTC system occupies a part of the NR system BW. In the NR coexistence situation, the LTE-MTC UE may include eMTC and sMTC.

The multi-NB sMTC supporting method 2 is a method in which system BW support, i.e., NB allocation is not limited to an eMTC system BW and is supported more variously when compared to the multi-NB sMTC supporting method 1. The multi-NB sMTC supporting method 2 transmits PSS/SSS/PBCH based on 100 kHz channel raster for the purpose of at least eMTC support. A system BW field in a MIB transmitted on PBCH configures a system BW for eMTC. The same NB definition as LTE in-band is used in the eMTC system BW. For the DL, due to a difference in a DC processing method between LTE and NR, i.e., because of a difference that the LTE excludes DC and defines RB, and the NR defines RB while including DC, in a positive frequency domain based on the DC, a RB defined in the eMTC is shifted by +1 subcarrier (SC) compared to a RB of the NR. In this instance, because of interference between the eMTC/ sMTC and the NR in a NB boundary or a scheduled RB boundary in the NB, 1 SC puncturing or rate matching may be required from eMTC/sMTC or NR perspective.

A frequency domain outside the eMTC system BW may use as it is the NB definition of LTE in-band, or may newly define and use the NB. For example, the new NB definition may be alignment of a RB or a RB grid between the eMTC/sMTC and the NR, in order to solve the interference between the eMTC/sMTC and the NR according to the +1 SC shift described above. To align the RB grid, one or more PRB gaps may be required between frequency domains belonging to an eMTC system BW and a sMTC system BW, and PRB gap information necessary for the sMTC UE may be defined and indicated as a sMTC offset value (see FIG. 20). The PRB gap may serve as a buffer absorbing a collision between the eMTC/sMTC and the NR according to the +1 SC shift of eMTC/sMTC described above.

Among NR PRBs belonging to one or multiple PRB gap(s), PRB(s) immediately contiguous to the eMTC/sMTC may not be allocated, by the gNB, to the NR UEs for the purpose of DL transmission, in order to avoid the collision with the eMTC/sMTC.

Figure 20:
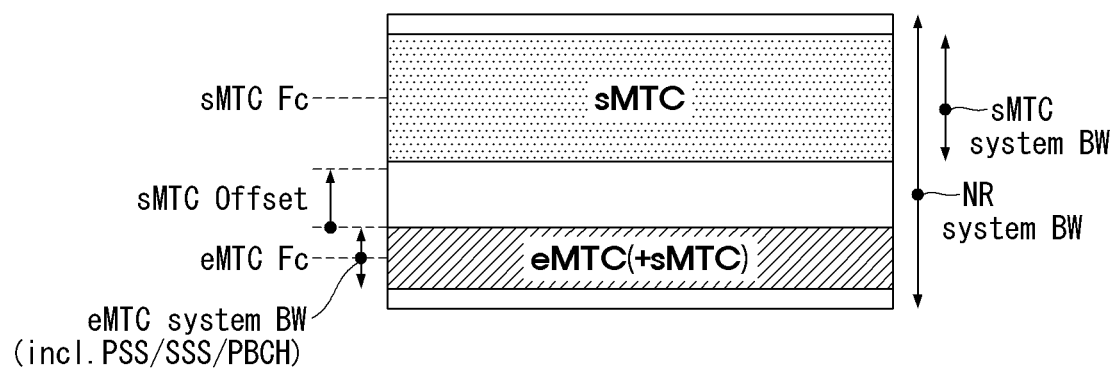
FIG. 20 illustrates an example of a method of deploying an eMTC system BW and a sMTC system BW in a NR system BW described in the present disclosure.

FIG. 20 illustrates an example of a method of deploying an eMTC system BW and a sMTC system BW in a NR system BW described in the present disclosure.

More specifically, FIG. 20 illustrates that the sMTC system BW is contiguously deployed in an independent frequency domain not to overlap the eMTC system BW. The base station (or network) signals a magnitude and a location of the sMTC system BW to the sMTC system BW and the sMTC offset (PRB gap).

Figure 21:
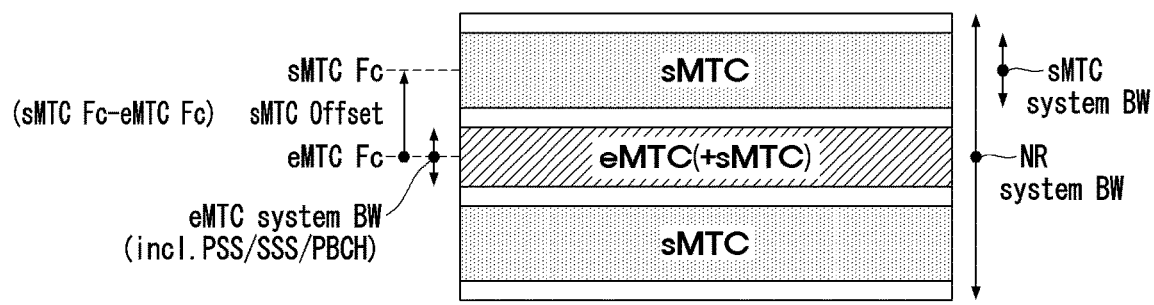
FIG. 21 illustrates another example of a method of deploying an eMTC system BW and an sMTC system BW in a NR system BW described in the present disclosure.
Figure 21:
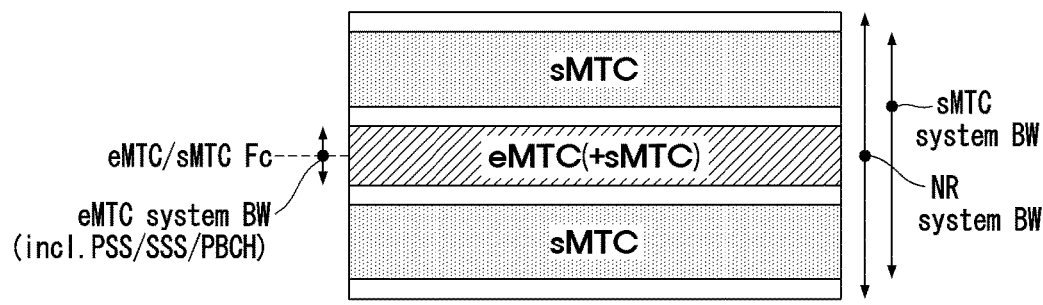

FIG. 21 illustrates another example of a method of deploying an eMTC system BW and a sMTC system BW in a NR system BW described in the present disclosure.

That is, FIG. 21 illustrates a method of deploying the eMTC system BW and the sMTC system BW in the NR system BW and a method of signalling a sMTC frequency region. FIG. 21 illustrates a method of defining a center frequency and a system BW of the eMTC system for the cell access of the eMTC UE and the sMTC UE considering a channel raster in the NR system BW, and additionally defining a system bandwidth for only the sMTC UE through the sMTC offset and the sMTC system BW so that the eMTC system BW is included.

The method illustrated in FIG. 21 has an effect of technically increasing a frequency diversity gain upon frequency/NB hopping support of the sMTC UE, compared to the method illustrated in FIG. 20. For FIG. 20 and FIG. 21, a method of signaling the sMTC system BW compared to the eMTC can apply both a method of defining and indicating a sMTC offset value as a PRB gap as illustrated in FIG. 20, and a method of defining and indicating the sMTC offset value as a difference between sMTC Fc (center frequency) and eMTC Fc as illustrated in FIG. 21(a). However, depending on whether to interpret that the sMTC offset is defined as an absolute value and sMTC system BWs exist on both sides of eMTC, or to support that the sMTC offset is defined as a value with directionality and is deployed on one side, the deployment methods illustrated in FIG. 20 and FIG. 21(a) can be supported. Alternatively, the deployment method of FIG. 21(a) or FIG. 21(b) can be supported by defining the sMTC Offset as a value with directionality and combining the sMTC offset and the sMTC system BW. For example, the deployment method of FIG. 21(b) can be supported by setting the sMTC offset (difference between sMTC Fc and eMTC Fc) to '0' and setting a value of sMTC system BW to a value larger than the eMTC system BW. In this instance, the signaling of PRB gap may be additionally required. FIG. 21(b) illustrates an example of supporting the deployment method through only the sMTC system BW by fixing the signaling sMTC offset (difference between sMTC Fc and eMTC Fc) to '0' and fixing the PRB gap to a specific value, for example, NR 1RB. The method of FIG. 21(b) has an effect of reducing a signaling overhead compared to the method of FIG. 21(a). In the above examples, the NB definition in the sMTC system BW (or frequency domain) may be different from the NB definition in the eMTC system BW (or frequency domain) as mentioned above. For example, RBs in the eMTC system BW may be in the form in which a RB defined in eMTC is shifted by +1 SC (or −1 SC) compared to a RB of NR at a positive (or negative) frequency based on DC, and RBs in the sMTC system BW may be aligned along a RB boundary of the NR. Further, all RBs in the sMTC system BW, unlike RBs in the eMTC system BW, may consist of contiguously allocated RBs (without unused RB), in order to increase the efficiency of resource utilization.

For example, when the NR system BW is 5 MHz (25 RB), the above method may set the eMTC system BW to 6 RBs (1 NB), and perform an operation, such as frequency hopping, in the sMTC system BW or in a frequency domain including the sMTC and the eMTC system BW by additionally allocating (newly defined) NB in the NR system BW to the sMTC.

In this instance, when A-NB is 6RB while S-NB surrounds the A-NB, the sMTC may be understood as one continuous frequency resource by combining the S-NB and the A-NB. However, unlike the existing NB, the unused RB is not applied in a contiguous frequency resource, and the S-NB and the A-NB may contiguously configure the NB.

If the operation, such as frequency hopping, in the sMTC system BW is performed as above, the sMTC system BW may be a newly additionally allocated system BW (or NB) except the eMTC system BW. This may be to facilitate the scheduling of the base station for the eMTC and the sMTC UE when the eMTC UE and the sMTC coexist in the A-NB. For example, if the A-NB is limited to 1NB and the eMTC is limited to the A-NB, the eMTC UE cannot be efficiently scheduled when the sMTC UE, that is allocated multi-NB, occupies some subframe(s) of the A-NB by the frequency hopping. In particular, considering that the repetitive transmission for the eMTC/sMTC UE is necessary due to a distance with the base station, or the like, restrictions on the scheduling may become more serious. By avoiding the restrictions on the scheduling through the above method, the method can expect an effect of increasing a capacity of the eMTC/sMTC UE capable of being received by the A-NB Signaling information(s) indicating a location of the sMTC frequency region may be configured via higher layer signaling or per cell or per UE, or transmitted via DCI so that it can be more dynamically configured.

Next, a 1-NB eMTC deployment method in the NR system BW is described.

Since there is no raster offset signaling in the eMTC, the eMTC shall comply with 100 kHz channel raster in order to deploy single-NB eMTC in the NR system BW. In this instance, if the NR system BW is an even number as the number of RBs, i.e., if the NR system BW is 10/20/30/40/50 MHz, the NB of single-NB eMTC may be deployed at a center frequency of the NR system BW without raster offset. Alternatively, if the NR system BW is an odd number as the number of RBs, i.e., if the NR system BW is 5/15/25 MHz, a raster offset of about half RB (e.g., +/−5/6/7 SC) occurs in order to align RBs of NR when the NB of single-NB eMTC is deployed at a center frequency of the NR system BW. It may be impossible for the eMTC or the sMTC UE to perform the reception without information on the raster offset, and the following two cases shall be considered since the eMTC does not support the raster offset signaling capable of solving this problem.

First, (single-NB) eMTC (and/or sMTC) is to support only the case of NR cell in which the NR system BW is an even number as the number of RBs, i.e., the NR system BW is 10/20/30/40/50 MHz. Second, for all the bands that support (single-NB) eMTC (and/or sMTC) or are refarmed from LTE to NR, the system BW may be limited to the even number of RBs (regardless of system BW in units of MHz). The following Table 43 represents a system BW supporting in NR FR1 (<6 GHz frequency band). If the number of RBs is respectively 25/79/133 in 15 kHz SCS, for example, 5/15/25 MHz system BWs not considering eMTC, and the above second method is applied for the eMTC (and/or sMTC) support, the method may support 24/78/132 RBs that are the even number equal to or less than the above value (25/79/133 RBs). Table 43 represents an example of transmission bandwidth configuration NRB for FR1.

TABLE 43

| SCS [kHz] | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 70 MHz NRB | 80 MHz NRB | 90 MHz NRB | 100 MHz NRB |
|---|---|---|---|---|---|---|---|---|---|---|---|---|---|
| 15 | 25 | 52 | 79 | 106 | 133 | 160 | 216 | 270 | N.A | N.A | N.A | N.A | N.A |
| 30 | 11 | 24 | 38 | 51 | 65 | 78 | 106 | 133 | 162 | 189 | 217 | 245 | 273 |
| 60 | N.A | 11 | 18 | 24 | 31 | 38 | 51 | 65 | 79 | 93 | 107 | 121 | 135 |

According to the above method, the single-NB eMTC may be deployed at a minimum location by the raster offset, and raster offset information may be signalled in MIB like NB-IoT anchor carriers.

Next, a sMTC NB extending method in the NR system BW is described.

The method proposed above may limit eMTC to some frequency bands in the NR system BW, configure eMTC system BW, that is eMTC system BW<NR system BW, for the eMTC UE through the MIB, and additionally configure other frequency domain (based on newly defined sMTC NB) in the NR system BW to support sMTC. In this instance, sMTC operating frequency region may be signalled in the form of sMTC system BW+sMTC offset (representing one or more PRB gaps required between frequency domains belonging to eMTC system BW and sMTC system BW in order to align eMTC (and/or sMTC) and RB grid of NR as mentioned above) (see FIG. 21(a)), or signalled only via sMTC system BW (e.g., eMTC system BW<sMTC system BW<=NR system BW) (see FIG. 21(b)). In the latter case, the PRB gap may be fixed. As mentioned above, the NB definition of sMTC frequency domain may be different from the NB definition in system BW of eMTC. For example, RBs in the eMTC system BW may be in the form in which a RB defined in eMTC is shifted by +1 SC (or −1 SC) compared to a RB of NR at a positive (or negative) frequency based on DC, and RBs in the sMTC system BW may be aligned along a RB boundary of the NR. Further, all RBs in the sMTC system BW may consist of contiguously allocated RBs (without unused RB).

The above proposal may also be implemented by a method of allocating contiguous frequency resources not a system bandwidth in a step of configuring S-NB from A-NB in the case of S-NB. In this case, the RB grid may be completely different from A-NB. For example, in S-NB unlike A-NB, the NB may be mapped without unused RB.

Multi-NB sMTC Supporting Method 3): Flexible NB Allocation Method Considering Standalone Deployment Since a standalone deployment scenario does not need to consider system BW or RB grid, etc. of LTE or NR (e.g., need not comply with RB-to-NB mapping according to the existing system BW), the sMTC system BW may be configured in multiples of the number of RBs constituting a NB defined in sMTC (e.g., multiples of 6 if 1 NB=6 RB). Thus, compared to the existing eMTC, it may consist of contiguous RBs and NBs without unused RB(s) at a center or an edge in the system BW. There is no limit to the number of allocated NBs (except a limit by signaling bits, etc. signalling the sMTC system BW), and if wideband reception is supported according to sMTC UE category, a NB-to-WB mapping relationship may be in the form that multiple NBs, that are always contiguous, constitute one WB, and multiple contiguous WBs constitute the system BW. For the efficient resource utilization of UEs capable of WB reception, the system BW in the standalone deployment scenario may be configured in multiples of the number of RBs constituting the WB (e.g., multiples of 24 if 1 WB=4 NB and 1 NB=6 RB).

In the eMTC system, CRS is transmitted to support a CRS-based transmission mode (TM) or measurement, etc. The eMTC UE extracts and uses a CRS sequence of a center from a CRS sequence generated based on 20 MHz system BW according to the system BW. In this instance, a start and an end of the CRS sequence are determined with reference to the system BW of the MIB. If the A-NB has to basically support an eMTC operation, the A-NB determines a CRS sequence with reference to the system BW of the MIB in the same method as the existing eMTC system. The S-NB may also require CRS transmission to support the CRS-based TM or measurement, etc. If the S-NB is configured only to the sMTC UE, CRS sequence for the S-NB may be generated with reference to sMTC system BW (and additionally sMTC offset) configured from the A-NB, since the support of the eMTC UE does not need to be considered. As illustrated in FIG. 21(b), if the sMTC system BW includes the eMTC system BW (or A-NB), CRS for the eMTC UE and CRS for the sMTC UE may collide each other. In this case, an eMTC CRS sequence is applied to support the eMTC UE. In this instance, since the sMTC UE knows the eMTC system BW through the A-NB, the sMTC UE may know a CRS sequence of the eMTC system BW (or A-NB) part, and thus the CRS sequence may be used for demodulation, measurement, etc. at a receiver. However, in the above case, because the continuity of the CRS sequence is not secured, this may affect sequence characteristics and may affect a demodulation or measurement performance. As a method of compensating for the above disadvantage, the following methods are proposed for the purpose of continuity of the CRS sequence with the eMTC UE.

As the same method as eMTC, i.e., all CRS sequences are generated based on 20 MHz system BW centered on a center frequency of the eMTC system BW (or A-NB). The sMTC UE extracts and uses relative location information (the sMTC offset value) from a center frequency of the eMTC system BW (or A-NB) and a CRS sequence from the sMTC system BW from all the generated CRS sequences. In this instance, the CRS sequences of the eMTC may different depending on whether the corresponding system BW consists of the even number of RBs or the odd number of RBs. Since the sMTC UE does not have the corresponding information, the corresponding information needs to be explicitly indicated to the sMTC UE (through a cell-specific higher layer signaling method, etc.). Alternatively, the corresponding information may be implicitly indicated from the sMTC offset value. For example, when the sMTC offset value is divided on a per RB basis (i.e., 12 SC), the system BW consisting of the even number of RBs may be assumed since the system BW is deployed on the same RB grid as the eMTC system BW (or A-NB). Alternatively, when the sMTC offset value is not divided on a per RB basis (i.e., 12 SC), the system BW consisting of the odd number of RBs may be assumed to extract the CRS sequence, since the RB grid has half RB offset compared to eMTC system BW (or A-NB). Securing the continuity of the sequence has advantages of a performance of demodulation, measurement, etc. at the receiver.

Third Embodiment: NB Extending Method

In the standalone deployment scenario, in order to support the multi-NB sMTC, A-NB may be randomly deployed at a center of a system BW or in the system BW while complying with 100 kHz channel raster, and the A-NB or S-NB may be extended additionally and contiguously based on the A-NB (without unused RB). When the A-NB is deployed in the system BW, the system BW is greater than or equal to 12RB and thus can be allocated two or more NBs. When the system BW is the even number of RBs, according to the conventional definition of eMTC NB, NBs for MPDCCH/PDSCH/PUSCH transmission have half NB (i.e., 3 RBs) compared to center 6 RBs used in PSS/SSS/PBCH transmission.

When the system BW is the even number of RBs as above, a necessarily unnecessary narrowband retuning process is required for PSS/SSS/PBCH reception, and unnecessary performance degradation may occur due to narrowband retuning, etc. To compensate for this, first, the PSS/SSS/PBCH location may be such that they are transmitted using one of NBs defined in the corresponding system BW. The corresponding NB may have to comply with 100 kHz channel raster. The eMTC and/or sMTC UE receiving the PSS/SSS/PBCH may be allocated A-NB or S-NB(s) through the offset in units of NB received from the MIB. When the conventional eMTC UE receives PSS/SSS/PBCH in the corresponding system BW, the eMTC UE may assume the conventional eMTC based NB location and operate. If the eMTC UE transmits the PSS/SSS/PBCH location using one of NBs defined in the corresponding system BW, raster offset signaling corresponding to a difference between the PSS/SSS/PBCH location in the MIB and a center frequency of the system BW may be required.

Second, for all the bands that support (single-NB) eMTC (and/or sMTC) or are refarmed from LTE to NR, NB may be defined to align locations of center 6 RB and NB that always transmit PSS/SSS/PBCH (regardless of system BW in units of MHz). For example, for all the bands that support (single-NB) eMTC (and/or sMTC) or are refarmed from LTE to NR (for all supporting system BWs in units of MHz), the system BW may be determined to have a system BW which is always the even number of RBs and at the same time the odd number of NBs. For example, if 1 NB consists of X RB, the supportable system BW may be X*(2n+1), where n=0, 1, 2, . . . (see FIG. 22).

Figure 22:
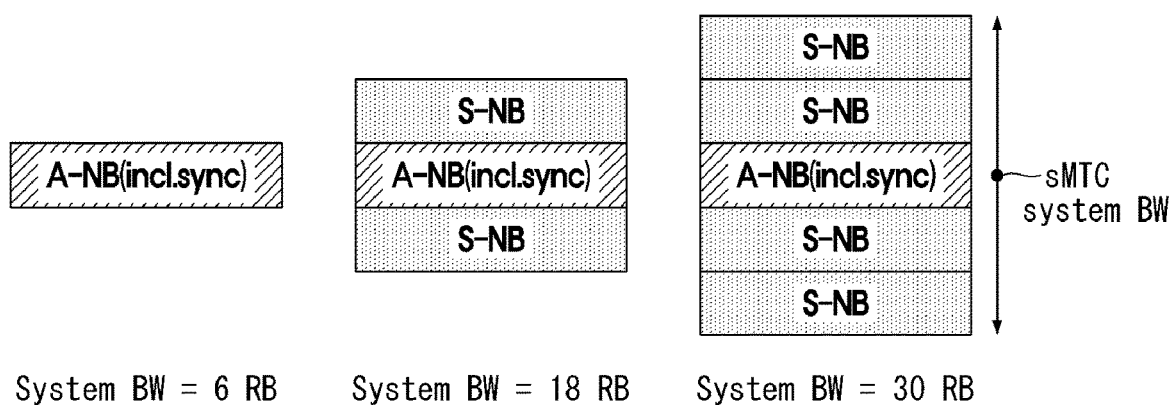
FIG. 22 illustrates an example of a NB extension method considering a PSS/SSS/PBCH location described in the present disclosure.

FIG. 22 illustrates an example of a NB extension method considering a PSS/SSS/PBCH location described in the present disclosure.

A-NB supporting a cell selection basically includes sync. signal(s) and information necessary for the cell selection (e.g., PSS/SSS/PBCH). In order to support a cell selection of the eMTC and/or sMTC device, and at the same time to remove narrowband retuning for PSS/SSS/PBCH monitoring by identifying PSS/SSS/PBCH transmission 6 RB with one of NBs, the A-NB may be limited to 100 kHz channel raster. In this instance, among NBs defined in the system BW, a NB, whose a center frequency is closest to 100 kHz raster, may be limited to be used as the A-NB. By limiting the NB, whose a center frequency is closest to 100 kHz raster, to be used as the A-NB, eMTC or sMTC UE may estimate a frequency offset through a blind detection even taking into account oscillator inaccuracies that are generally assumed.

Figure 23:
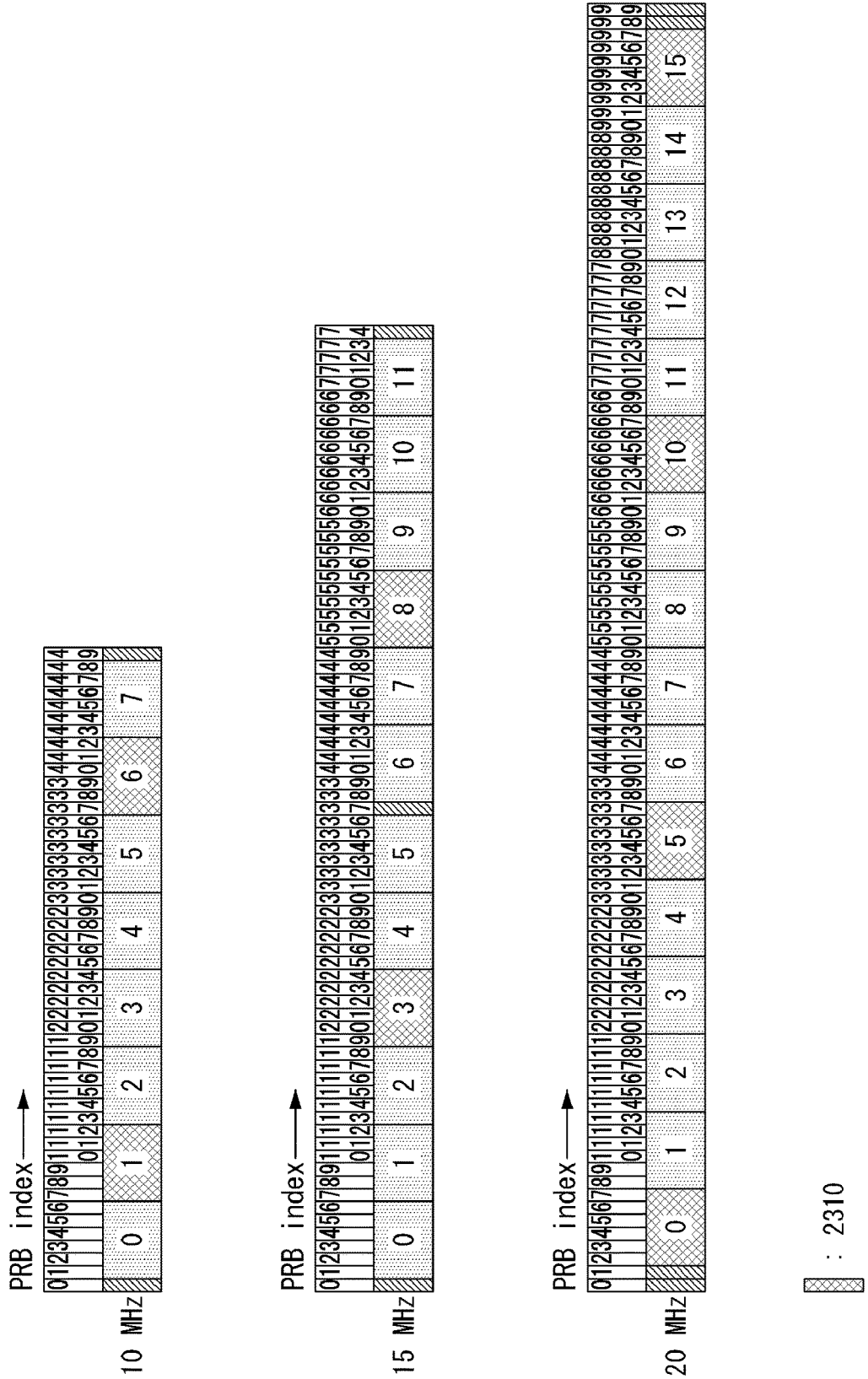
FIG. 23 illustrates an example of an A-NB location per system BW described in the present disclosure.

FIG. 23 illustrates an example of an A-NB location per system BW described in the present disclosure.

That is, FIG. 23 illustrates an example of A-NB location for system BW 10/15/20 MHz. In FIG. 23, a location of A-NB following the above method in each system BW is denoted by reference numeral '2310.' For example, if it is assumed that a center frequency of the system BW complies with 100 kHz channel raster, in which a distance from the center frequency of the system BW is 7.5+180*6*(0.5+2) =2707.5 kHz in the case of 50 RB (10 MHz) system BW and in the case of NB #6, the system BW has a frequency offset of +7.5 kHz from 100 kHz channel raster, and this value may be considered to be within a frequency offset range that the eMTC or sMTC UE can acquire without prior information.

The following has considered that the A-NB includes the signal such as PSS/SSS/PBCH, and the S-NB does not include the signal. However, the S-NB may transmit broadcasting signal/channel such as PSS and/or SSS and/or PBCH through the S-NB, in order to monitor the signal such as PSS/SSS/PBCH without performing frequency (or NB) retuning. In this case, when the sMTC UE accesses the cell via the A-NB and then is configured with S-NB to transmit and receive data, the sMTC UE may monitor broadcasting signal/channel such as PSS and/or SSS and/or PBCH in the corresponding S-NB without a need to perform frequency (or NB) retuning to the A-NB if the broadcasting signal/channel such as PSS and/or SSS and/or PBCH is configured and transmitted to the corresponding S-NB. Time/frequency configuration information about the transmission of the broadcasting signal/channel such as PSS and/or SSS and/or PBCH may be cell-specifically or UE-specifically configured via higher layer signaling or dynamic signaling via DCI.

The NB extension method may be limited and applied to when the broadcasting signal/channel such as PSS and/or SSS and/or PBCH is transmitted from the S-NB. That is, the A-NB follows the same mapping as the existing mapping in consideration of the coexistence of LTE and eMTC, but a different mapping from the existing mapping may be applied as in the above proposal, when PSS and/or SSS and/or PBCH are transmitted to the S-NB in a frequency resource that LTE and eMTC do not monitor by channel raster condition (or sync raster) of an independent synchronization signal from 100 kHz channel raster.

Fourth Embodiment: NR Bandwidth Part (BWP) Supporting Method

First, a bandwidth part (BWP) means a subset of the total cell bandwidth of a specific cell, and more specifically, means a subset of contiguous common resource blocks (CRBs). Operation of UE/base station related to configuration of the BWP may be summarized as below.

(1) UE operation

A UE receives, from a base station, information related to initial BWP configuration including at least one DL BWP and one or two UL BWPs (in case of using supplementary uplink (SUL)) via a MIB.

The UE may receive, from the base station, information related to additional BWP configuration via RRC signaling.

The UE may receive, from the base station, information related to BWP switching for at least one configured BWP on PDCCH.

Here, the BWP switching means an operation of activating an inactive BWP or inactivating an active BWP.

The UE transmits and receives signals (control and/or data) to/from the base station on the active BWP based on the received PDCCH.

(2) Base station operation

A base station configures initial BWP including at least one DL BWP and one or two UL BWPs (in case of using supplementary uplink (SUL)).

The base station transmits the configured initial BWP to a UE via a MIB.

The base station may configure additional UL BWP or DL BWP and transmit it to the UE via RRC signaling.

The base station transmits, to the UE, information related to BWP switching for at least one configured BWP on PDCCH.

The base station transmits and receives signals to/from the UE via the active BWP.

In NR system BW supporting eMTC and/or sMTC, upon support of the BWP, eMTC/sMTC system BW may be a DL BWP value or defined in DL BWP. In the same manner as this, an UL bandwidth of eMTC/sMTC may be a UL BWP value or defined in UL BWP. Due to the support of eMTC/sMTC, in particular, upon the support of NB hopping of eMTC/sMTC, in order to compensate for a reduction in throughput or a limit of flexibility from a NR perspective due to a limit of NR resource allocation, eMTC/sMTC system BW may be limited to NR system BW or a part of BWP. In this instance, a limited eMTC/sMTC frequency region may be a frequency region consisting of contiguous RBs or NBs including one A-NB and one or multiple S-NB(s). Alternatively, the eMTC/sMTC system BW may include multiple A-NB(s) to support multiple eMTC/sMTC UEs. Further, the eMTC/sMTC system BW may consist of one or multiple contiguous NBs.

Figure 24:
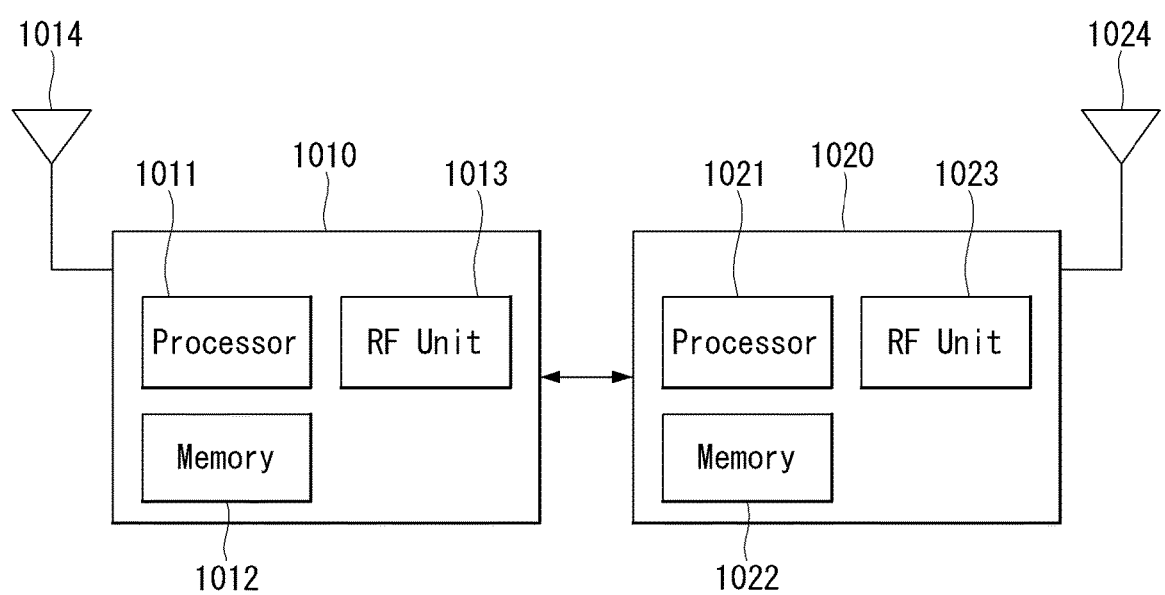
FIG. 24 illustrates an example of an internal block diagram of a base station and a UE described in the present disclosure.

FIG. 24 illustrates an example of an internal block diagram of a base station and a UE described in the present disclosure.

In FIG. 24, '1010' denotes an internal block diagram of a base station, and '1020' denotes an internal block diagram of a UE. As illustrated in FIG. 24, the base station and the UE may include processors 1011 and 1021, RF units (or RF modules) 1013 and 1023, memories 1012 and 1022, and antennas 1014 and 1024, respectively.

The processor may be configured to implement functions, processes, and/or methods described above. The memory is connected to the processor and stores a variety of information for driving the processor. The RF unit (module) is connected to the processor and transmits and/or receives a radio signal. The RF unit (module) may be represented as a transmitter transmitting the radio signal and a receiver.

The base station and the UE may have a single antenna or multiple antennas, and the antenna may serve to transmit and receive the radio signal.

In addition, the processor may include multiple electric components, and each electric component may be used to implement functions, processes, and/or methods described above.

Figure 25:
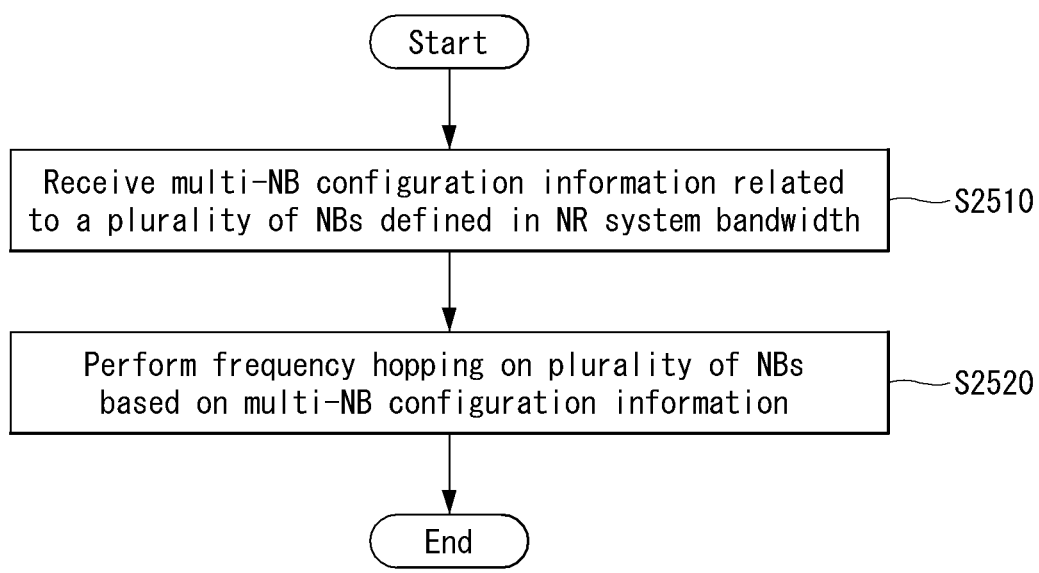
FIG. 25 is a flow chart illustrating an example of an operation method of a UE for performing a method described in the present disclosure.

FIG. 25 is a flow chart illustrating an example of an operation method of a UE for performing a method described in the present disclosure.

More specifically, FIG. 25 illustrates an operation method of a UE for supporting a standalone machine type communication (MTC) operation using a multi-narrowband (NB) in a wireless communication system. The UE may be a standalone MTC UE.

First, the UE receives, from a base station, multi-NB configuration information related to a plurality of narrowbands (NBs) defined in a next generation (NR) bandwidth including a first system bandwidth related to an in-band MTC operation and a second system bandwidth related to the standalone MTC operation in S2510.

The UE performs a frequency hopping on the plurality of NBs based on the multi-NB configuration information in S2520.

When the plurality of NBs include an anchor-NB representing a NB related to an initial cell selection, the frequency hopping is performed on the plurality of NBs except the anchor-NB.

The first system bandwidth may be an eMTC system bandwidth supporting only a long term evolution (LTE) in-band operation, and the second system bandwidth may be a sMTC system bandwidth supporting a standalone operation.

The plurality of NBs may include one anchor-NB and one or more secondary-NBs.

In addition, the UE may receive, from the base station, control information for a unused RB of resource blocks (RBs) in the first system bandwidth.

The control information may be represented in a bitmap, and each bit of the bitmap may indicate each unused RB.

If the anchor-NB does not support an access for an eMTC UE, the UE may receive, from the base station, a system message containing eMTC barring information indicating whether to support the eMTC UE.

The system message may be a system information block (SIB)1-NR message described above.

In addition, if the eMTC barring information indicates not to support the eMTC UE, the UE may receive data from the base station in a LTE control region.

The UE or the device illustrated in FIGS. 1 to 4 and FIG. 24 of the present disclosure may be implemented to perform methods described in the present disclosure including FIG. 25.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

Although the present disclosure has been described focusing on examples applying to the 3GPP LTE/LTE-A and 5G systems, it can be applied to various wireless communication systems other than the 3GPP LTE/LTE-A and 5G systems.

The invention claimed is:

1. A method of supporting, by a user equipment (UE), a standalone machine type communication (MTC) operation using a multi-narrowband (NB) in a wireless communication system, the method comprising:
receiving, from a base station, multi-NB configuration information related to a plurality of narrowbands (NBs) defined in a next generation (NR) bandwidth including a first system bandwidth related to an in-band MTC operation and a second system bandwidth related to the standalone MTC operation; and
performing a frequency hopping on the plurality of NBs based on the multi-NB configuration information,
wherein, based on the plurality of NBs including an anchor-NB representing a NB related to an initial cell selection, the frequency hopping is performed on the plurality of NBs except the anchor-NB,
wherein the first system bandwidth is an eMTC system bandwidth supporting only a long term evolution (LTE) in-band operation,
wherein the second system bandwidth is a sMTC system bandwidth supporting a standalone operation,
based on the anchor-NB not supporting an access for an eMTC UE, receiving, from the base station, a system message containing eMTC barring information being related to supporting the eMTC UE,
based on the eMTC barring information related to supporting the eMTC UE, receiving data from the base station in a LTE control region.

2. The method of claim 1, wherein the plurality of NBs include one anchor-NB and one or more secondary-NBs.

3. The method of claim 1, further comprising:
receiving, from the base station, control information for an unused RB of resource blocks (RBs) in the first system bandwidth.

4. The method of claim 3, wherein the control information is represented in a bitmap,
wherein each bit of the bitmap is related to each unused RB.

5. The method of claim 1, wherein the UE is a standalone MTC UE.

6. A user equipment (UE) supporting a standalone machine type communication (MTC) operation using a multi-narrowband (NB) in a wireless communication system, the UE comprising:
a transceiver configured to transmit and receive a radio signal;
a memory; and
a processor connected to the transceiver and the memory, wherein the processor is configured to:
receive, from a base station, multi-NB configuration information related to a plurality of narrowbands (NBs) defined in a next generation (NR) bandwidth including a first system bandwidth related to an in-band MTC operation and a second system bandwidth related to the standalone MTC operation; and
perform a frequency hopping on the plurality of NBs based on the multi-NB configuration information,
wherein when the plurality of NBs include an anchor-NB representing a NB related to an initial cell selection, the frequency hopping is performed on the plurality of NBs except the anchor-NB,
wherein the first system bandwidth is an eMTC system bandwidth supporting only a long term evolution (LTE) in-band operation,
wherein the second system bandwidth is a sMTC system bandwidth supporting a standalone operation,
based on the anchor-NB not supporting an access for an eMTC UE, receiving, from the base station, a system message containing eMTC barring information being related to supporting the eMTC UE,
based on the eMTC barring information related to supporting the eMTC UE, receiving data from the base station in a LTE control region.

7. The UE of claim 6, wherein the plurality of NBs include one anchor-NB and one or more secondary-NBs.

8. The UE of claim 6, further comprising:
receiving, from the base station, control information for an unused RB of resource blocks (RBs) in the first system bandwidth.

9. The UE of claim 8, wherein the control information is represented in a bitmap,
wherein each bit of the bitmap is related to each unused RB.

* * * * *